ELECTRONIC COMPUTER SYSTEM

Filed Feb. 1, 1965 40 Sheets-Sheet 1

INVENTORS.
Vernon C. Kamm
John R. VanAndel
Aelso E. Whiteside

April 23, 1968 V. C. KAMM ET AL 3,380,027

ELECTRONIC COMPUTER SYSTEM

Filed Feb. 1, 1965 40 Sheets-Sheet 4

April 23, 1968 V. C. KAMM ETAL 3,380,027

ELECTRONIC COMPUTER SYSTEM

Filed Feb. 1, 1965 40 Sheets-Sheet 5

ELECTRONIC COMPUTER SYSTEM

April 23, 1968 V. C. KAMM ET AL 3,380,027

ELECTRONIC COMPUTER SYSTEM

Filed Feb. 1, 1965 40 Sheets-Sheet 7

April 23, 1968 V. C. KAMM ETAL 3,380,027

ELECTRONIC COMPUTER SYSTEM

Filed Feb. 1, 1965 40 Sheets-Sheet 11

| BIT OF W COUNT | BIT TIME T | W CARRY RECURS EVERY | CORRESPONDING TIME PERIOD |
|---|---|---|---|
| 1 | 17 | 2ND WORD TIME | 18 2/3 MICROSEC |
| 2 | 18 | 4TH WORD TIME | 37.3 MICROSEC |
| 3 | 19 | 8TH WORD TIME | 74.7 MICROSEC |
| 4 | 20 | 16TH WORD TIME | 149.3 MICROSEC |
| 5 | 21 | 32TH WORD TIME | 298.7 MICROSEC |
| 6 | 22 | 64TH WORD TIME | 597.3 MICROSEC |
| 7 | 23 | 128TH WORD TIME | 1194.7 MICROSEC |
| 8 | 24 | 256TH WORD TIME | 2389.3 MICROSEC |
| 9 | 25 | 2ND MEMORY CYCLE | 4.78 MILLISEC |
| 10 | 26 | 4TH MEMORY CYCLE | 9.56 MILLISEC |
| 11 | 27 | 8TH MEMORY CYCLE | 19.11 MILLISEC |
| 12 | 28 | 16TH MEMORY CYCLE | 38.22 MILLISEC |

April 23, 1968 V. C. KAMM ETAL 3,380,027

ELECTRONIC COMPUTER SYSTEM

Filed Feb. 1, 1965 40 Sheets-Sheet 25

April 23, 1968 V. C. KAMM ETAL 3,380,027

ELECTRONIC COMPUTER SYSTEM

Filed Feb. 1, 1965 40 Sheets-Sheet 31

SEQUENCE OF FLIP-FLOP CONTENTS FOR COUNT DETECTION

| AFTER BIT TIME | QK1 | QK2 | QD1 | QS | COMMENTS |
|---|---|---|---|---|---|
| s 11 | CLEAR | CLEAR | OLD A | (1) NEW A | dA = {0 IF NEW A = OLD A; 1 IF NEW A ≠ OLD A} (SIMILARLY FOR dB) |
| s 12 | (4) dA | (3) NEW A | OLD B | (2) NEW B | S = SIGN OF DETECTED COUNT |
| s 13 | (4) dA + dB | (5) dA · dB | OLD S | (6) NEW S (7) CLEAR | IF dA · dB = 0 (COUNT = 0, ± 1); IF dA · dB = 1 (COUNT = ± 2) } SEE FIG 39b |
| s 14 | (4) dA + dB | (5) dA · dB | UNITS OF NO. STORED IN Q LINE | NEW S IN EITHER CASE | (8) NEW S = OLD S IF dA · dB = 1 |

Fig. 39a

DETERMINATION OF SIGN OF COUNT

| CONDITIONS BEFORE s 13 | | | | ACTION AT s 13 | |
|---|---|---|---|---|---|
| QK1 = dA | QK2 = NEW A | CHANGE = dB | QS = NEW B | COUNT IS | COMPLEMENT QS |
| 1 | 0 | 0 | 0 | −1 | YES (61) |
| 1 | 0 | 0 | 1 | +1 | YES (62) |
| 1 | 1 | 0 | 0 | +1 | NO |
| 1 | 1 | 0 | 1 | −1 | NO |
| 0 | 0 | 1 | 0 | +1 | NO |
| 0 | 0 | 1 | 1 | −1 | NO |
| 0 | 1 | 1 | 0 | −1 | YES (63) |
| 0 | 1 | 1 | 1 | +1 | YES (64) |
| 1 | − | 1 | − | ±2 | (7) (8) |

Fig. 39b

SIGN AND MAGNITUDE

| COUNT | QS | QK1 | QK2 |
|---|---|---|---|
| +2 | 0 | 1 | 1 |
| +1 | 0 | 1 | 0 |
| 0 | − | 0 | 0 |
| −1 | 1 | 1 | 0 |
| −2 | 1 | 1 | 1 |

Fig. 39c

April 23, 1968 V. C. KAMM ET AL 3,380,027

ELECTRONIC COMPUTER SYSTEM

Filed Feb. 1, 1965 40 Sheets-Sheet 35

April 23, 1968 V. C. KAMM ET AL 3,380,027

ELECTRONIC COMPUTER SYSTEM

Filed Feb. 1, 1965 40 Sheets-Sheet 40

3,380,027

ELECTRONIC COMPUTER SYSTEM

Vernon C. Kamm, Farmington, John R. Van Andel, Dearborn, and Arliss E. Whiteside, Royal Oak, Mich., assignors to The Bendix Corporation, Southfield, Mich., a corporation of Delaware Filed Feb. 1, 1965, Ser. No. 429,371
3 Claims. (Cl. 340—172.5)

ABSTRACT OF THE DISCLOSURE

A computer for receiving and processing outputs from a plurality of quantizers which emit pairs of square waveforms alternating between two levels depending upon the rate and direction of motion of the quantizer input. More particularly a computer to sample the outputs of these quantizers on a time-shared basis at a frequency of sampling which allows no more than two changes of each quantizer output.

This invention pertains to an electronic computer system and more particularly to a computer having increased flexibility with decreased component equipment.

It is an object of this invention to provide a computer having multiple accumulators and multiple memory lines with circuitry to provide data transfers between any of the accumulators and any of the memory lines thereby increasing computer flexibility and operating speed.

It is an object of this invention to provide a method of and apparatus for utilizing the count in a counting register to place data at given equal intervals in a second register by detecting the most significant bits of the count in the counting register thereby utilizing the counting register for two purposes and making unnecessary a separate register to insert and record the number of insertions of data in a second register. The intervals in which data is inserted in the second register will occur every $x$ word time that a count is placed in the first register where $x$ is a power of two.

It is an object of this invention to provide a simplified loading device for a computer wherein a single wired instruction places a taped input character in a buffer register and then interchanges the contents of the buffer register with a quick access register and repeats this process until the quick access register is filled. In this way only one wired instruction is necessary to fill the quick access register with sufficient information to perform loading in the conventional manner whereas in previous devices wired instructions were needed to perform all of the steps that the filled quick access register performs in this invention. This reduces the number of wired instructions making the system less costly, more compact, and more versatile since the loading instructions can be readily changed.

It is an object of this invention to provide a computer for receiving outputs from conventional square wave quantizers and recording the motion commands from said quantizers by sampling the square wave forms less frequently than heretofore possible. Square wave quantizers emit a pair of square wave forms each of which alternates between two levels. By knowing how many times each wave changed from one level to the other and knowing which wave is leading the other, it is possible to convert the motion commands of the quantizers to digital information as to the rate and direction of motion command. It was previously considered necessary to constantly sample these wave forms or sample them frequently enough so that no more than one change per sample period would occur. This invention provides means for sampling the wave forms less frequently so that two changes can occur per sample period.

It is a further object of this invention to utilize the circuitry of the previous object on a time shared basis to add the changes of the quantizers so detected to a cumulative total thereby saving equipment, minimizing space required, and lowering construction costs.

It is an object of this invention to provide digital circuitry for sensing a value of a number, recording it in a register and if it exceeds a specified maximum then place only the specified maximum in the register and if it falls below a specified minimum place only the specified minimum in the register. This circuitry is especially advantageous when motion commands are being translated to rate of movement. If the motion command is very large, and is outside the range between the specified maximum and minimum the largest rate of corresponding movement desired is within this range and hence this specified limits of the range are used for all commands outside the range.

It is an object of this invention for providing circuitry in a computer for temporarily changing the normal sequence of instructions by going to a special register for a special instruction and then on the next cycle going back to the normal instructions in their normal sequence.

It is an object of this invention to test data from any given location in any memory line without having to first bring it to the arithmetic registers, thereby saving time and increasing the flexibility of the computer.

It is an object of this invention to provide in a computer having a plurality of cyclic memory lines a common AND gate for writing into the plurality of lines thereby saving equipment and reducing cost.

These and other objects will become more apparent when a preferred embodiment is considered in connection with the drawings in which.

Figures 15A, 15B, 15C:
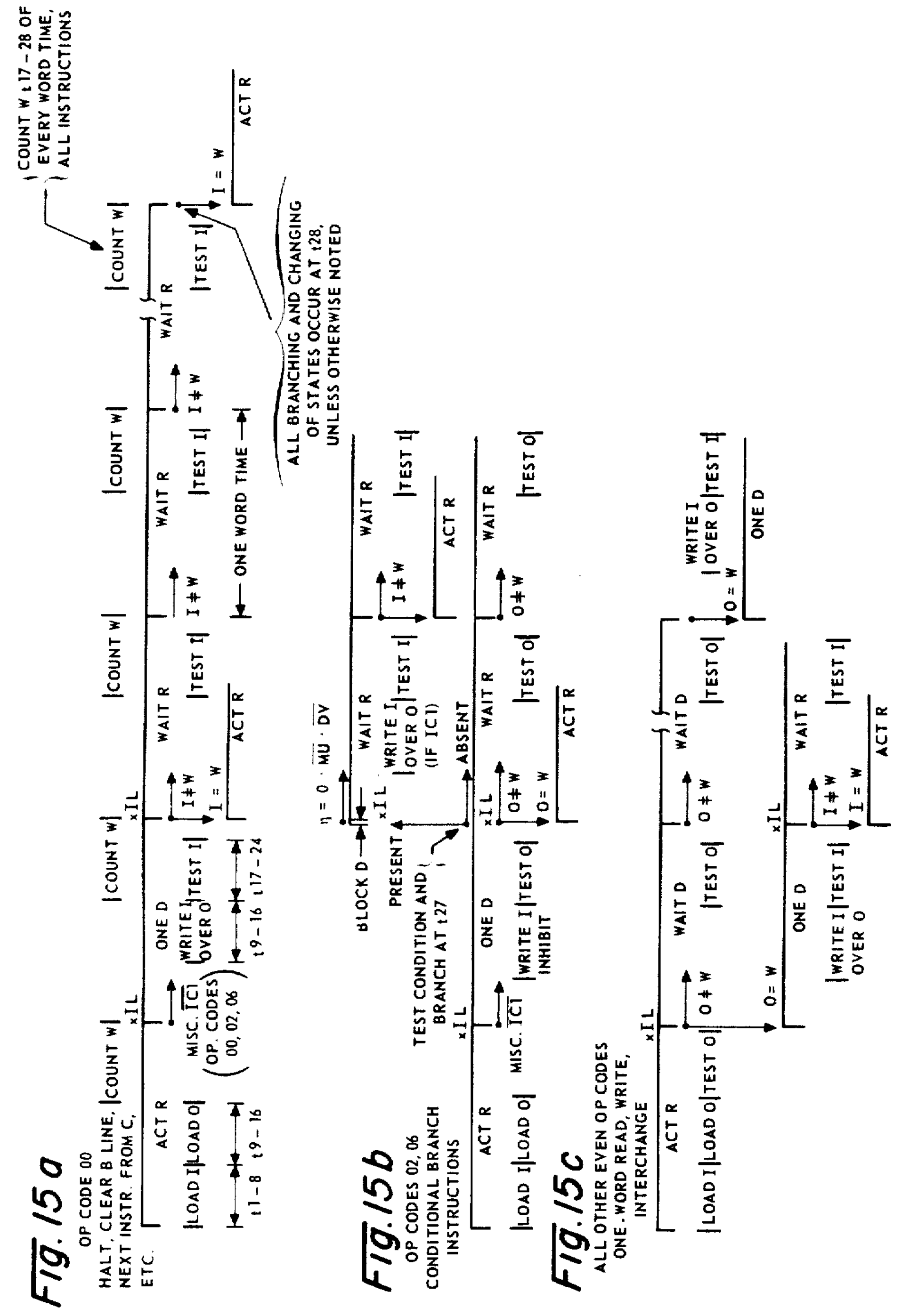
Figures 16A, 16B, 16C:
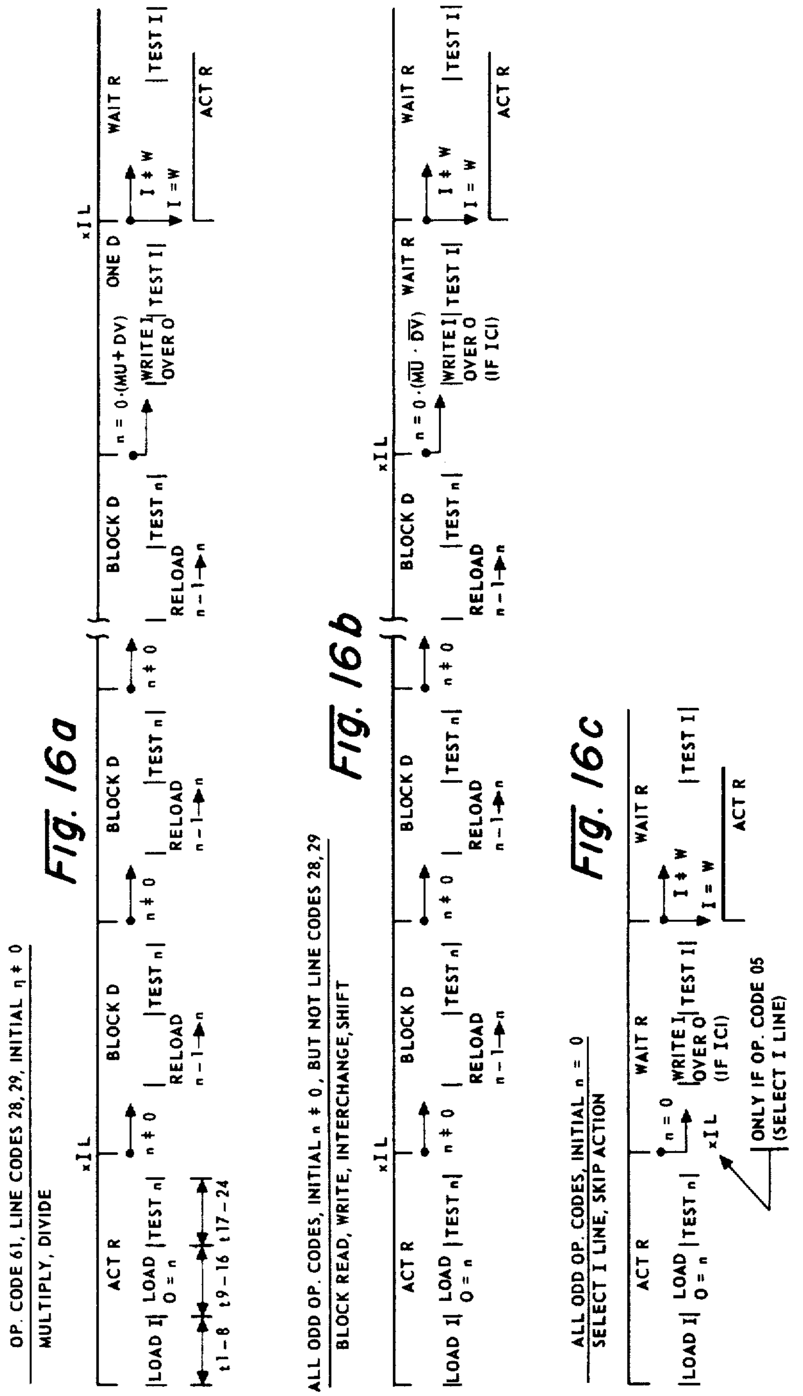
Figure 17:
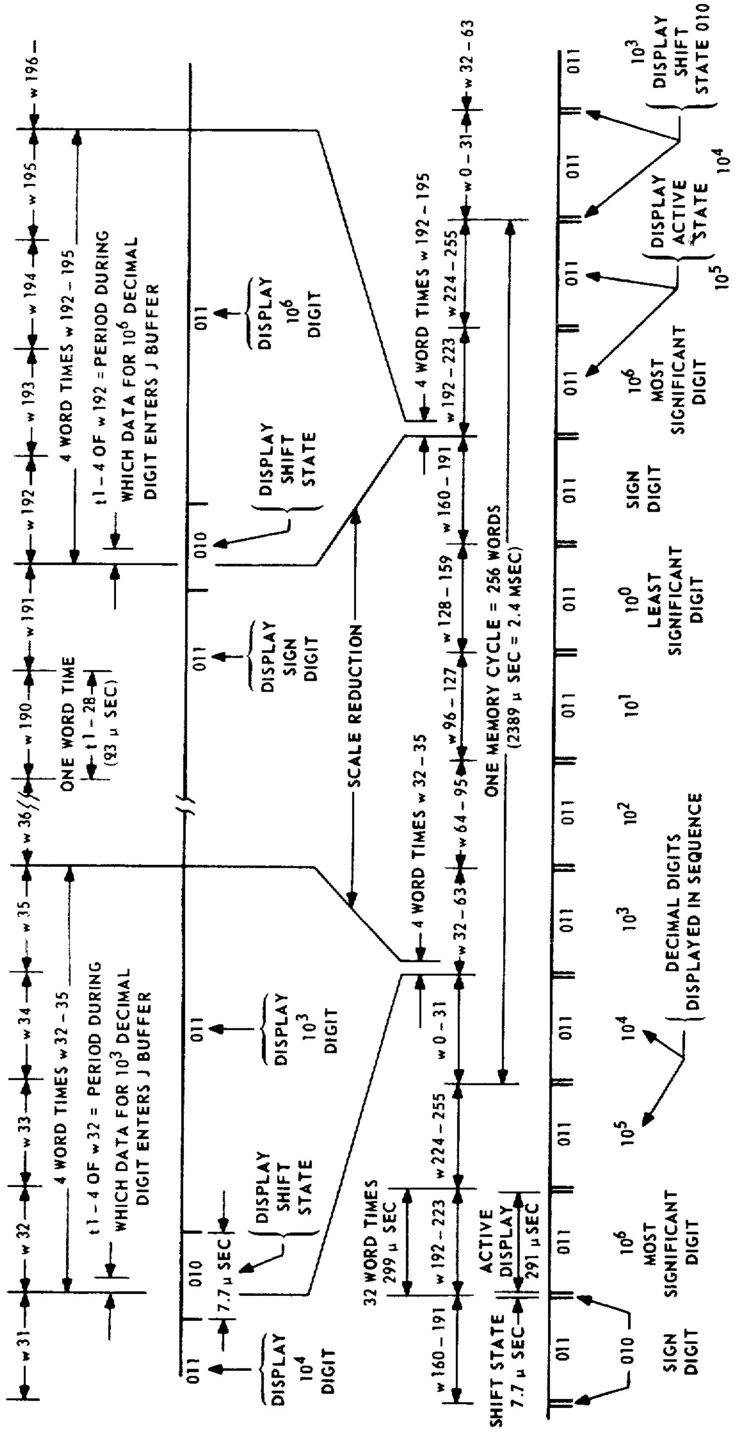
Figure 18:
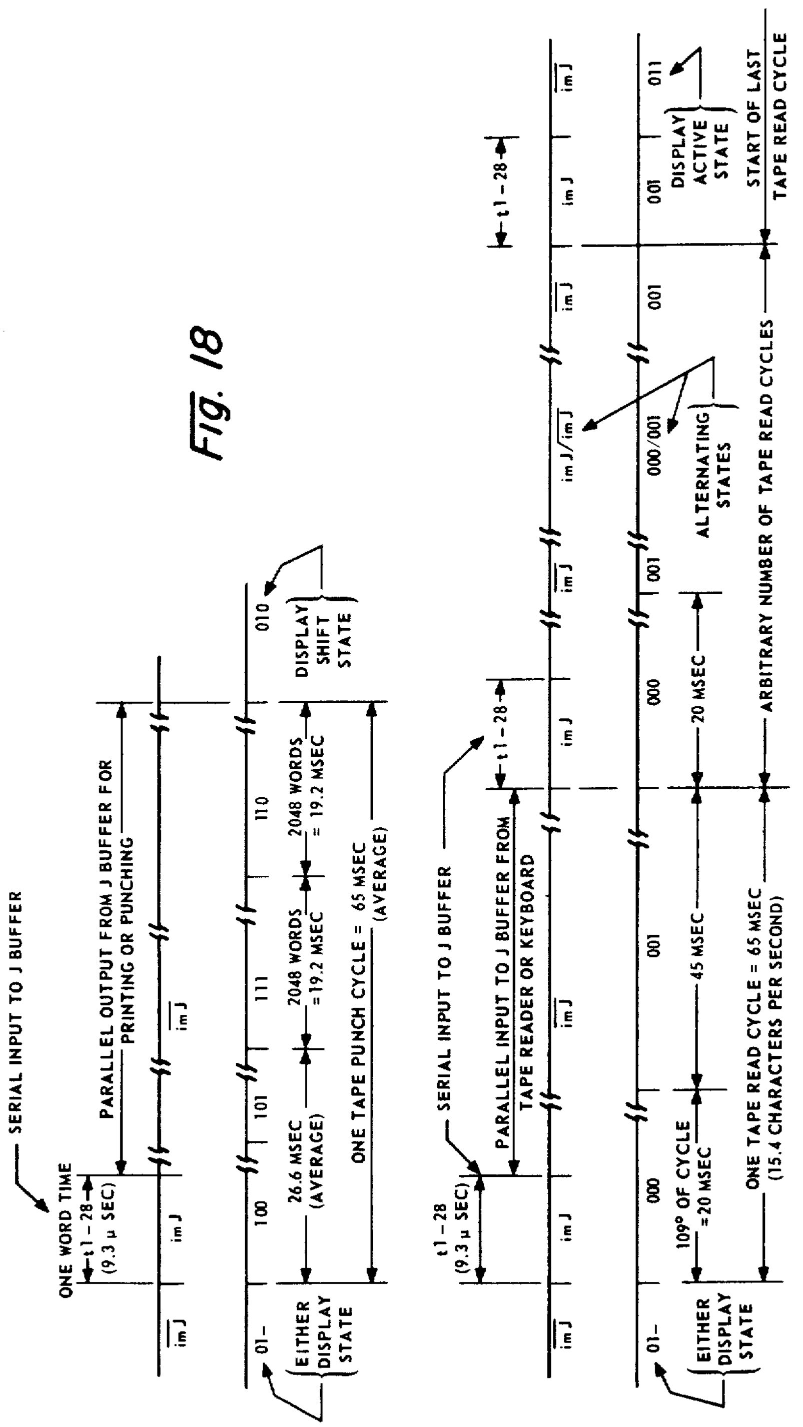
Figures 19A, 19B, 19C, 19D, 19E:
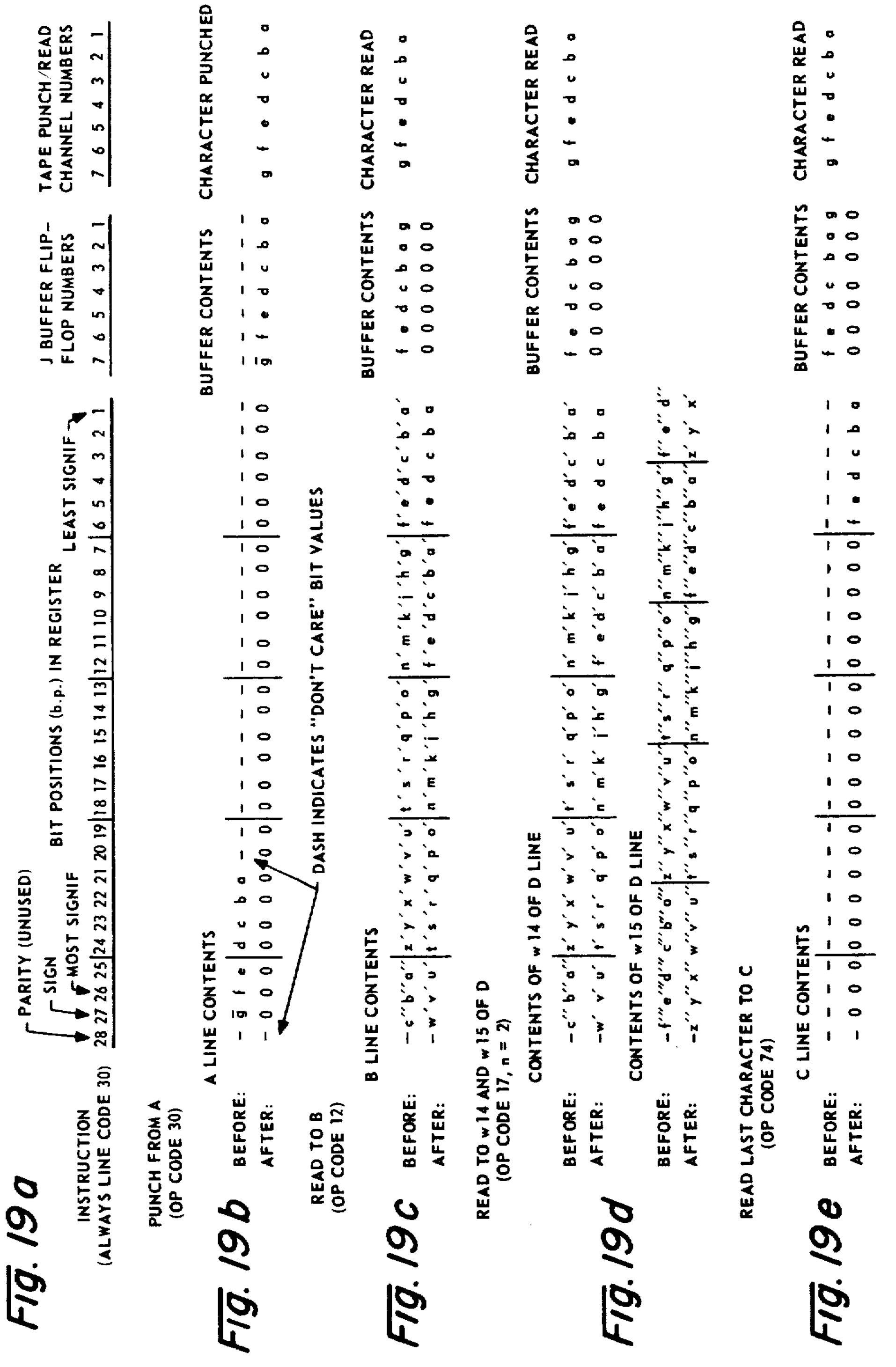
Figures 20A, 20B, 20C:
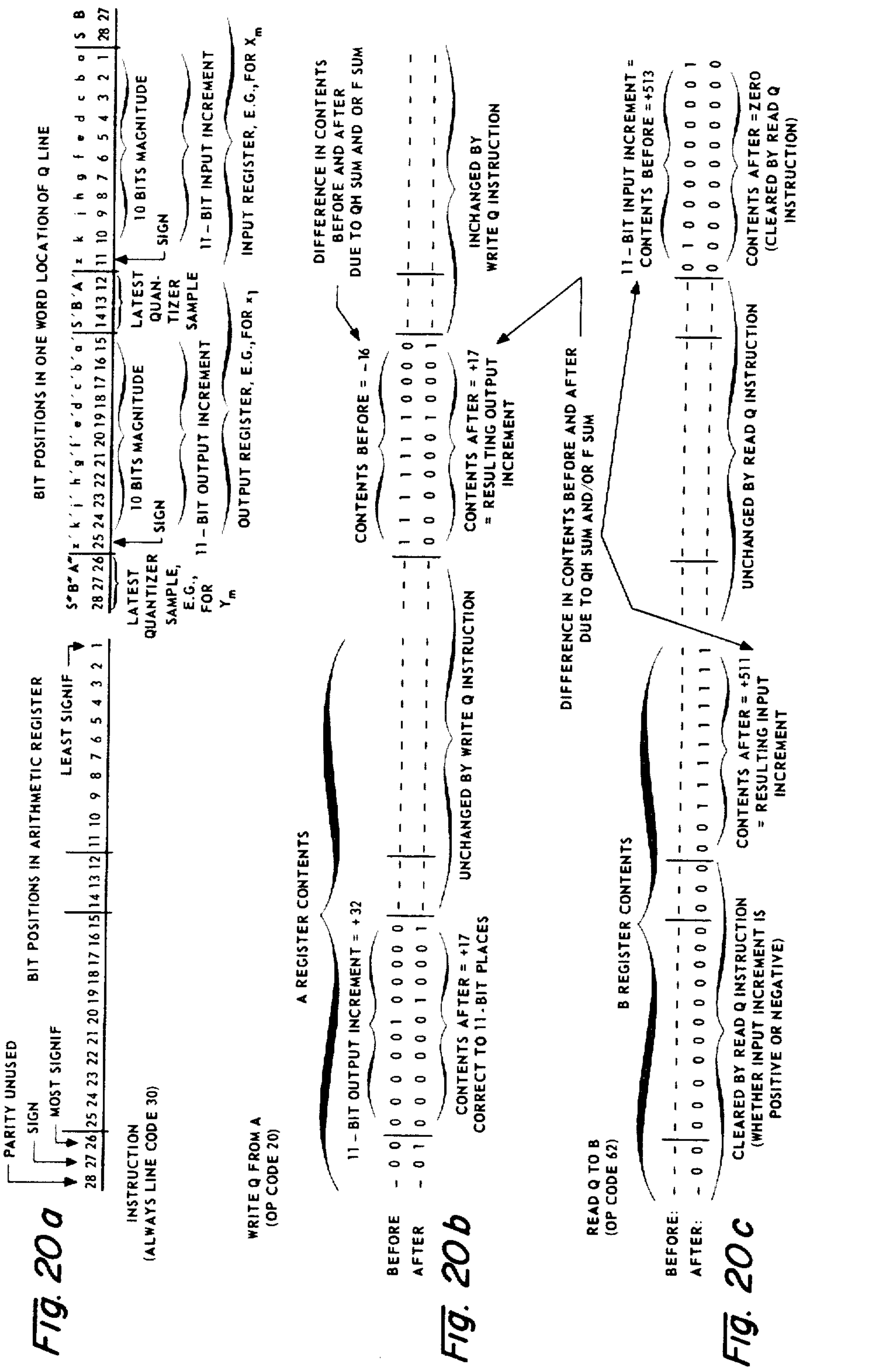
Figure 21:
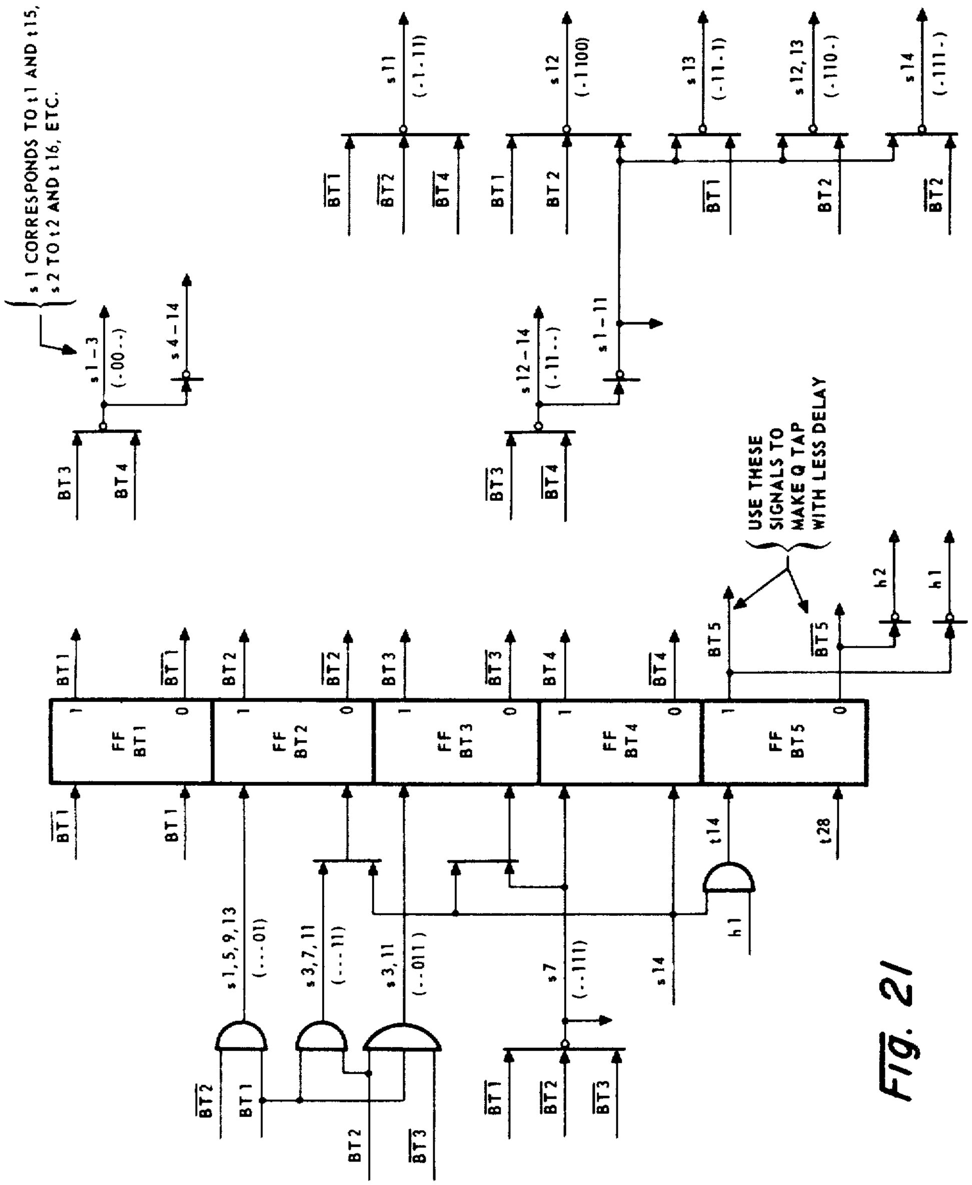
Figure 22:
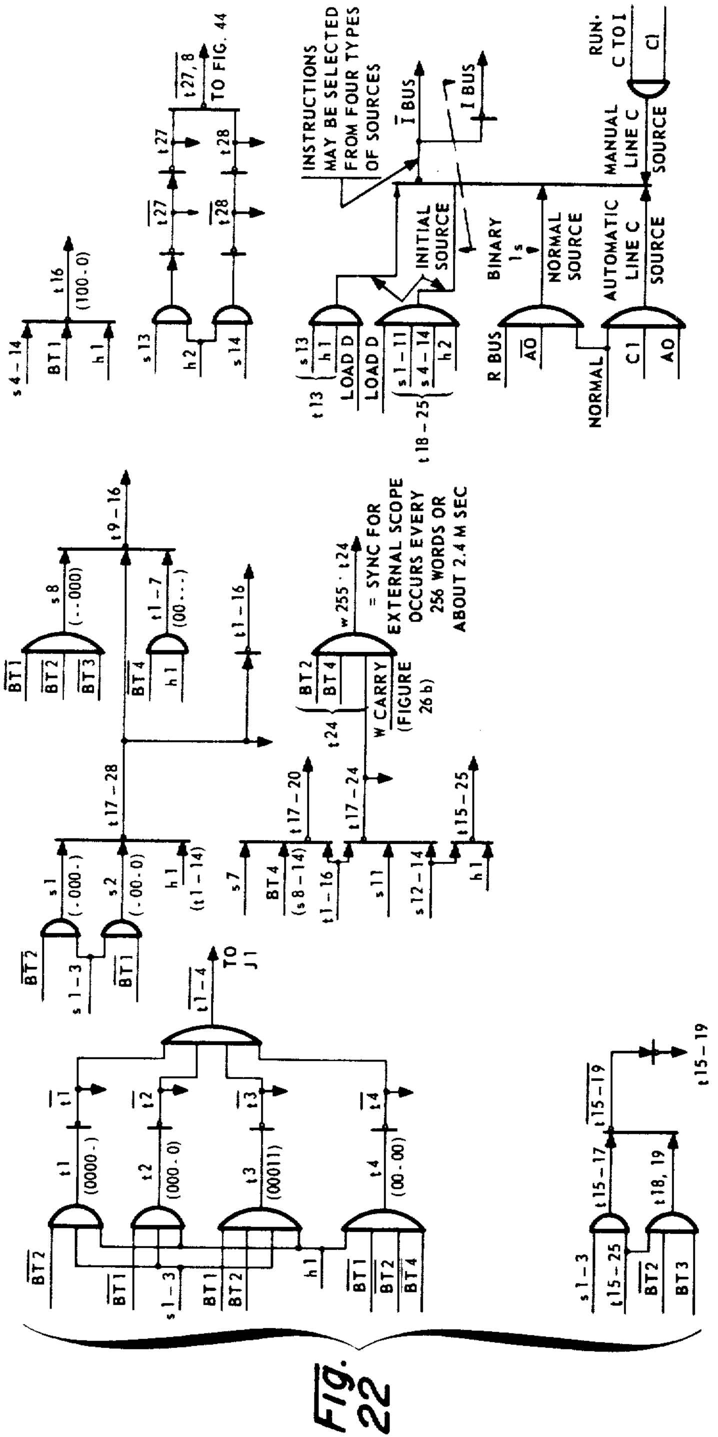
Figure 23:
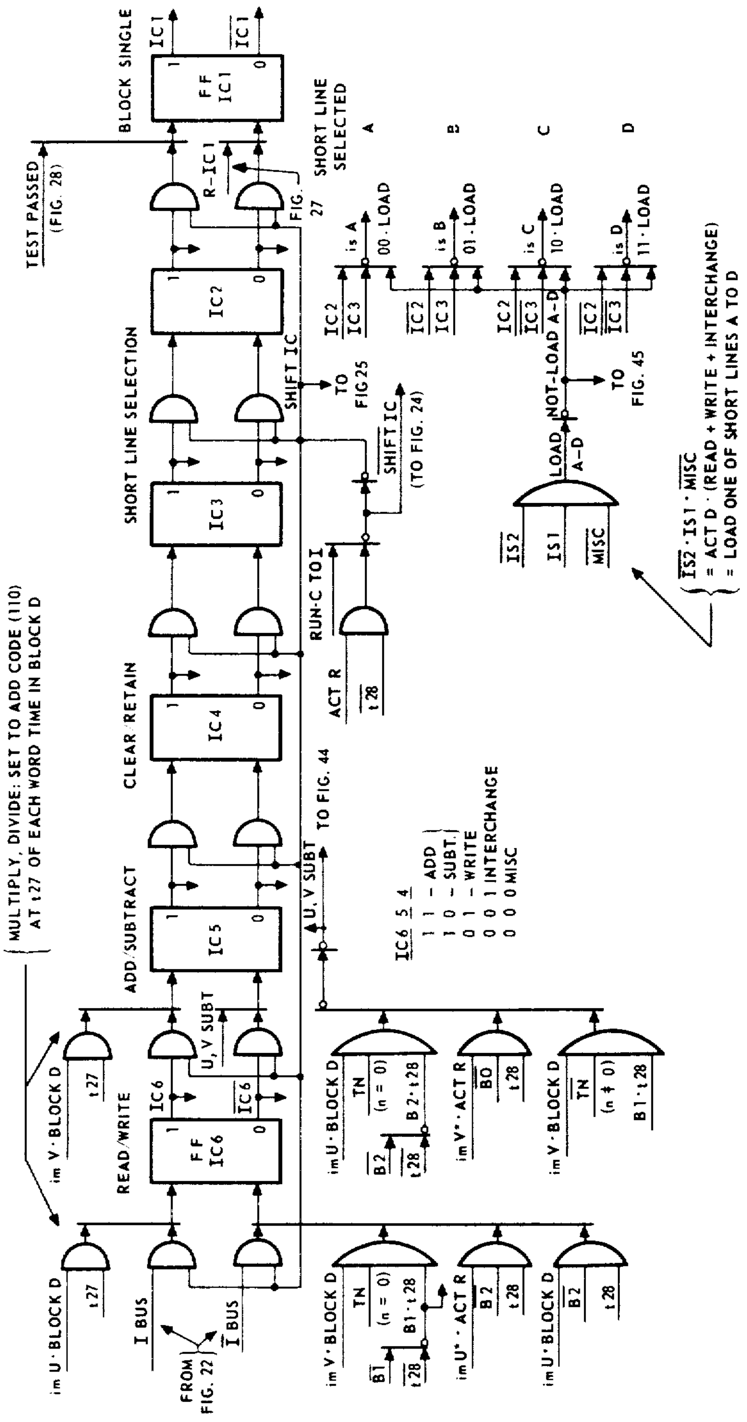
Figure 24:
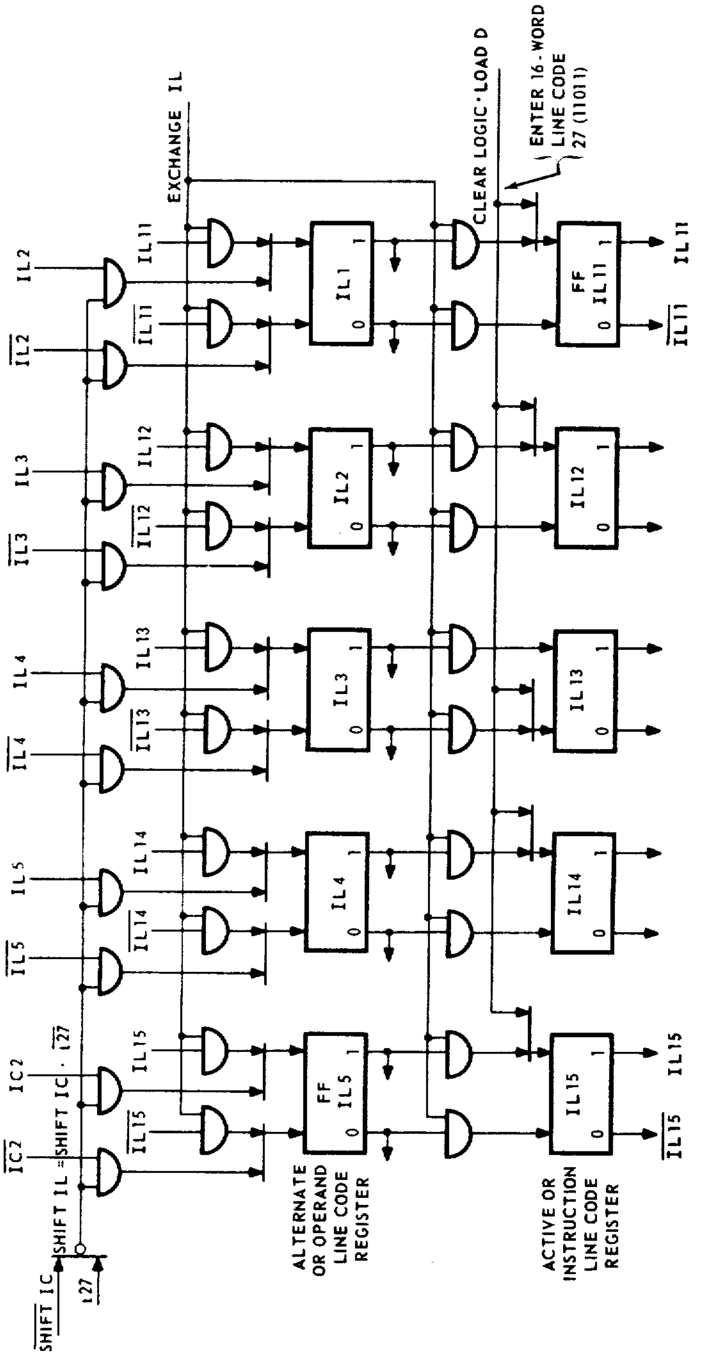
Figures 25, 25A:
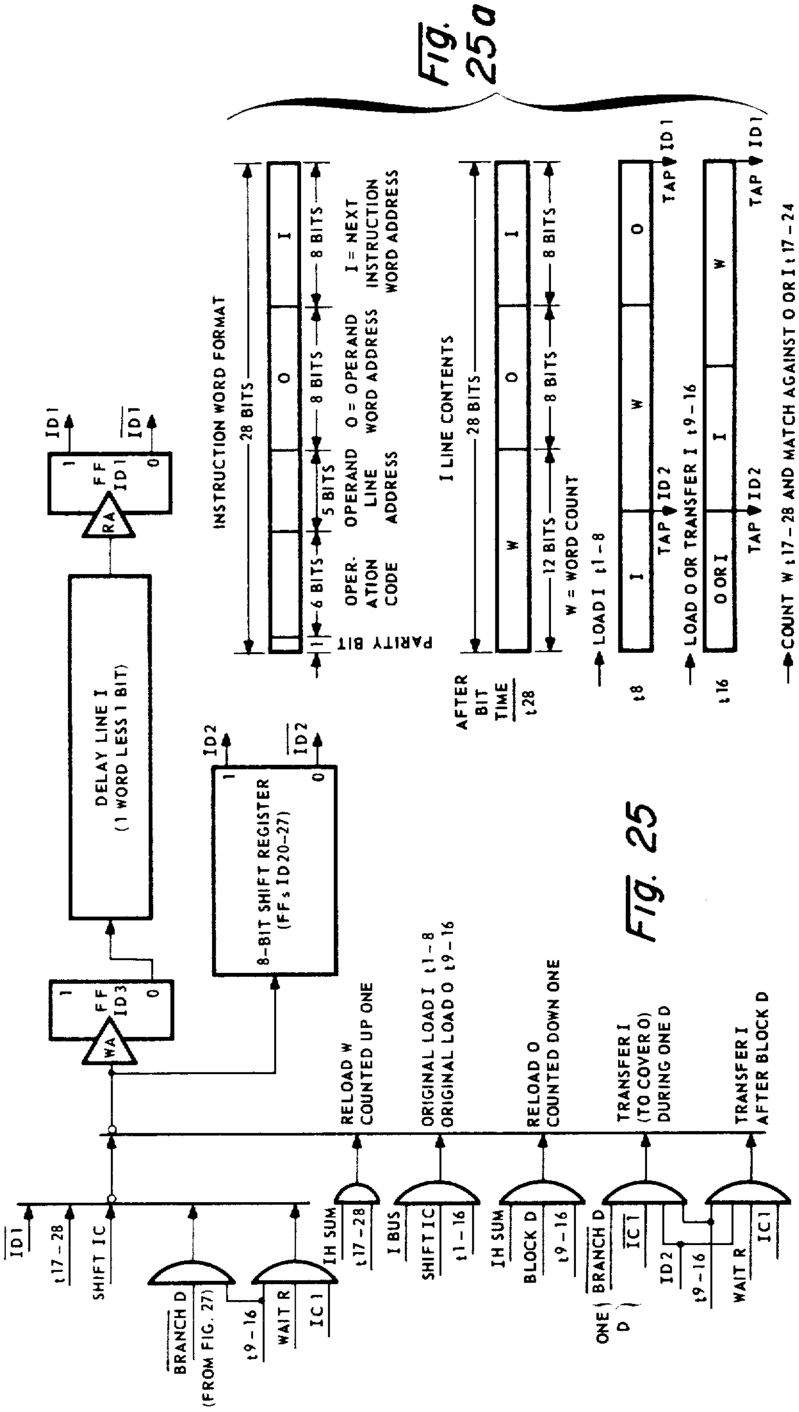
Figures 26A, 26B, 26C, 26D:
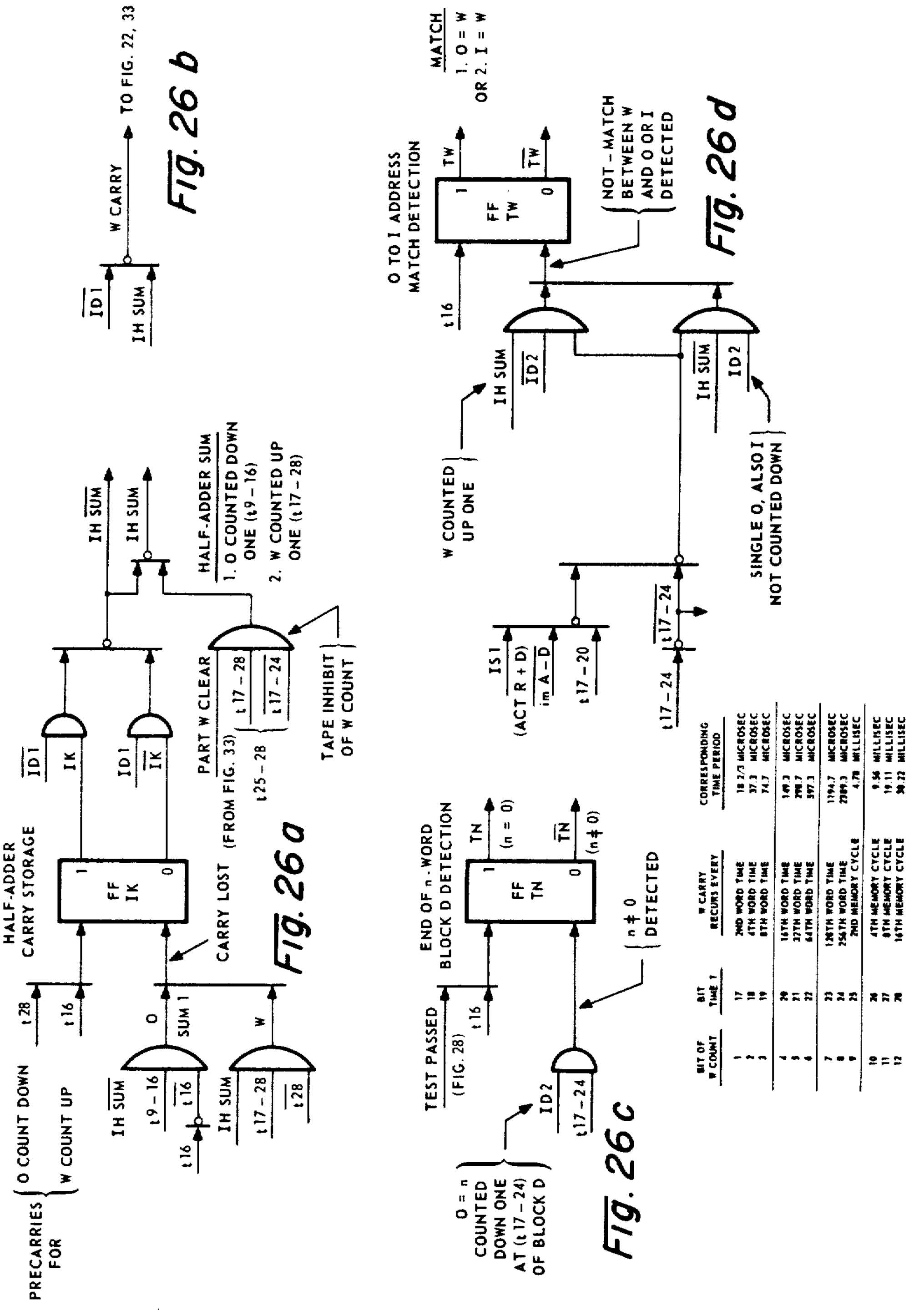
Figure 27:
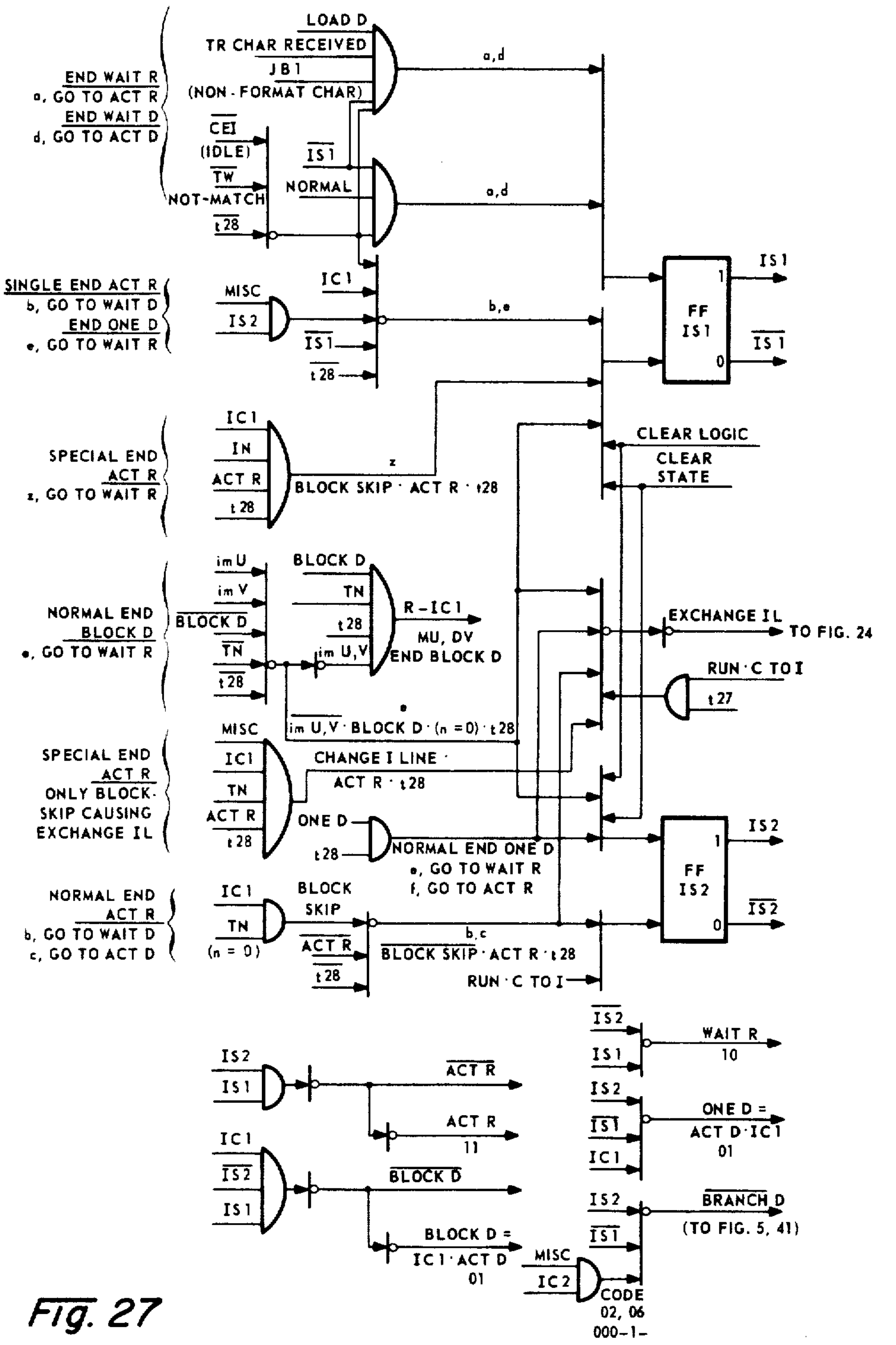
Figures 28A, 28B, 28C:
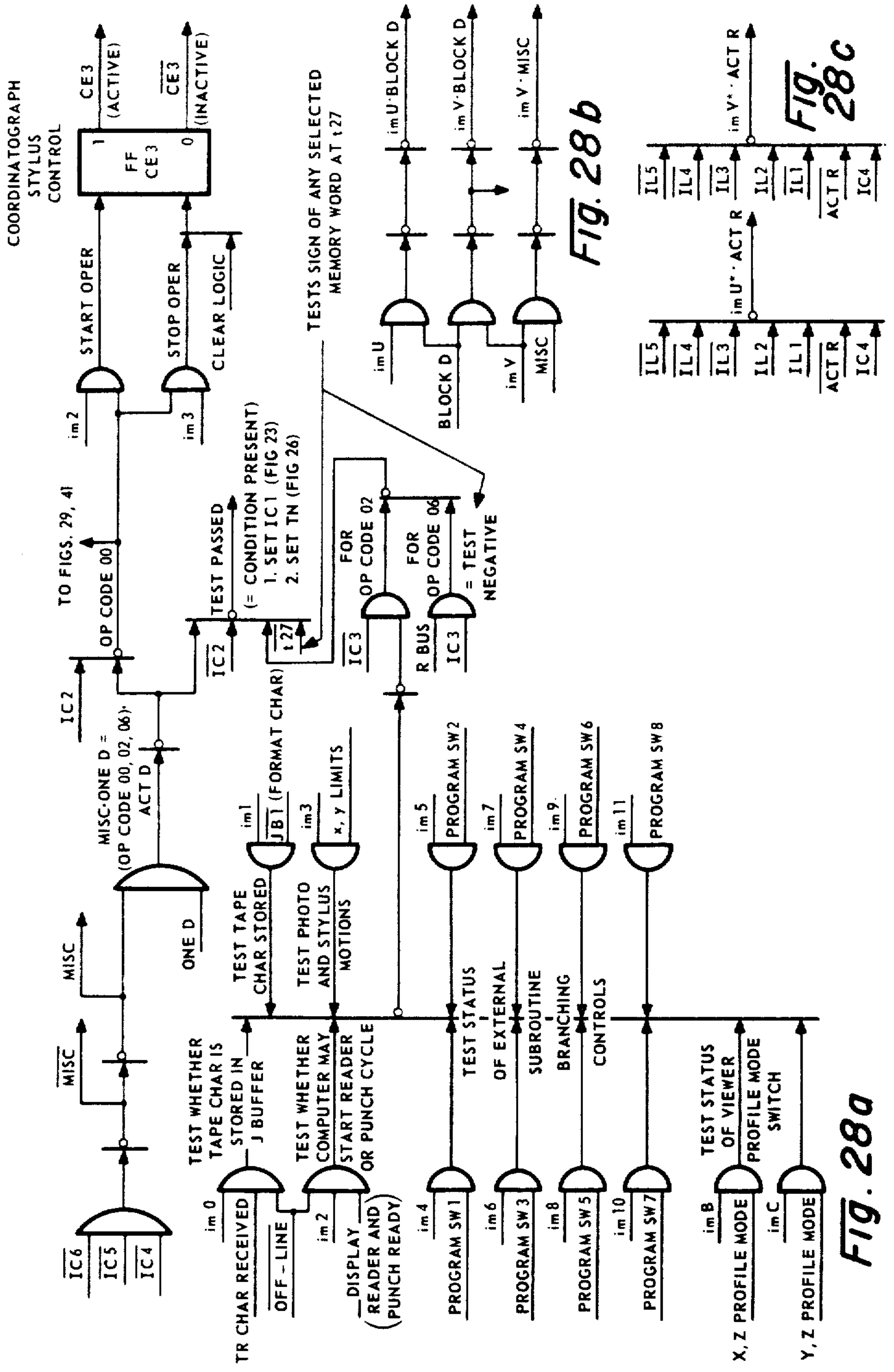
Figure 29:
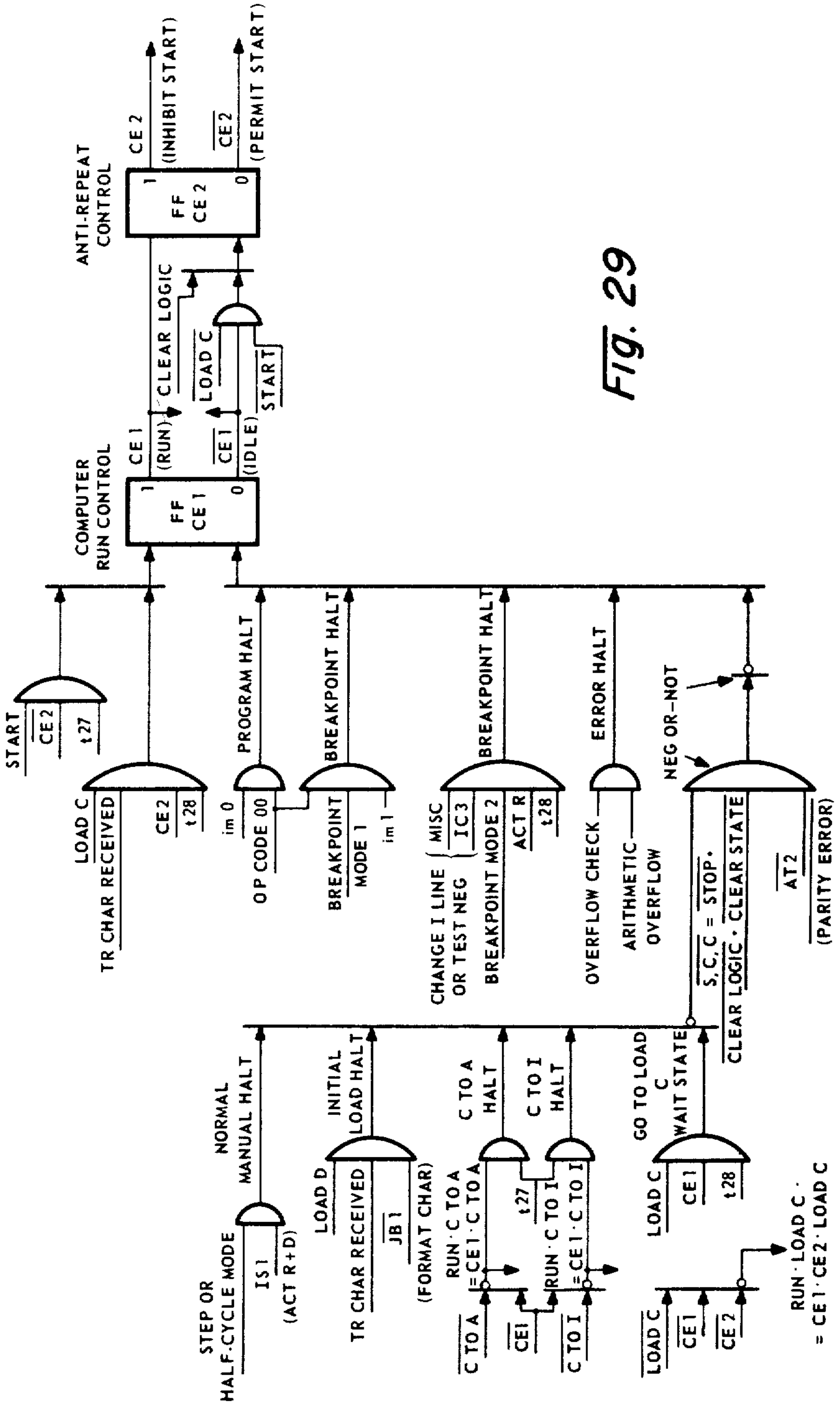
Figures 30A, 30B:
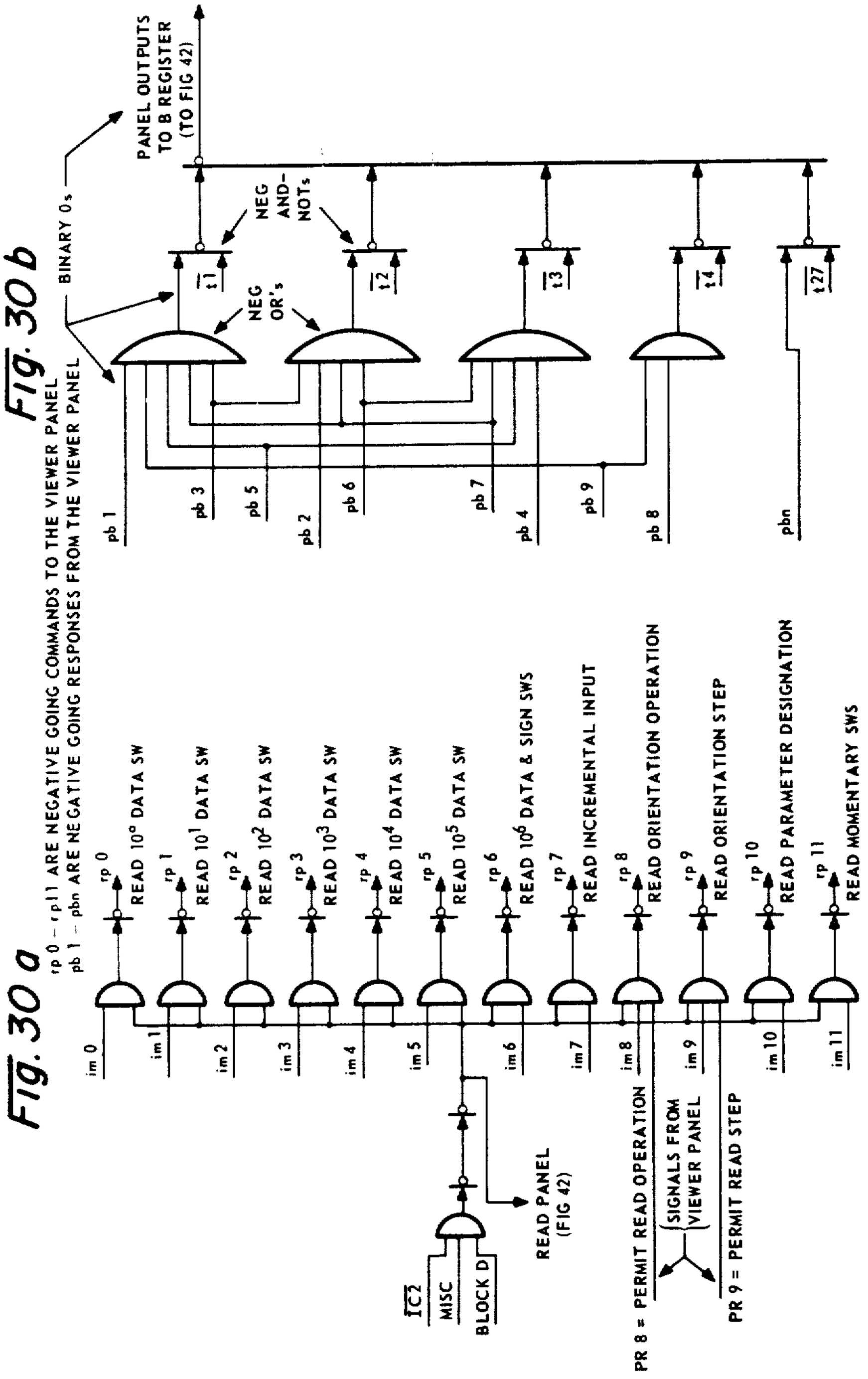
Figure 31:
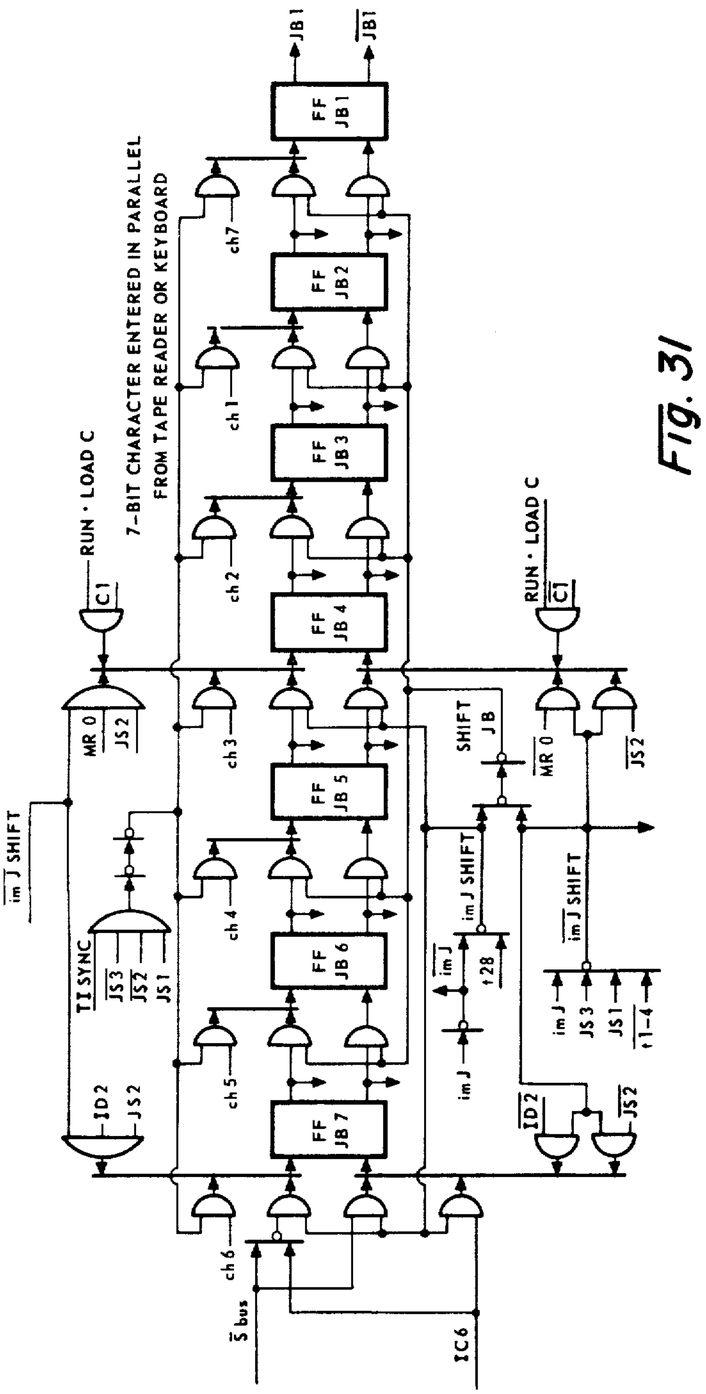
Figure 32D:
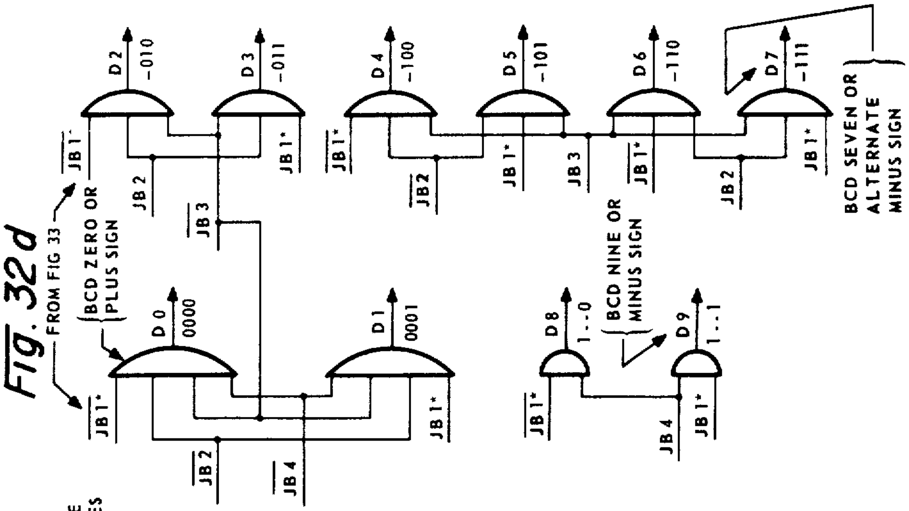
Figure 32C:
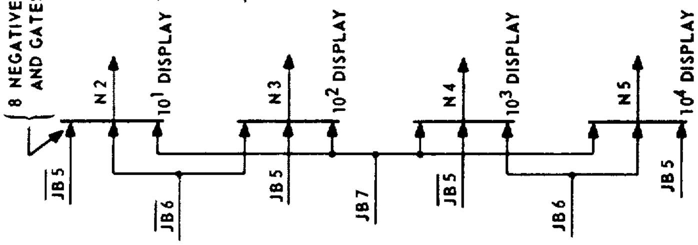
Figure 32B:
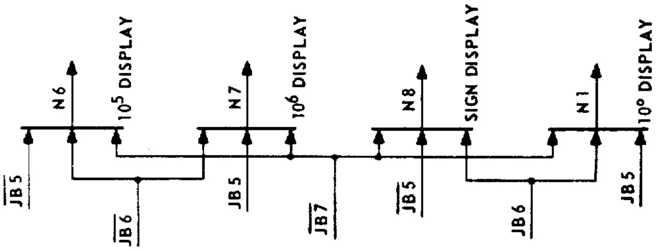
Figure 32A:
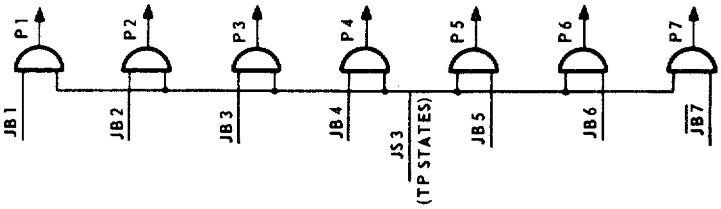
Figures 33A, 33B, 33C:
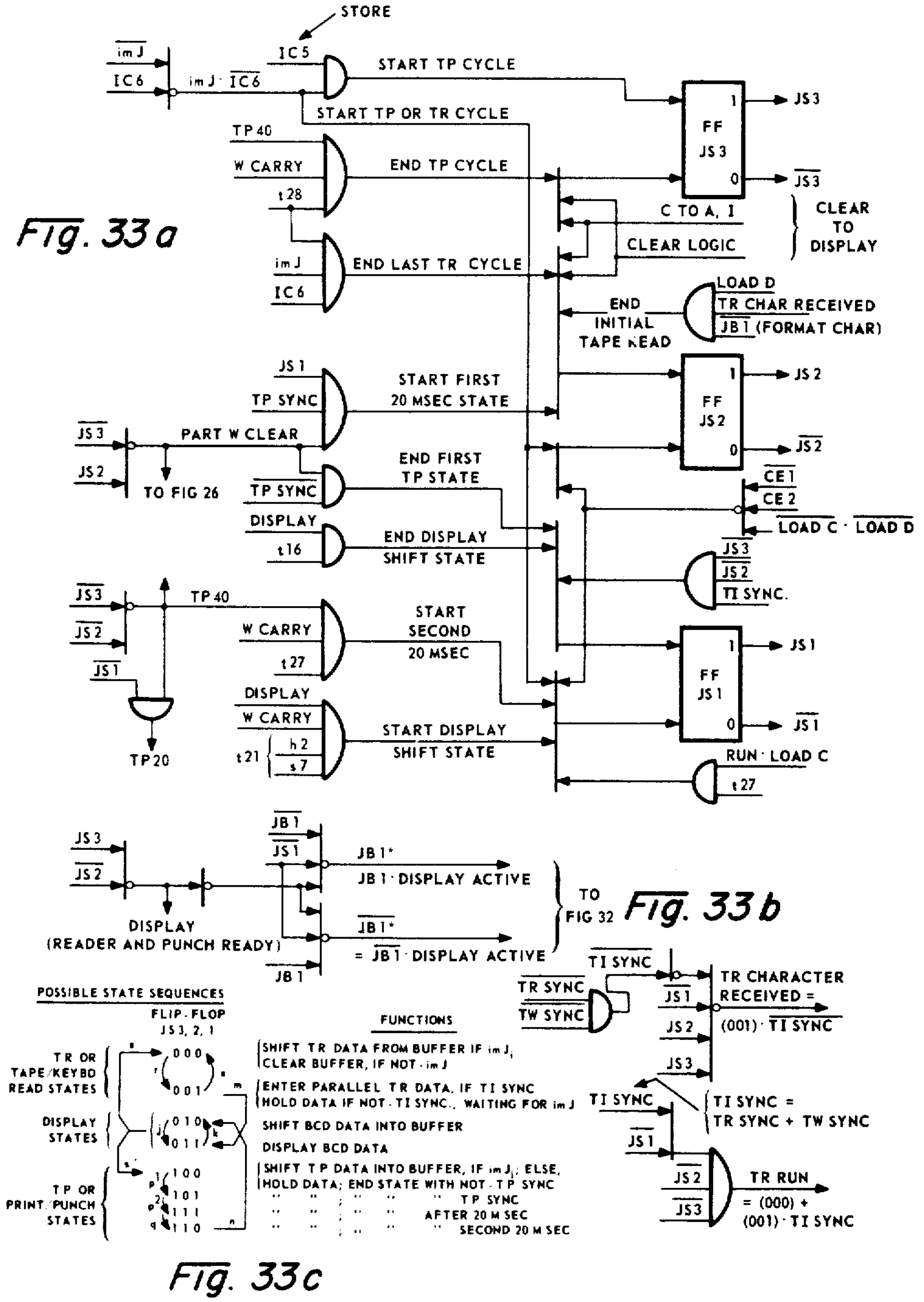
Figure 34:
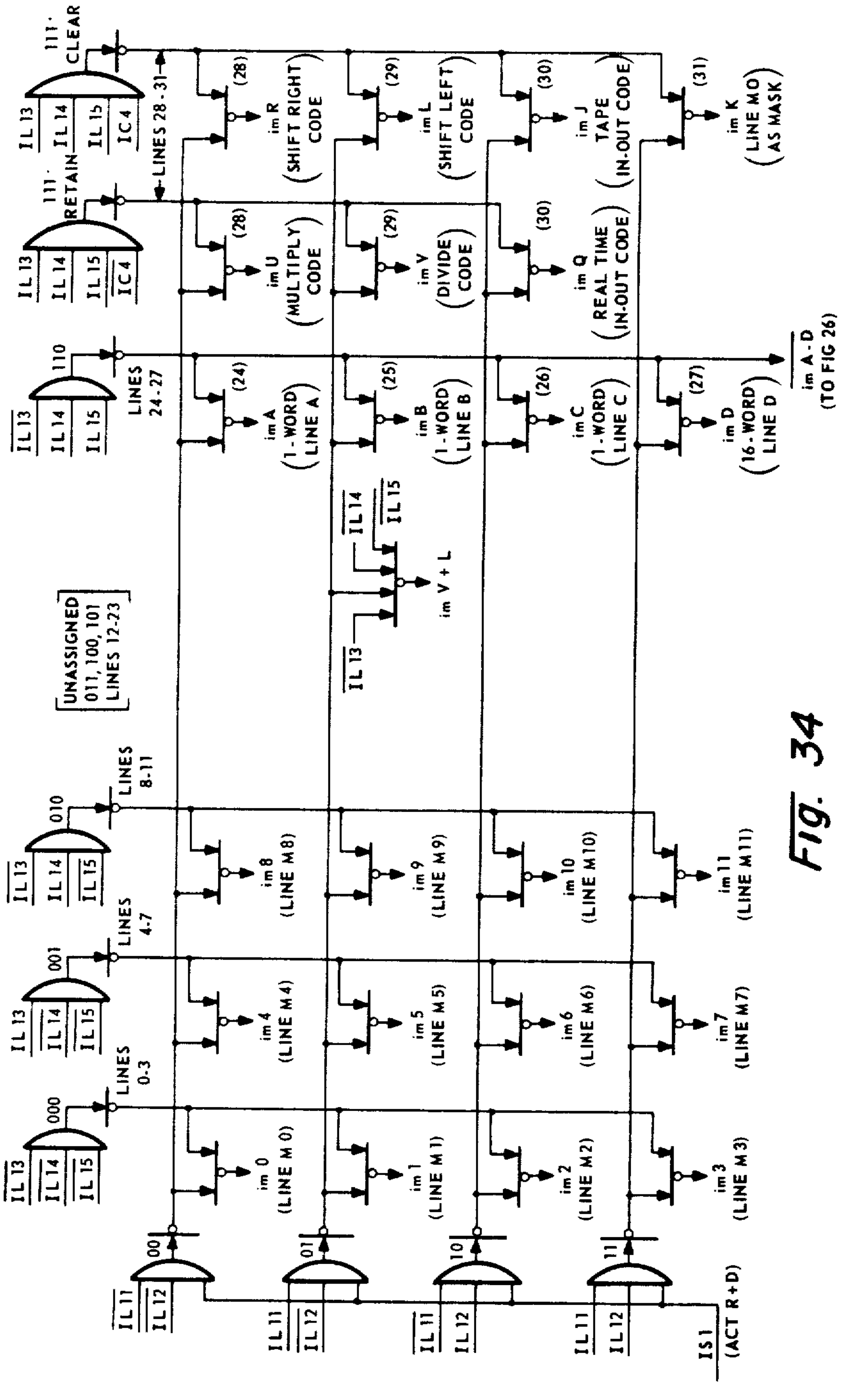
Figures 35A, 35B:
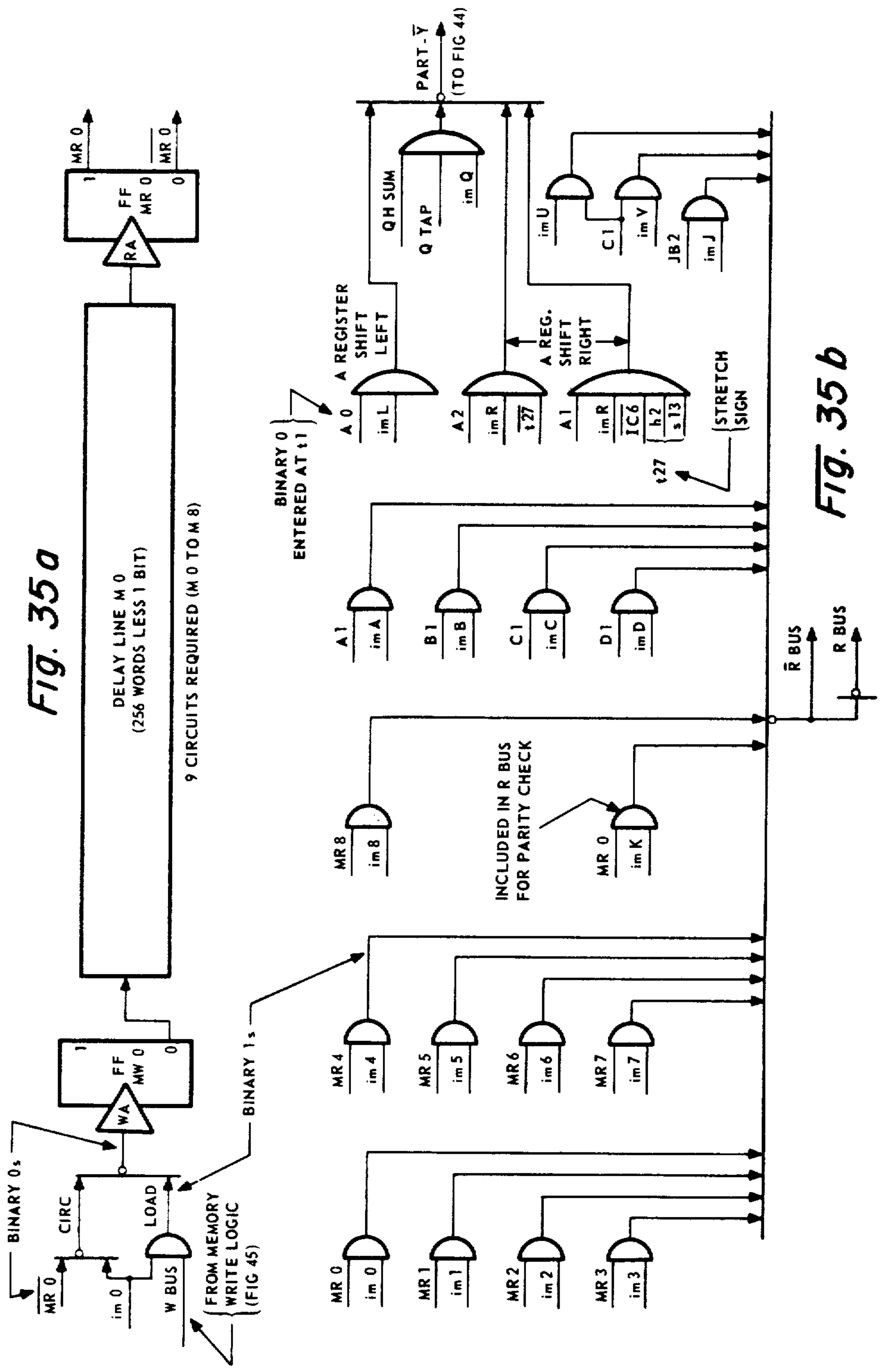
Figure 36:
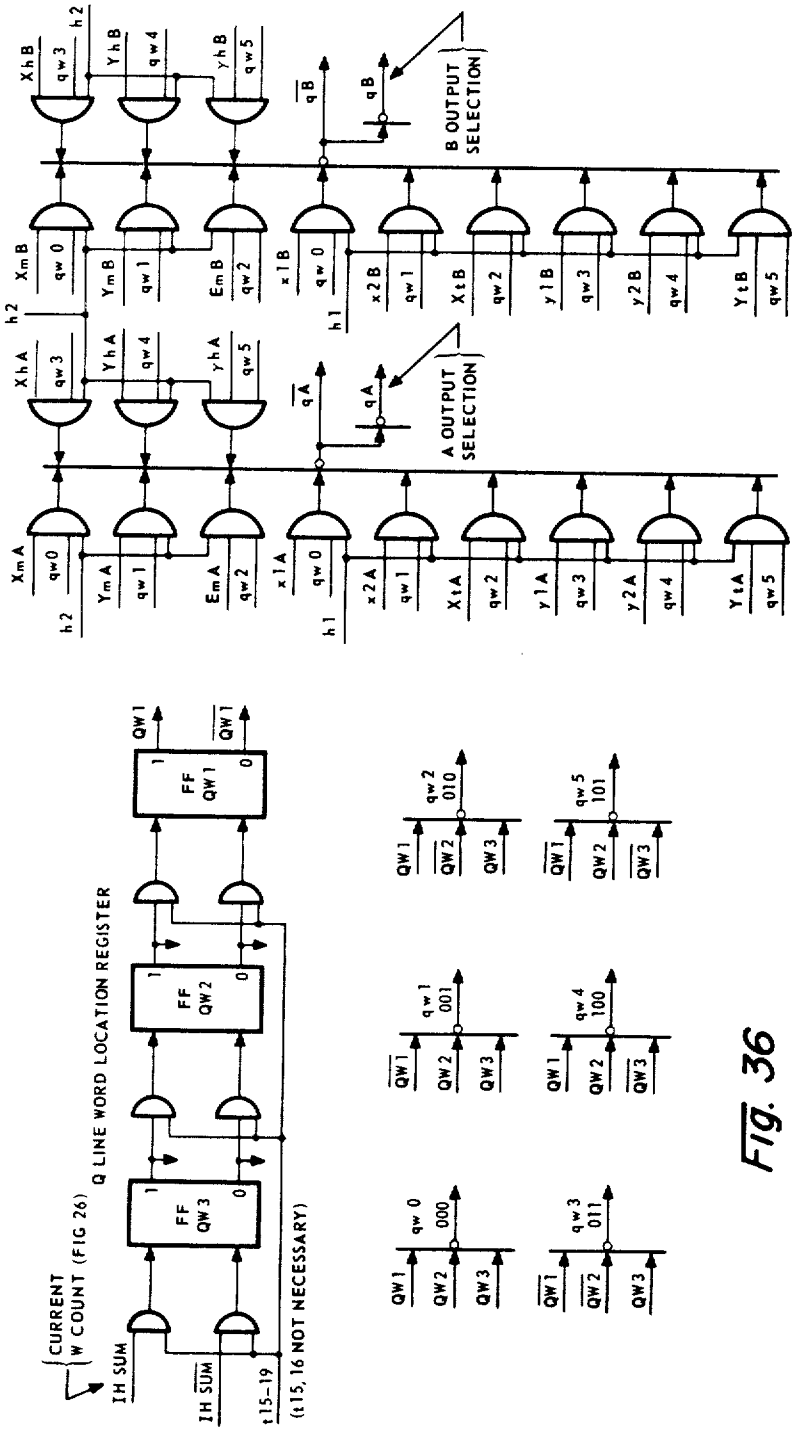
Figures 37A, 37B:
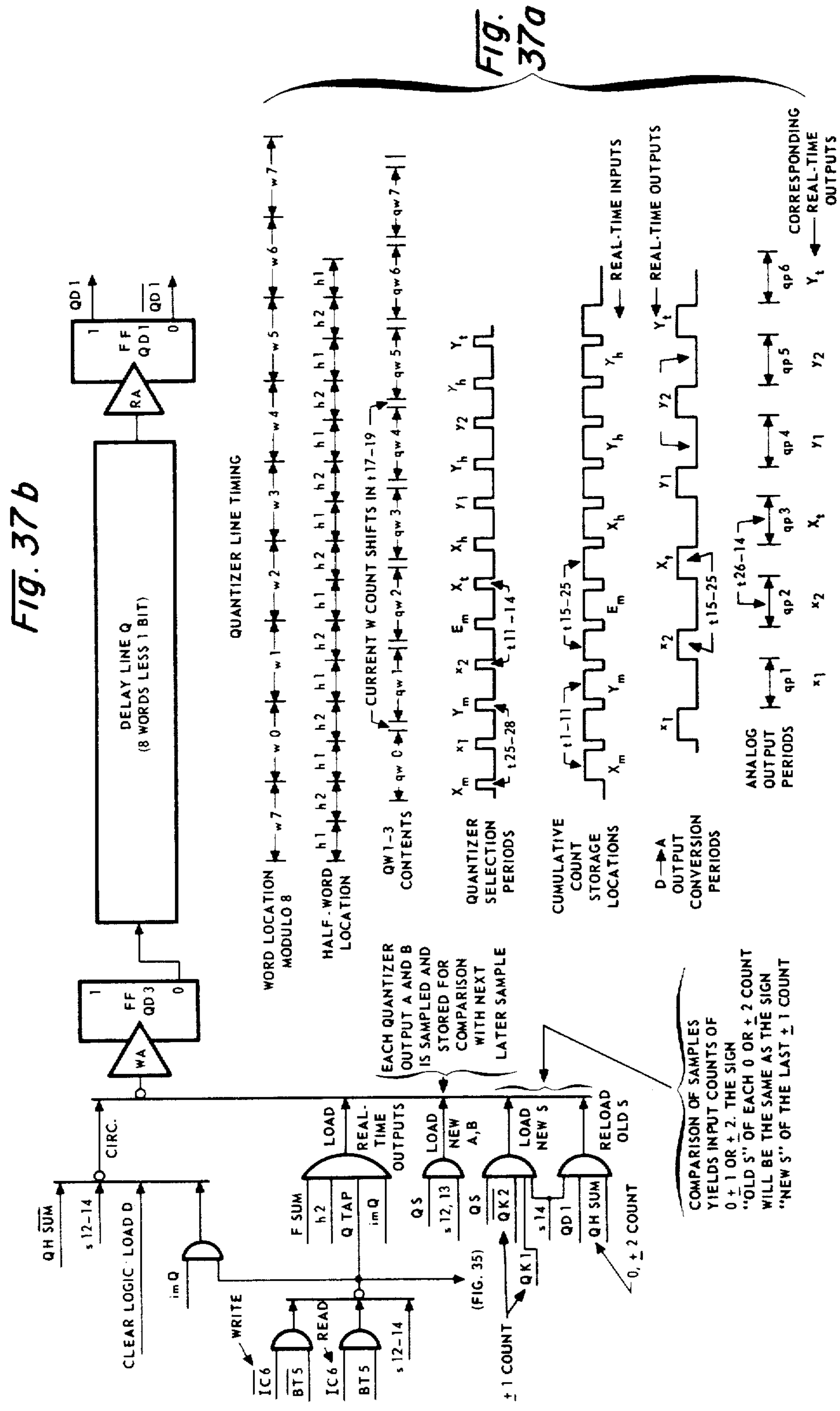
Figure 38:
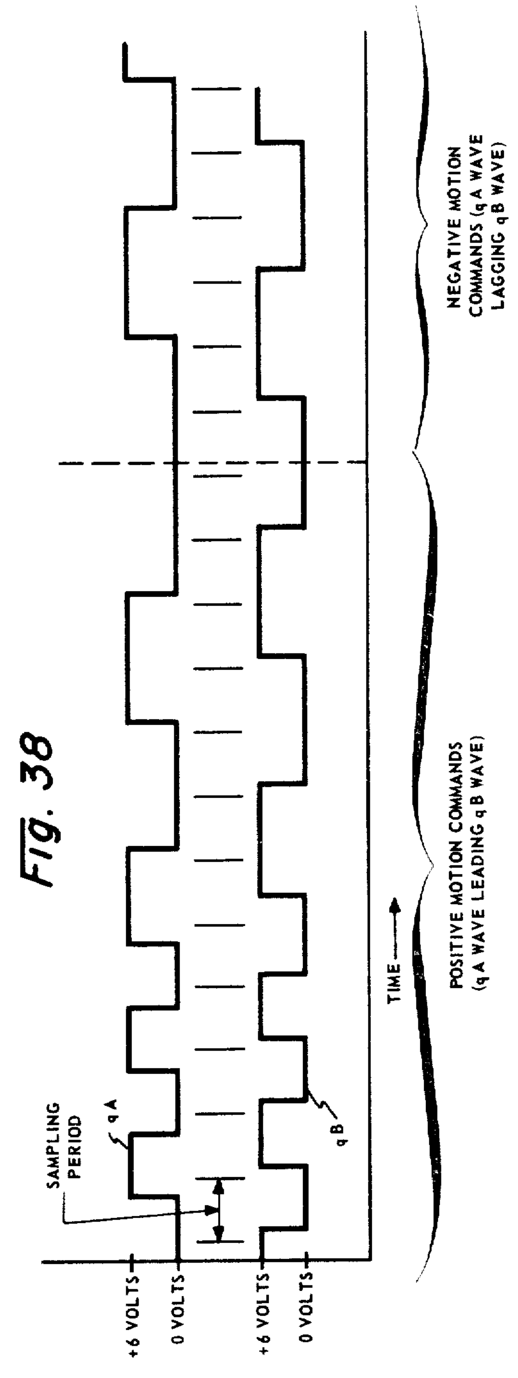
Figure 39:
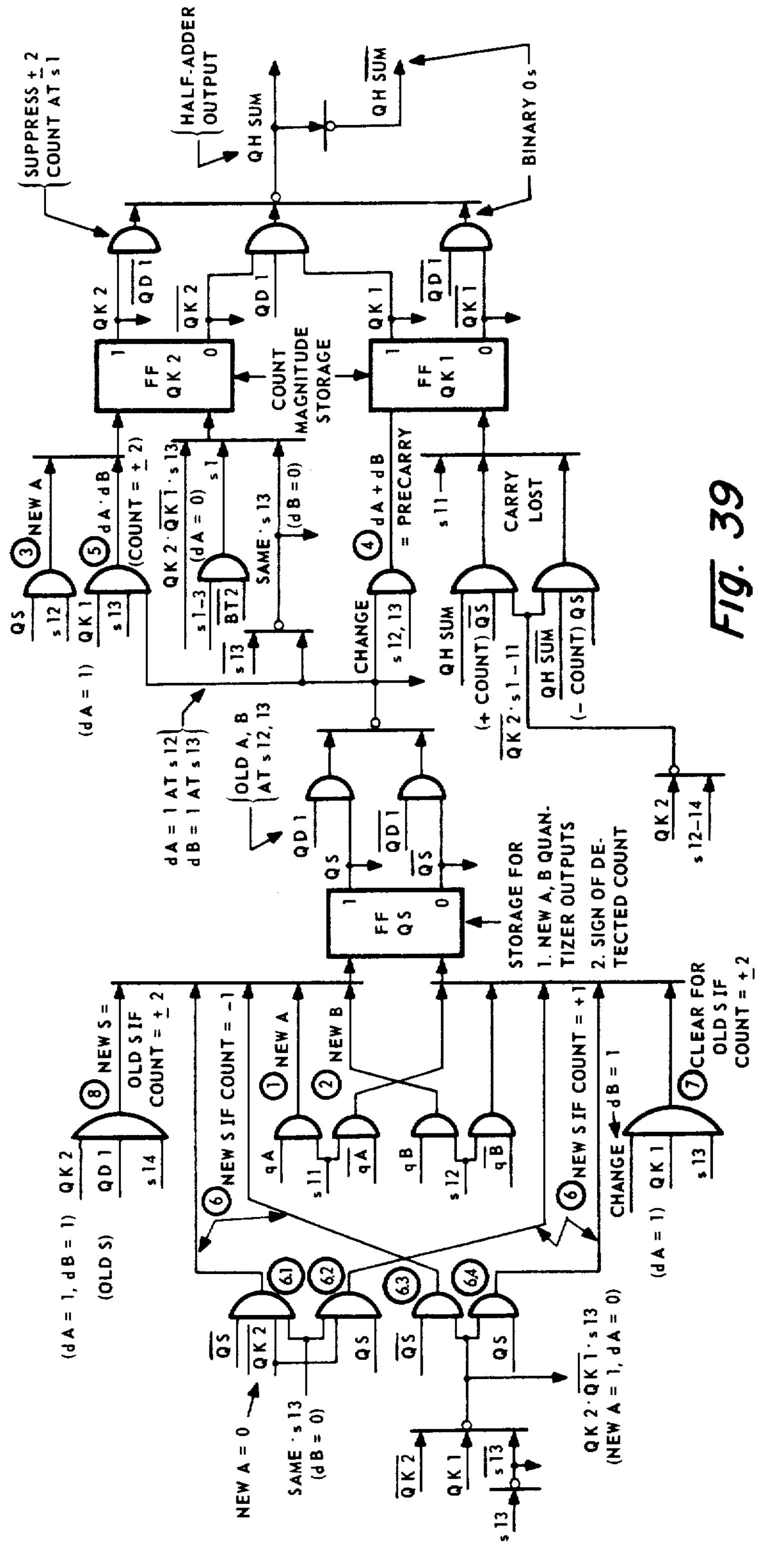
Figure 40:
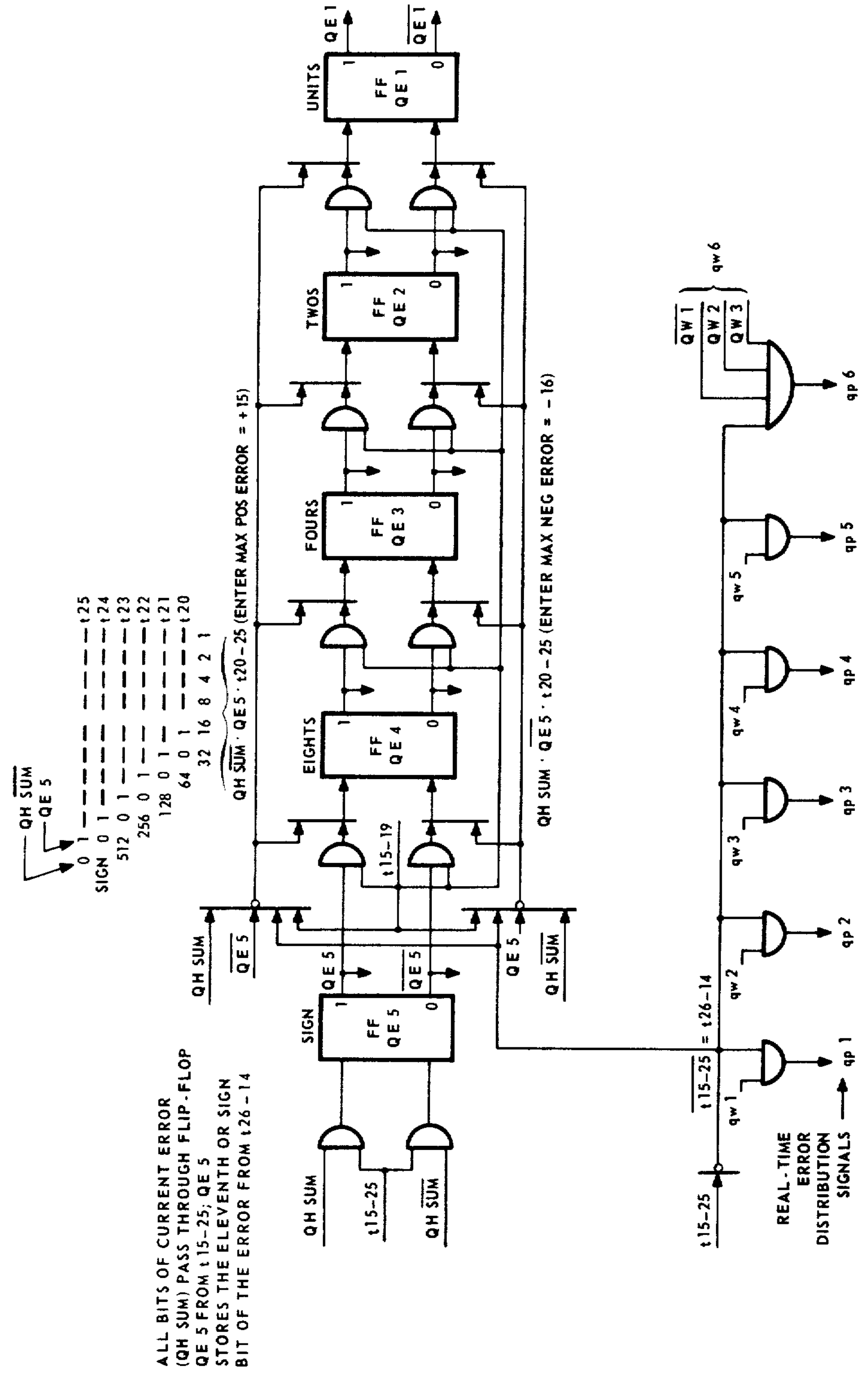
Figure 41:
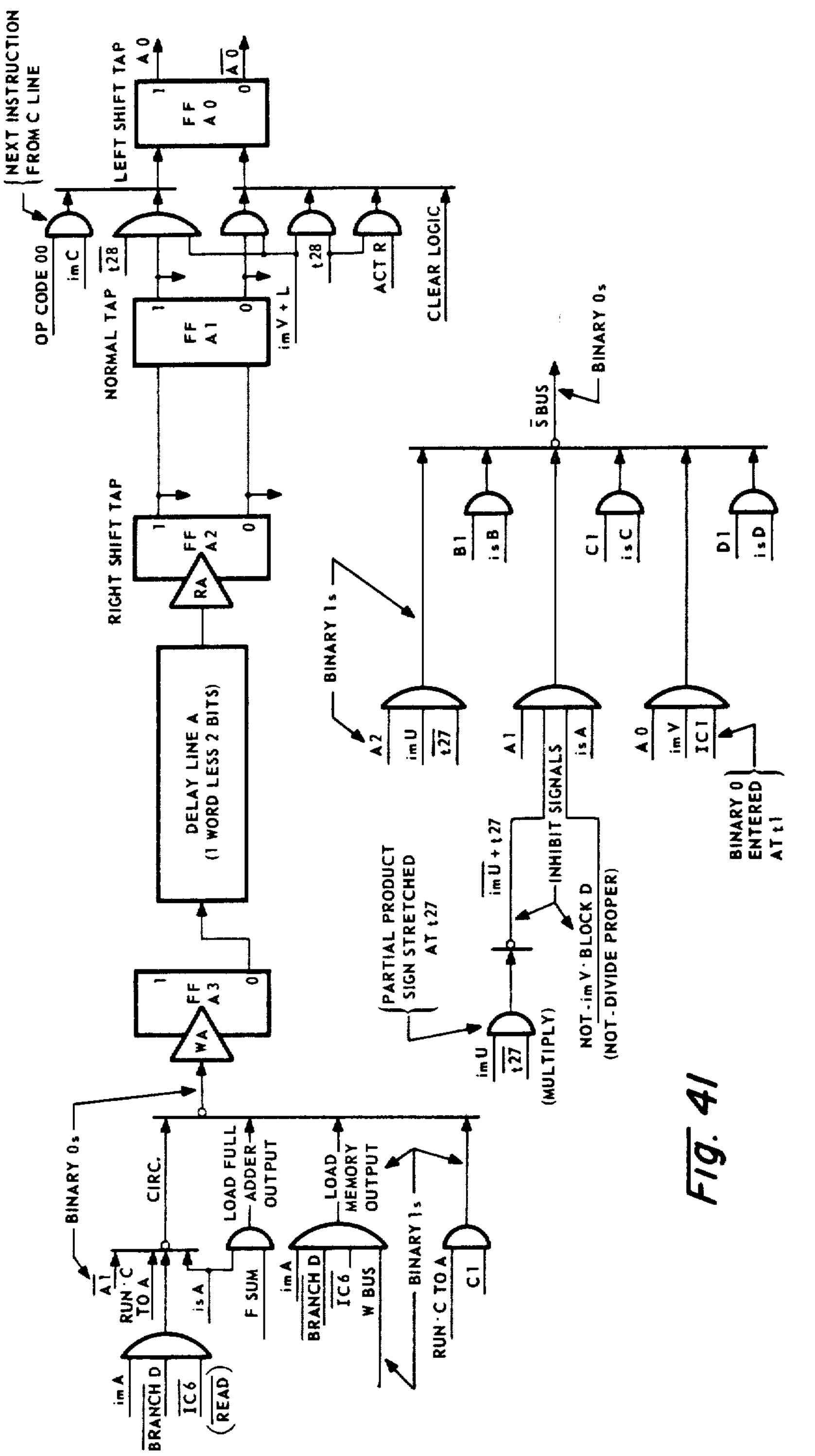
Figure 42:
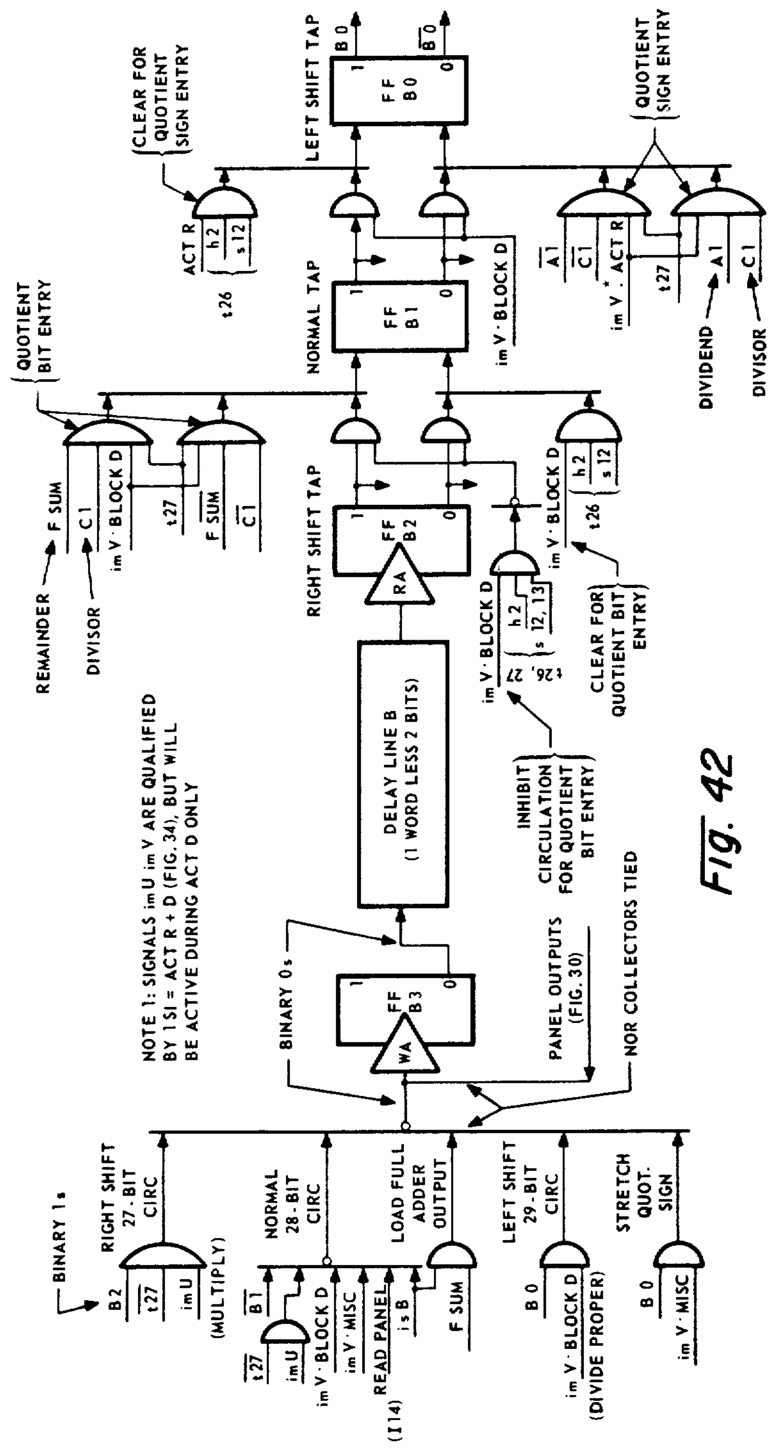
Figure 43:
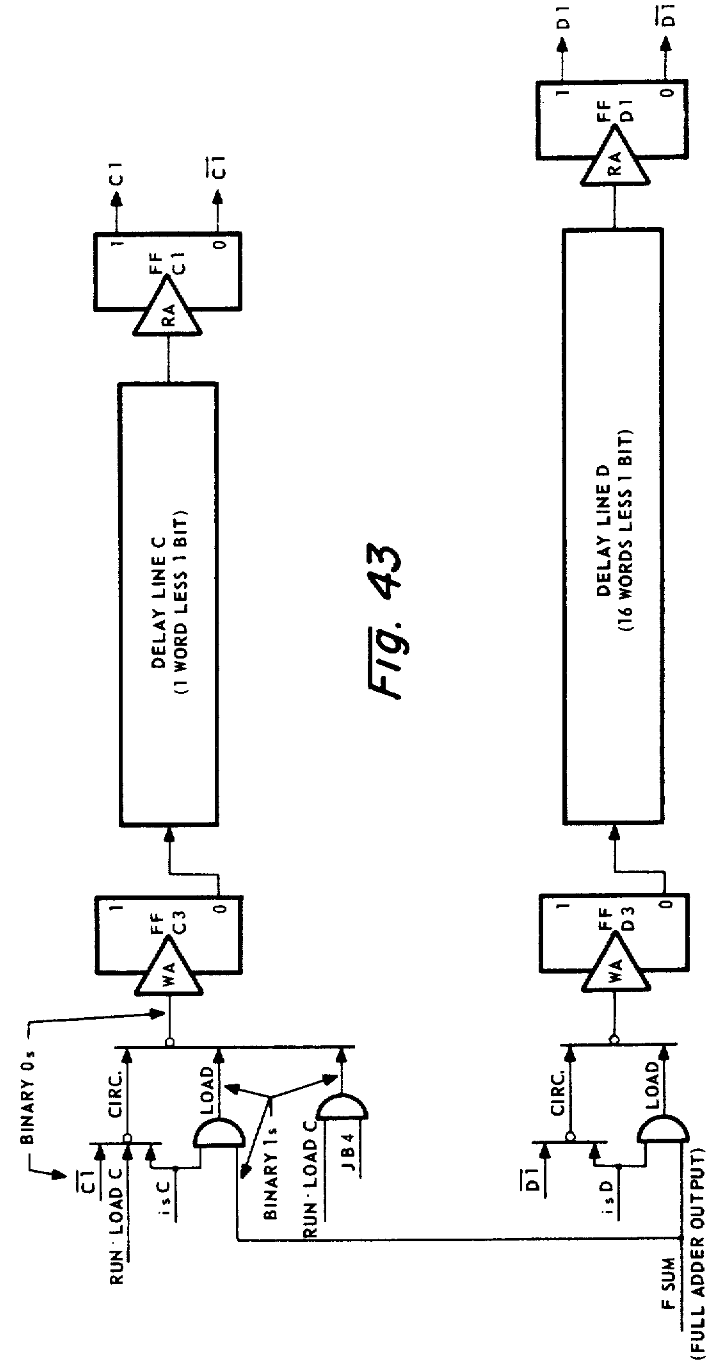
Figure 44:
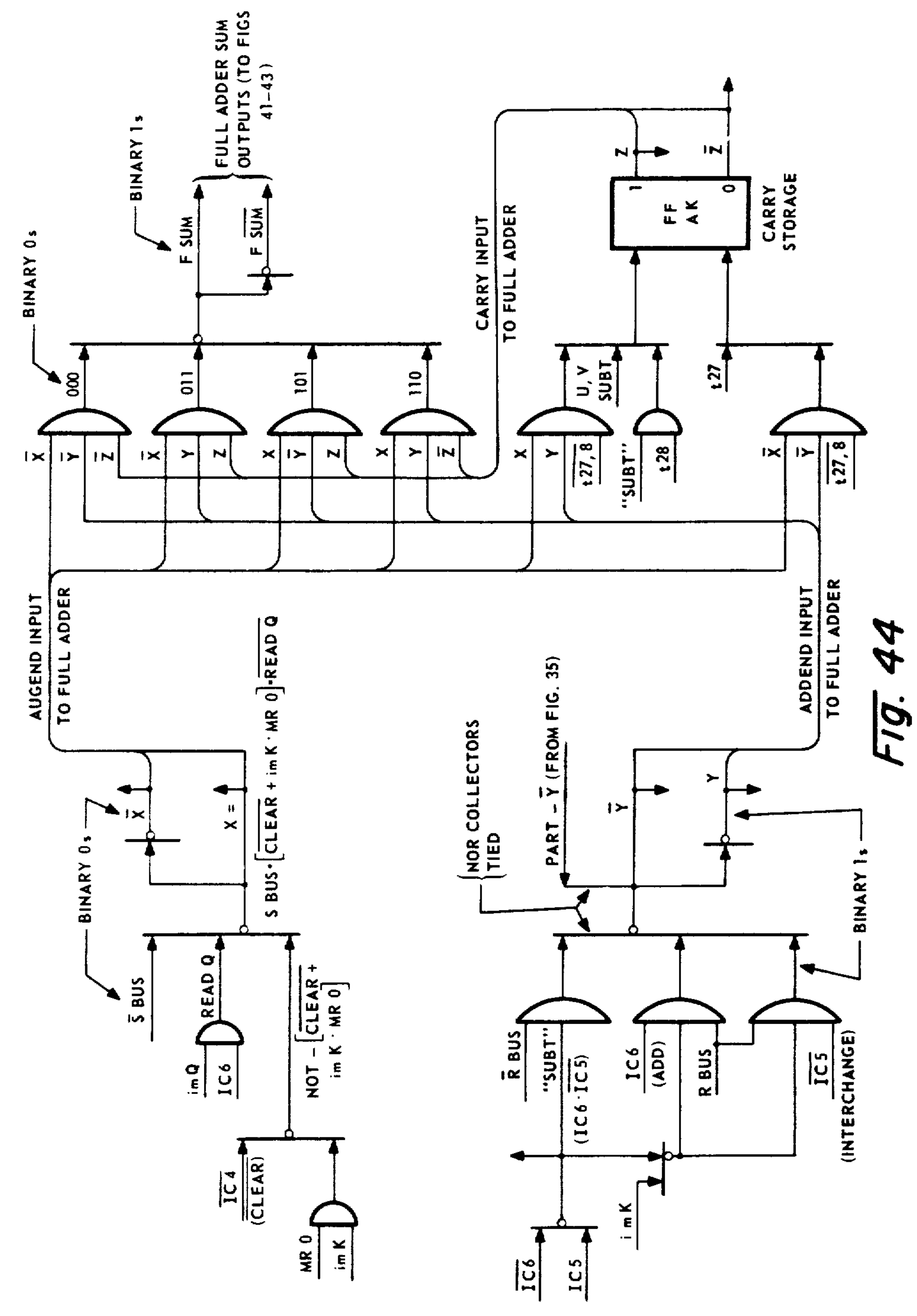

FIGURES 15*a*–15*c* are charts showing the instruction state timing single word active;

FIGURES 16*a*–16*c* are charts showing the instruction state timing with multiple word active;

FIGURE 17 is a chart showing display state timing;

FIGURE 18 is a chart showing tape state timing;

FIGURES 19*a*–19*e* are charts showing examples of tape data transfers;

FIGURES 20*a*–20*c* are charts showing examples of real-time data transfers;

FIGURE 21 is a diagram of the basic timing counter;

FIGURE 22 is a diagram of the basic timing signals;

FIGURE 23 is a diagram of the operation code register;

FIGURE 24 is a diagram of the line code registers;

FIGURE 25 is a diagram of the I line loading circuitry;

FIGURE 25*a* is a timing chart for I line loading;

FIGURES 26*a*–26*d* are diagrams showing I line controls and having an explanatory table;

FIGURE 27 is a diagram showing the instruction state counter;

FIGURES 28*a*–28*c* are diagrams showing the circuitry for miscellaneous instruction signals;

FIGURE 29 is a diagram showing start-halt controls;

FIGURES 30*a* and 30*b* are diagrams showing viewer panel input-outputs circuitry;

FIGURE 31 is a diagram showing tape and display buffer circuitry;

FIGURES 32*a*–32*d* are diagrams showing tape punch and display input circuitry;

FIGURES 33*a*–33*c* are diagrams showing the buffer state counter and an explanatory table;

FIGURE 34 is a diagram showing memory line decoding circuitry;

FIGURES 35*a* and 35*b* are diagrams showing memory circuits;

FIGURE 36 is a diagram showing quantizer selection circuitry;

FIGURES 37*a* and 37*b* are diagrams showing Q line loading circuitry;

FIGURE 38 is a diagram showing the square wave outputs from a motion command quantizer;

FIGURE 39 is a diagram showing Q line control circuitry;

FIGURES 39*a*–39*c* are explanatory charts for FIGURE 39;

FIGURE 40 is a diagram showing Q error register circuitry;

FIGURE 41 is a diagram showing A register circuitry;

FIGURE 42 is a diagram showing B register circuitry;

FIGURE 43 is a diagram showing the C and D register circuitry;

FIGURE 44 is a diagram showing a full adder and two selectors circuitry; and

Figure 45:
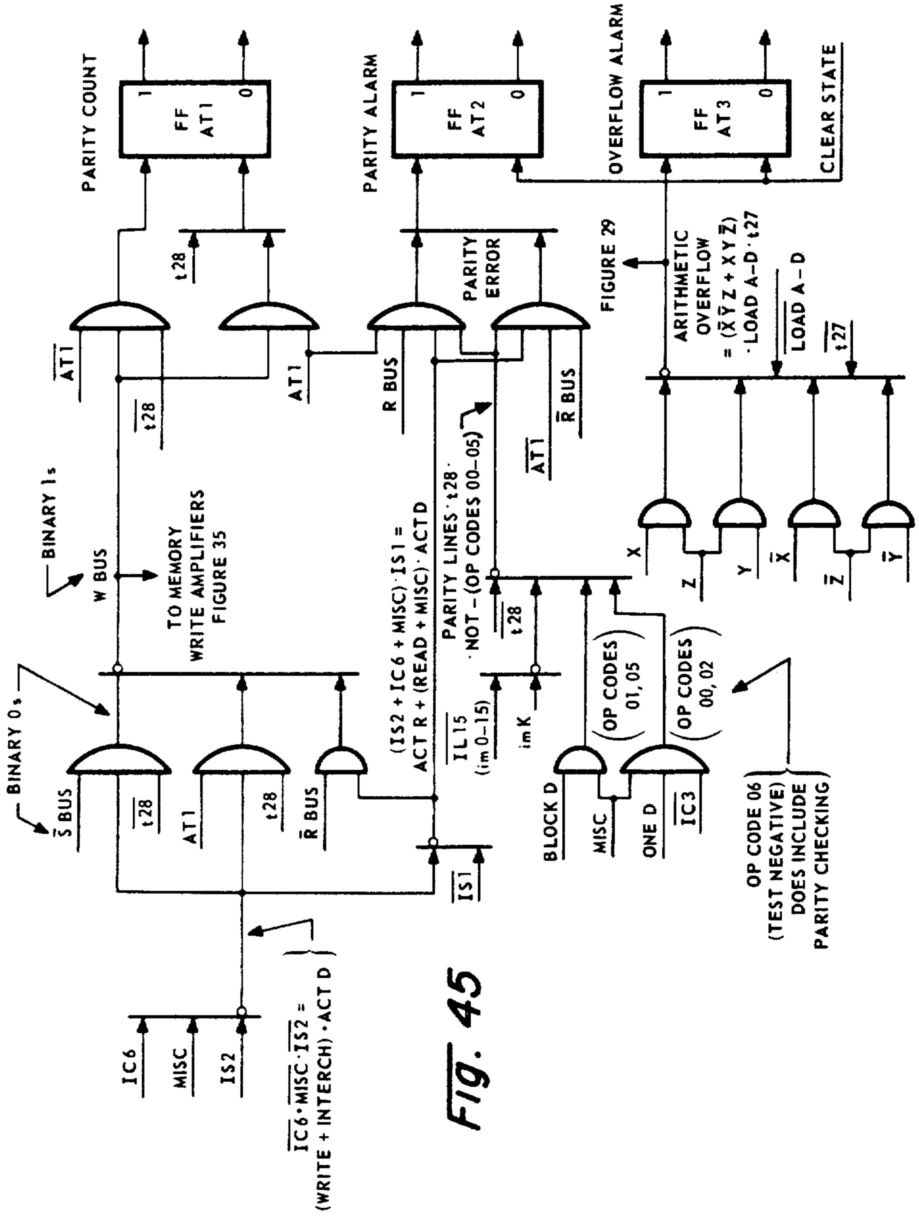

FIGURE 45 is a diagram showing write and error circuits.

The description of this computer will proceed with a general discussion of the computer structure and those functions it is capable of with reference to detailed annotated figures and tables to explain and show the detailed operation and structure of each of the circuit portions. These tables and figures are self-explanatory and will afford insight to the innermost details of this computer. Table 12 appears at the end of the specification and is intended as an aid for readily determining the meaning of the symbols used in the drawings. Other tables are likewise intended to aid in determining the meaning of the drawing symbols.

Figure 1:
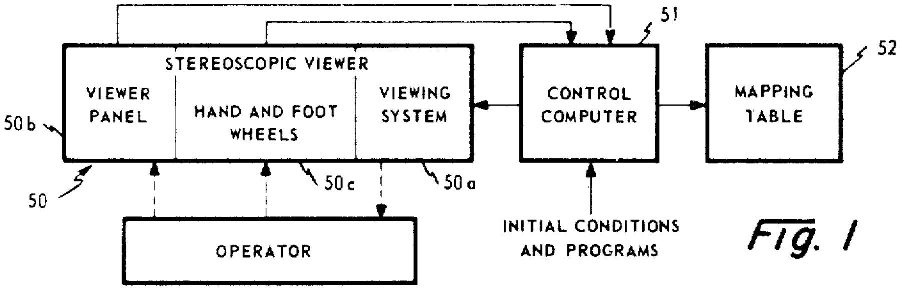
FIGURE 1 is a simplified block diagram of a stereoplotter system with which the computer of this invention may be used.

This invention is adapted to be used in an analytical stereoplotter which is a photogrammetric plotting system designed to generate precision maps from convergent as well as vertical aerial photographs. As shown in the simplified block diagram of FIGURE 1, the stereoplotter consists of three major items: a stereoscopic viewer 50, a control computer 51, and a mapping table or coordinatograph 52.

As indicated in the figure, the stereoscopic viewer includes a viewing system **50*a* and two types of operator controls, the viewer panel 50*b* and the hand and foot wheels 50*c*. The viewer panel 50*b* is used in orienting two photographs so that the operator may observe a stereo-model of like photo areas in the viewing system 50*a*. The hand and foot wheels 50*c*** are used to bring new photo points to the center of the operator's field of view and, also, to cause corresponding motion of the coordinatograph stylus across a map.

The control computer provides the link between the operator's controls and the mechanical motions within the viewer and the coordinatograph 52. The computer link essentially forms a mathematical or analytical simulation of the original photographic situation which replaces the complete physical simulation required in conventional analog stereoplotters. In addition, the mathematical formulation includes error corrections for optical characteristics and other factors which are almost impossible to achieve in analog plotters.

The computer communicates with the viewer and the coordinatograph by means of electrical input and output signals. Initially, input signals derived from manually operated switches at viewer panel **50*b* are processed by the computer in accordance with internally stored orientation programs. These programs produce output signals which control the photo and optical motions within the viewer 50** and establish a stereo-model. During and after orientation, input signals derived from the hand and foot wheel motions are processed by the computer's real-time programs. The real-time programs produce output signals for controlling (1) the photo and optical motions which determine the photo area being viewed and (2) the motions of the coordinatograph stylus over a chart.

*General organization of the computer*

Figure 2:
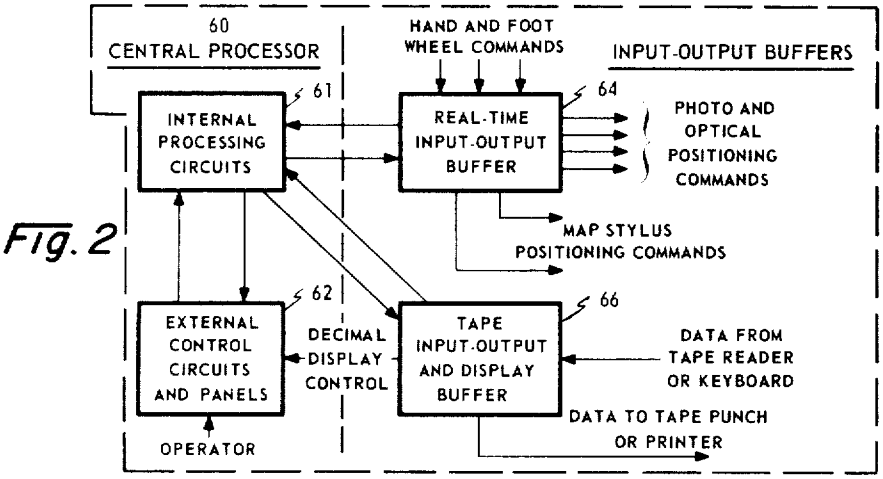
FIGURE 2 is a simplified block diagram of the general control computer of this invention.

A simplified block diagram of the control computer is shown in FIGURE 2. As indicated by the dashed line, the various parts of the computer fall into two functional groups: (1) the central processor 60, consisting of internal processing circuits 61 and external control circuits and control panels 62, and (2) the input-output buffers 63, which have a real-time buffer 64 and a punched paper tape, and a numerical display buffer 66.

The central processor of the computer is a digital electronic data processor, organized along the lines of general-purpose type computers and operating in a fixed-point binary serial mode. As indicated by the simplified block diagram in FIGURE 3, the central processor 60 has four main subdivisions: (1) an internal memory for data storage, together with memory accessing circuits 68, (2) arithmetic registers and circuits for storing and manipulating numerical data 70, (3) an instruction register and associated circuits 72 for storing and interpreting instruction data; and (4) control logic and panels 74 for internal and external supervision of computer operation.

The memory portion of the central processor consists of a number of cyclic delay lines, each containing 256-word locations. Each word location may store numerical data or a computer instruction. The word length for both types of information is 27 bits plus a twenty-eighth parity bit. The memory is provided with nine 256-word delay lines. However, the computer's word-addressing structure will permit the memory to expand to a total of 24 such lines.

The arithmetic registers and circuits store and manipulate numerical words. Each numerical word includes 26 magnitude bits, a twenty-seventh sign bit and the twenty-eighth parity bit. Negative numbers are stored in twos-complement form. Binary serial operations built into the arithmetic circuits include addition, subtraction, multiplication and division.

The instruction register and associated circuits 72 store and interpret instruction words. Each instruction word includes: an operation code, a complete operand address, a partial next-instruction address, and the parity bit. The partial address is included as a programming aid for reducing access times to the long memory lines.

The remaining portion of the central processor contains the control logic and panels 74. The control logic includes circuits both for internal and external control. The internal control circuits **74*a*** supervise the sequencing of instructions and their elementary parts. Operations which are supervised include the arithmetic operations already mentioned and also various types of data transfers and conditional branching.

The external control circuits 62 and two control panels are provided for visually monitoring and manually altering computer operation. The computer panel of circuit 62 is intended for initial loading of the computer's memory, for the entry and display of words in binary form, and for general maintenance.

Returning to FIGURE 2, the computer includes two input-output buffers 64, 66 which operate independently of each other. Buffer 64 operates in "real-time," that is, it must respond to input commands from the operator and must update output commands to the stereoplotter without delaying stereoplotter operation noticeably. Buffer 66 controls the display of a decimal number at the viewer panel unless it is involved in handling punched-paper-tape characters.

The input-output buffers 64, 66 of the computer also operate independently of the central processor 60, unless the latter is executing an input-output instruction. During the execution of such an instruction, the operation of the selected input-output buffer is modified in order to permit input or output data to be transferred to or from the internal processing circuit 61. However, the selected buffer normally goes back to independent operation as soon as the instruction has been executed. The functions of these buffers are outlined briefly here and in more detail later in the description.

The input data stored in the real-time input-output buffer 64 represent accumulated input data such as hand and foot wheel commands of a photogrammetric system. The output data stored in this buffer 64 represent total motion increment as determined by program in response to input data in the location of the photos, optics and stylus. Input and output quantities are stored as eleven-bit signed binary numbers in separate serial registers. Each unit increment represents a two-micron motion, so that the largest input or output that can be stored is somewhat larger than two millimeters in magnitude disregarding sign.

The real-time input-output buffer 64 will continue to receive and accumulate input commands from, and return position error data to, points outside the computer whether or not the central processor 60 is executing real-time input or output instructions. However, each time a real-time quantity is transferred to or from the internal processing circuits 61, the real-time buffer will decrease or increase, respectively, the contents of the appropriate register by the quantity transferred.

In normal operation, the tape input-output and display buffer 66 controls the decimal display of photogrammetric data at the viewer panel 51*b*. One seven-digit decimal number with sign may be displayed at a time. Prior to display, the number must be converted from binary form to absolute-value and binary-coded-decimal form and stored in a specific way in the computer's memory. This is accomplished in the internal processing circuits 67 which will execute the appropriate conversion routine if requested by manual signals received from the viewer panel 51*b*.

Normal display operations of the tape and display buffer 66 may be interrupted at any time by the central processor 60. If the latter executes a punch-tape instruction, display operations will stop, the tape and display buffer 66 will accept a seven-bit character from the internal processing circuits 67, will control one 65-millisecond tape punch cycle and then return to the normal display function.

If a series of read-tape instructions are executed, decimal display operations will be suspended until a special last-read-tape instruction is executed. In this case the tape and display buffer 66 will control a number of 65-millisecond tape reader cycles, during each of which a character read from tape is transferred to the intenal processing circuits 67.

Tape punching and reading operations are handled at two stations which are integral parts of an electromechanical typewriter furnished with the computer. Manually operated switches mounted on the typewriter and the computer panel 74 are arranged to give the following input-output options: keyboard data entry rather than tape reading; page printing instead of, or in addition to, tape punching. With minor alterations in the tape and display circuitry, the present mechanical tape reader could be replaced by a much faster (200–400 c.p.s.) photoelectric tape reader.

All computer circuits in this invention are of solid-state electronic type except for peripheral equipment such as panel switches and lamps and the typewriter circuits. All solid-state circuits are mounted on replaceable etched-circuit cards and operate at a three-megacycle clock rate. Logic functions are performed by diode AND gates and diode-transistor NOR gates used in a ratio of approximately two to one. Short storage registers and the control counters are realized with diode-transistor flip-flops driven by diode OR input gates. (All AND, NOR, and OR gates are considered active for positive-going logic input signals.) Bulk storage in the computer is provided by means of magnetostrictive delay lines. Details on the various types of electronic circuits included in the computer are described later in the description.

*Central processor 60*

Figure 3:
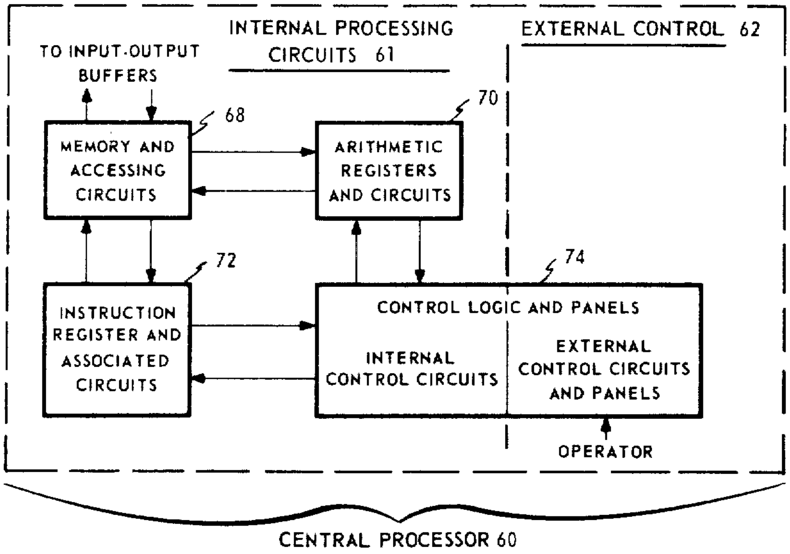
FIGURE 3 is a simplified block diagram of the central processor of this computer.

As already mentioned, FIGURE 3 indicates the four main parts into which the central processor 60 of the computer is divided. These four subdivisions are: (1) the memory and its accessing circuits 68, (2) the arithmetic registers and circuits 70, (3) the instruction register and its associated circuits 72, and (4) the control logic and panels 74. These four parts are described later in more detail.

*Memory and accessing circuits*

Figures 4, 5:
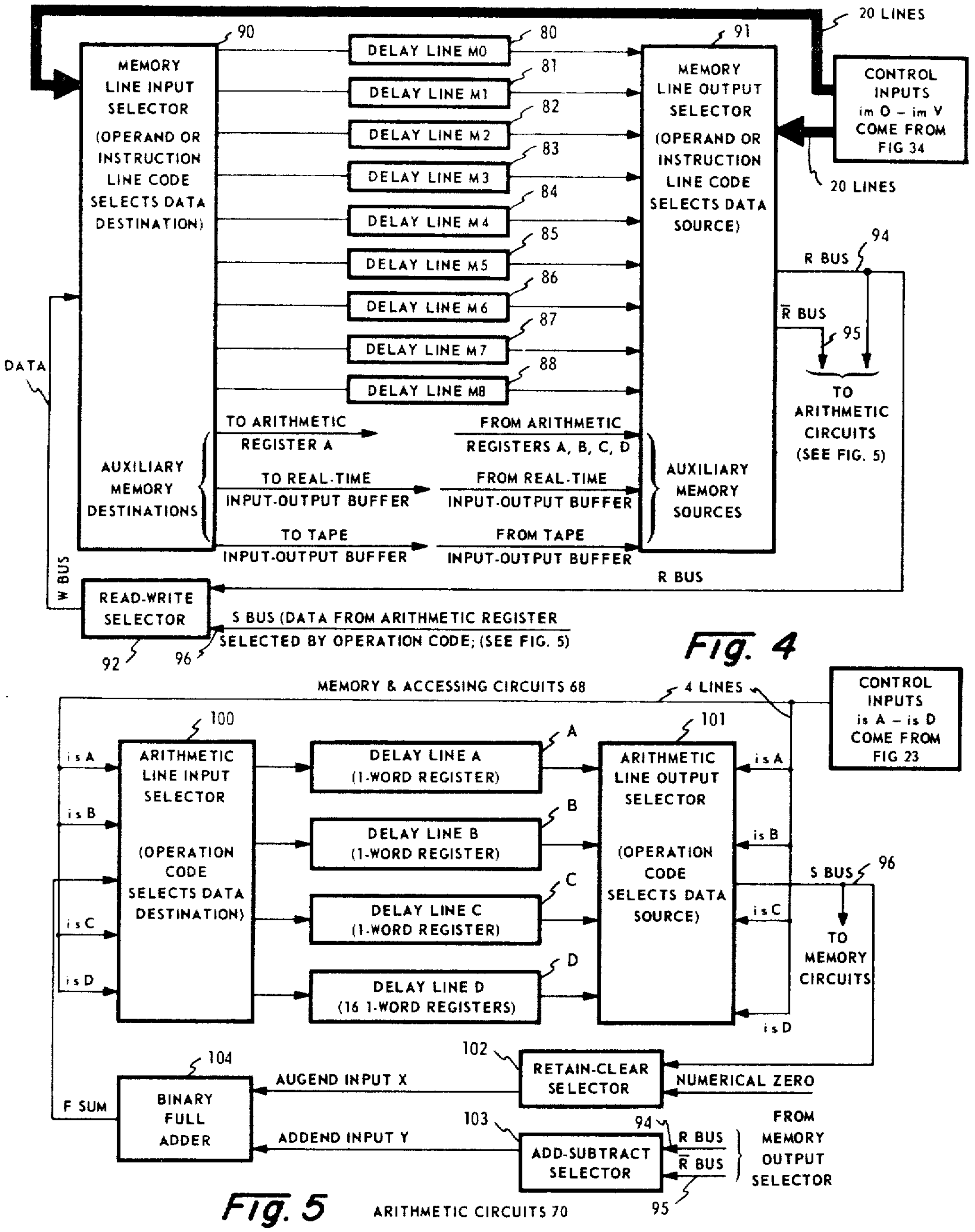
FIGURE 4 is a functional block diagram of the memory and accessing circuits.
FIGURE 5 is a functional block diagram of the arithmetic registers and circuits.

FIGURE 4 is a functional block diagram of the central processor's memory and accessing circuits. The figure shows a number of serial storage elements 80–88 and three types of selection or switching circuits 90–92.

Each storage element 80–88 of the computer's memory is a magnetostrictive delay line capable of serially storing 256 28-bit words of data. The memory at present contains nine such delay lines, but the computer's addressing structure will permit up to 24 256-word lines to be included. Each delay line 80–88 is equipped to recirculate its contents indefinitely. The input and output amplifiers and the resynchronizing circuits necessary to accomplish this (not shown in FIGURE 4) are indicated schematically on logic diagram of FIGURE 35.

Figure 6:
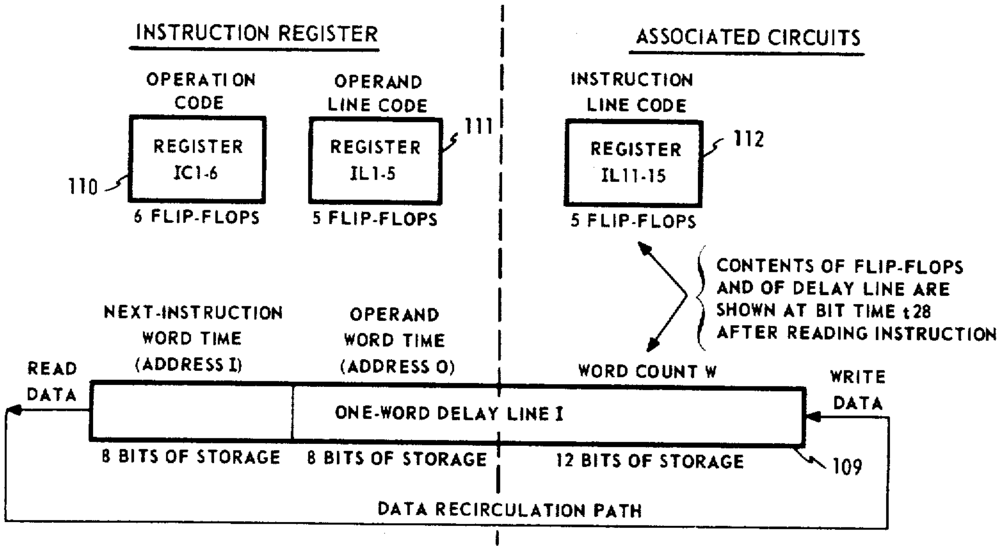
FIGURE 6 is a block diagram showing locations of data stored in the instruction register and its associated circuits.

The switching circuits shown in FIGURE 4 include the memory line input selector 90 and memory line output selector 91 and the read-write selector 92. Logic details of the first two selectors are found on logic diagrams of FIGURES 34 and 35 and of the third on diagram of FIGURE 45. These switching circuits 90–92 are activated by control signals (not shown in FIGURE 4) which are received from the instruction register and its associated circuits 72. The memory line input and output selectors 90, 91 are controlled by the operand or instruction line code signals from the active line code register IL11–15 (FIGURE 6). The read-write selector 92 is controlled by operation code signals from register IC1–6 (FIGURE 6).

Each time the memory line input and output selectors 90, 91 are activated by line code signals, the input selector 90 will break the normal recirculation path of the one delay line 80–88 selected for memory access. At the same time, the output selector 91 will connect the output of the selected line to the R bus 94, and the inverse signal or binary ones-complement will appear on the Not-R bus 95. The signals on these two busses 94, 95 are transmitted to the arithmetic circuits (FIGURE 5) for manipulation there. The data on the R bus 94 are sent to the read-write selector 92 also.

If the operation code signals call for data to be read from memory but not new data written into memory, the data on the R bus 94 are effectively recirculated. This is done by passing the data through the read-write selector 92 and the memory line input selector 90 back to the selected delay line in the memory. However, if the operation code signals call for new data to be written to memory, the read-write selector 92 will switch from the R bus 94 to the S bus 96. The data on the S bus 96 originates in one of the arithmetic registers (FIGURE 5). These data are then passed through the two selectors 90, 91 and written in the selected delay line 80–88 in the memory, where these data replace the data read out.

As indicated in FIGURE 4, the memory line output 91 and input selectors 90 may be switched to a number of auxiliary memory sources and destinations, respectively. The auxiliary sources are the arithmetic registers A, B, C and D (FIGURE 5) and the real-time 64 and tape input-output buffers 66. The auxiliary destinations are register A and both input-output buffers 64 and 66. Both the arithmetic registers A, B, C and D and the input-output buffers 64 and 66 are accessed by read- and write-type instructions as if they were ordinary 256-word memory lines. The logic circuitry for reading from the auxiliary memory sources is shown on diagram in FIGURE 35. The logic for writing to the auxiliary memory destinations is shown on diagrams in FIGURES 31, 37 and 41, where the data to be written are tapped from the S bus 96, F sum, and W busses, respectively.

Treating the arithmetic registers A, B, C and D and the input-output buffers 64 and 66 as auxiliary memory locations is a way of providing for direct communication among the arithmetic registers and, also, between the registers and the input-output buffers. The data transfers involved could be implemented in other ways, but treating them as special cases of reading from, and writing to, the memory has led to a logic realization with a minimal number of components. Examples of some of the possibilities of direct transfers among the arithmetic registers are listed in Table 1 below.

circulate just one word of data each. The fourth line, the D line, recirculates sixteen words of data. The one-word storage locations in the first three arithmetic lines are called the A, B and C registers, respectively. Each of the sixteen one-word storage locations of the fourth arithmetic line is called a D register.

The selection circuits in the arithmetic section 70, just as those for the memory, are activated by control signals which are received from the instruction register and its associated circuits 72. For example, the arithmetic line input and output selectors 100, 101 are activated by control signals received from flip-flops IC2 and IC3 in the operation code register, shown in FIGURE 23. Which of the four arithmetic lines is accessed by the input and output selectors 100, 101 is determined by the particular combination of bits stored in these two flip-flops IC2, IC3.

If the arithmetic line input and output selectors 100, 101 are activated, the normal recirculation path of the selected delay line A–D is broken. The output of the selected line A–D will be connected to the S bus 96 by the output selector 101. The data on the S bus 96, if not suppressed by the retain-clear selector 102, will form the augend input to the full adder 104 (see logic diagram of FIGURE 44). The addend input to the full adder 104 is supplied by the add-subtract selector 103 which passes either the memory output data on the R bus 94 or its complement on the Not-R bus 95. The sum output of the full adder 104 is returned to the selected register A–D to replace the data read from it.

The add and substract forms of read-type instructions will activate both the retain-clear and add-substract selectors 102, 103 shown in FIGURE 5. The resulting full adder sum will have four possible values according to whether the numerical word read from the selected memory source is added to or subtracted from (1) the contents of the selected arithmetic register A–D or (2) the number zero. For example, the clear-and-subtract instruction will subtract the number read from memory from the number zero, that is, the full adder 104 sum will be the negative of the number read from memory. In each case, the resulting full adder 104 sum will be stored in the selected arithmetic register A, B, C or D. Details on individual instructions are given infra.

TABLE 1.—EXAMPLES OF DATA TRANSFERS BETWEEN ARITHMETIC REGISTERS A AND B
[Assume that A initially contains the number a and B the number b]

| Instruction | | Transfer classification of (and method of selecting) | | Final contents of— | |
|---|---|---|---|---|---|
| Example | Type | Register A | Register B | Register A | Register B |
| 1. Retain A—add b to A | Read | Arithmetic register destination (specified by operation code). | Auxiliary memory source (specified by operand line code). | a+b | b |
| 2. Clear A—add b to A | Read | Arithmetic register destination (specified by operation code). | Auxiliary memory source (specified by operand line code). | b | b |
| 3. Store b to A—retain B | Write | Auxiliary memory destination (specified by operand line code). | Arithmetic register source (specified by operation code). | b | b |
| 4. Store b to A—clear B | Write | Auxiliary memory destination (specified by operand line code). | Arithmetic register source (specified by operation code). | b | zero |
| 5. Interchange A, B | Write | Auxiliary memory destination (specified by operand line code). | Arithmetic register source (specified by operation code). | b | a |

*Arithmetic registers and circuits 70*

The functional block diagram of the computer's arithmetic registers and circuits 70, shown in FIGURE 5, is very similar to the preceding diagram in FIGURE 4 of the memory and accessing circuits. As before, there are a number of serial storage elements, delay lines A, B, C and D, storage input and output selectors 100, 101, and a two-way selector 102, 103 for passing data from the output selector 101 or substituting other data. However, in this case, a full adder 104 intervenes to process data for the input selector 100 and both of the full adder's 104 inputs are controlled by two-way selectors 102, 103. Logic details on the arithmetic registers and circuits are found on diagrams in FIGURES 41–45.

Each storage element, lines A, B, C and D, in the computer's arithmetic section is a magnetorestrictive delay line equipped with input and output amplifiers and resynchronizing circuits for recirculating data indefinitely, just as in the memory section. However, the number of arithmetic delay lines is limited to four and each line is much shorter than the 256-word lines of the memory. Three of the arithmetic lines, the A, B and C lines, re- The right- and left-shift instructions and, also, the multiply and divide instructions are special forms of read-type instructions which are distinguished from the normal forms of these instructions by operand line codes which do not refer to any actual memory lines. However, these specially assigned line codes are used to modify data transfer paths to and from various arithmetic registers A–D and so may be thought of as specifying auxiliary arithmetic and memory sources and destinations for the operands involved.

The line codes which specify the right- and left-shift instructions serve to shorten and lengthen, respectively, the normal recirculation path through the A register by one bit position. They control selection of memory line output selector 91 so that flip-flop A2 or A0, shown in FIGURE 32, respectively, is tapped rather than the normal A-register tap, flip-flop A1 (see FIGURES 35, 41 and 44). The selected data becomes the addend input to the full adder 104, bypassing the R bus 94 and the add-subtract selector 103 in these cases. The data is added to the number zero by the full adder 104 and the sum output is returned to register A by the memory line input selector 90.

Similarly, the line codes which specify the multiply and divide instructions are used to modify the normal recirculation paths of the A and B registers. A summary of the command signals energized by the multiply and divide line codes, and the events controlled by the signals, is shown in connection with timing diagram 4 on logic diagram in FIGURE 16. The corresponding data paths are shown on logic diagrams in FIGURES 41, 42 and 35. The arithmetic procedures necessary to implement the multiply and divide instructions are summarized in the next two paragraphs.

In multiplication, a procedure of repeated additions and shifts is followed. The product is formed by repeatedly adding zero or the multiplicand read from the C register to the partial product being accumulated in the A register. Control by which addition is performed is provided by the successive multiplier bits read from the B register. Both the A and B registers are shifted from one bit position each word time the multiply instruction is active. The above procedure is altered during the last active word time if the multiplier is negative (that is, if binary 1 is read last from the B register). In that case, the multiplicand is subtracted from, rather than added to, the partial product already accumulated in the A register.

In division, a nonrestoring procedure of repeated additions or subtractions and shifts is followed. The dividend read from the C register is repeatedly added to or subtracted from the current remainder (originally dividend) being calculated in the A register. Control for adding or subtracting and, at the same time, forming the quotient one bit at a time in the B register, is provided by comparing operand signs. Both the A and B registers are shifted left one bit position each word time the divide instruction is active, except for the last word time. During the last word time, the remainder is restored, if necessary.

The word length used in the arithmetic registers A–D is the same as that in the memory, 27 bits plus a twenty-eighth parity bit. When a word stored in an arithmetic register A–D is written in a 256-word memory line, a parity bit is calculated and written so that the total number of binary 1s in the 28-bit word as stored in the memory will be odd (see FIGURE 45). When the word in memory lines 80–87 is transferred back to an arithmetic register A–D, the parity of the word is checked. The parity bit is intended as a transfer check on data stored in the long memory lines. However, the parity of words transferred or manipulated within the arithmetic section is ignored. Also, the programmer has no access to the twenty-eighth or parity-bit position of words, so that the word length in the arithmetic registers A–D and in the memory effectively is 27 bits.

The arithmetic circuits 70 may manipulate either numerical data or instruction words. Numerical words consist of 26 magnitude bits and a sign in bit position 27. For the numbering of the bit positions in a word, see diagram in FIGURE 19. Positive numbers are stored in absolute-value binary form while negative numbers are stored in twos-complement binary form. Instruction words comprise four binary numbers, also totaling 27 bits disregarding the parity bit. Instructions are manipulated in the arithmetic circuits as if they were ordinary numerical words. Details on the instruction word format are presented in the following section.

*Instruction register and associated circuits 72*

A block diagram of the instruction register and its associated circuits appear in FIGURE 6. The instruction register 109 stores the four binary numbers which make up a 27-bit instruction word. The twenty-eighth bit used for parity checking is not stored. Two of the four members, the operation code and the operand line code, are stored in flip-flop registers 110, 111. The other two numbers, the operand and next-instruction word times, are stored in delay line I 109. The associated circuits store two more binary numbers, totaling an additional 17 bits of information. One of these numbers, the instruction line code, is stored in a flip-flop register 112. The other number, the word count, is stored in delay line I 109. The flip-flop registers 110–112, delay line I 109 and related control circuits are shown in detail on diagrams in FIGURES 23–26.

Four of the six binary numbers stored in the instruction register 109 and its associated circuits are memory addresses. These are the two line codes registers 111, 112 and the two word times register 109. The operand line code and the operand word time together form a complete operand address which specifies the memory line and the temporal word location in that line at which an operand is to be read or stored. Similarly, the instruction line code and the next-instruction word time form a complete instruction address which specifies the memory line and word location from which the next instruction is to be drawn.

Each 27-bit instruction word includes an operation code and "one and a half" addresses, the complete operand address and the word-time part of the complete next-instruction address. See FIGURE 25 for the format of instructions as stored in a memory word location. The various parts of an instruction and their storage locations just after having been read from the memory into the instruction register 109 are as follows:

(1) *operation code,* a six-bit number specifying the type of instruction to be executed and the arithmetic short line selected; stored in flip-flop register 110 (FIGURE 23);
(2) *operand line code,* a five-bit number specifying the memory line containing the operand; stored in flip-flop register 111 (FIGURE 24);
(3) *operand word time* (address O), an eight-bit number specifying the word time(s) at which the operand is to be written to or read from a memory line; stored in delay line I (FIGURE 25); and
(4) *next-instruction word time* (address I), an eight-bit number specifying the word time at which the next instruction is to be read from a memory line; stored in delay line I 109.

The information held at the same time in the storage circuits associated with the instruction register consists of the following:

(1) *instruction line code,* a five-bit number specifying the memory line from which an instruction has just been read; stored in flip-flop register 112 (FIGURE 24); and
(2) *word count W,* a 12-bit number which identifies the word time currently available for reading or writing operands or instructions; stored in delay line I 109. (Details on counting word times are given below.) The first eight bits of this number are necessary for counting the 256 individual word times in a memory cycle. The extra four bits serve to count as many as sixteen memory cycles in connection with the timing of tape punch operations.

The same logic circuits are used to select both the operand line and the next-instruction line. To accomplish this, flip-flop register 112, which is the active line code register, is used at two different times during the instruction cycle. While an instruction is being read into the instruction register 109 by other registers, the contents of register 112 will be selecting the appropriate instruction line. Before selecting the operand line called for by the new instruction, the contents of registers 111 and 112 are interchanged in parallel fashion during one bit time under control of the "exchange IL" signal (see FIGURES 24 and 27). Then, after selecting the operand line called for and completing the instruction, but before reading the next instruction, the contents of the two registers 111, 112 are once again exchanged.

This procedure implies that the next instruction normally is read from the same memory line as its predecessor. The select-I-line instruction is required to begin drawing instructions from a different memory line. This instruction permits only one of the two exchanges between registers 111 and 112 to occur. The result is that the bits of this special instruction which normally serve as the operand line code become the new instruction line code.

The computer also uses common logic circuits to indicate the word times that both the operand and the next instruction are available (FIGURE 26). To accomplish this, address O is compared serially with the word count W until a match occurs. Then address I is copied and written over address O (FIGURE 25) and the serial comparison is repeated. Normally, all eight bits of each address are compared with the corresponding eight bits of the word count W until the address and the word count are found to agree, that is, until O or I equals W modulo-256.

The address O is compared with the word count W or not, according to whether the instruction is single-type or block-type. These two types are identified by whether the operation code of the instruction is even or odd, respectively. A single-type instruction is capable of reading or writing just the single operand identified by address O. In contrast, a block-type instruction is capable of reading or writing a block of operands in the word times immediately following the word time in which the instruction was read. The address O of a block-type instruction is set to equal to the number *n* of word times the instruction is to be active. The number *n* is not compared with the word count W, but is reduced by one in each active word time until the number equals zero (FIGURE 26).

The computer has two special features which aid minimum access programming. First, whenever the next instruction is to be read from an arithmetic line (A, B, C or D registers), only the first four bits of the word address I are compared with the word count W, rather than all eight bits of I being compared. Similarly, whenever the operand of a single-type instruction is located in an arithmetic line, only the first four bits of the word address O are compared with the word count W. In other words, in these cases the computer finds the word time of the next instruction or of the operand by comparing I or O with W only until these numbers are found to be equal modulo-16, rather than modulo-256. The main advantage of this computer feature is that if a subroutine and most of its data are stored in the 16-word D line then the subroutine can be executed more than once during a 256-word memory cycle.

Second, minimum access programming is facilitated by providing one-and-one-half-address instructions rather than one-address instructions. The programmer can minimize the access times for a succession of instructions and operands, by observing the rules for assigning successive address I and O listed in Table 2. All inequalities except those defining the range of O, I and *n* are understood modulo-16 or modulo-256 depending on whether the next instruction or the operand of a single-type of instruction is or is not drawn from the A, B, C or D registers.

As an example of the use of the table, the third rule implies that if address $I_{-1}$ of the preceding instruction is, say, 97 then address O of the current instruction should be 98 or more, or if $I_{-1}$ equals 255 then O should be zero or greater. If these rules are not followed, access times may be maximized rather than maintained. For example, if $I_{-1}$ and O both equal 97, the computer will have to wait for a complete memory cycles (256 words) after reading a single-type write instruction before writing the operand to a long memory line, say line 85.

TABLE 2.—MINIMUM ACCESS RULES FOR ASSIGNING SUCCESSIVE ADDRESSES I AND O

| | |
|---|---|
| Address O | Operand word time. |
| Case 1 | Absolute address for all even operation codes (one-word active). |
| Case 2 | Relative address $O=n$ for all odd operation codes (block active). |
| Address I | Next-instruction word time. |
| Address $I_{-1}$ | Next-instruction word time of preceding instruction (time of reading current instruction). |
| Address range | $00 \leq I, I_{-1}, O, n \leq 255$. |

*Rule 1.—Operation code 00* (halt, breakpoint instructions, etc.)

$$O \text{ is not used} \qquad I \gtrsim I_{-1}+2$$

*Rule 2.—Operation codes 02 and 06* (conditional branch instructions)

$$O \gtrsim I_{-1}+2 \qquad I \gtrsim I_{-1}+3 \text{ (O, I independent)}$$

*Rule 3.—All other even operation codes* (one-word read, write, interchange instructions)

$$O \gtrsim I_{-1}+1 \qquad I \gtrsim O+1 \text{ (I dependent on O)}$$

*Rule 4.—All odd operation codes* (block-type instructions)

$$O=n \qquad I \gtrsim I_{-1}+n+2$$

*Control logic and panels 74*

Figure 7:
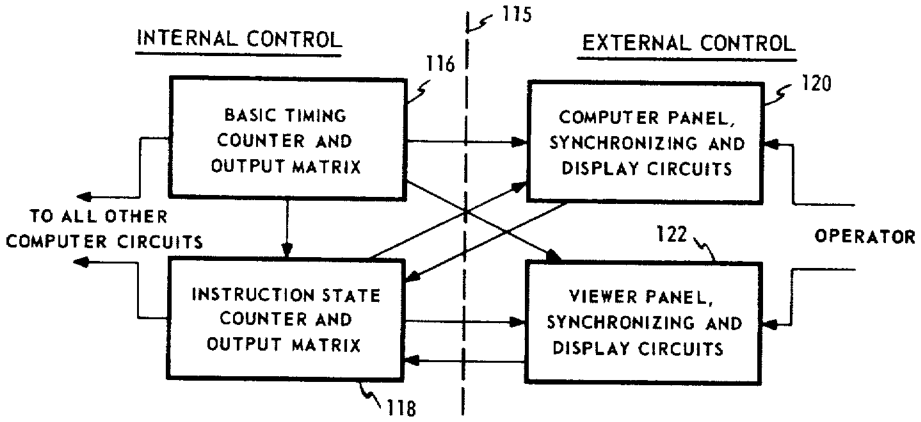
FIGURE 7 is a functional block diagram of the control logic and panels.

The control logic and panels of the central processor 60 are shown in the functional block diagram of FIGURE 7. As indicated by the dashed line 115, this part of the computer is divided into two sections, one concerned with internal computer control and the other with external control. The internal control section includes a basic timing counter 116 and an instruction state counter 118 and an output matrix associated with each counter. The external control section contains two panels 120, 122 and synchronizing and display logic associated with each panel.

The internal control counters are the basic timing counter 116 and the instruction or I state counter 118. The successive states of these counters are needed for automatically sequencing through the elementary parts of the different instructions and through the individual instructions of the various program subroutines. The output matrix associated with each control counter serves to decode the needed counter states. The detailed logic for the basic timing counter and its output matrix is found in FIGURES 21 and 22. The detailed logic for the instruction state counter and its output circuits is found in FIGURES 27 and 28.

The basic timing counter 116 consists of five flip-flops BT1–5. The first four serve to count the fourteen bit times in each half-word time. The remaining flip-flop BT5 is used to distinguish between the first and second halves of each word time. A table of the counter states occurring in each word times is shown in FIGURE 21.

Periods greater than one word time are measured by a word counter which is part of the circuitry associated with the instruction register 72. This counter comprises 12 bits of serial storage in delay line I and a half-adder (see FIGURES 25 and 26). The 12-bit number stored in line I is called the word count W. Once each word time this number W is passed through the half-adder and increased by one unit. The values 00 to 255 (modulo 256) taken by the number W are the different temporal word locations of the memory delay lines which are sequentially available for reading or writing.

Figure 14:
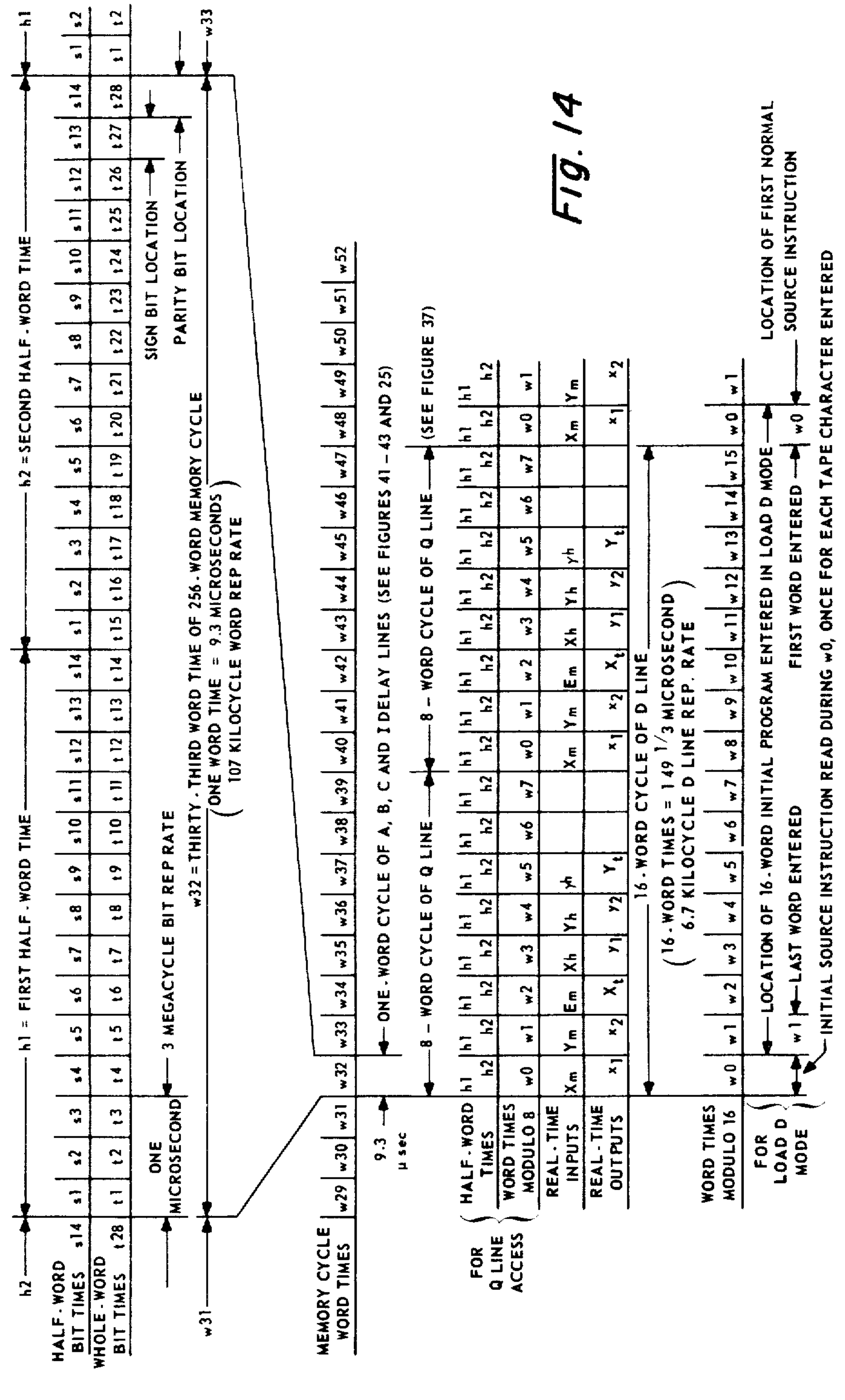
FIGURE 14 is a chart showing the basic timing cycles.

FIGURE 14 contains timing charts for a single word time (the period of the arithmetic delay lines A, B and C) and for 16 word times (the period of the arithmetic line D). Also shown is the eight-word period of the Q line which stores the half-word real-time inputs and outputs. Half-word timing is employed for operating the Q storage line and the control circuits of the real-time input-output buffer 64, but is not needed elsewhere in the computer.

The instruction state counter 118 includes two flip-flops IS1 and IS2. This counter normally cycles through four successive states as follows:

| IS2 | IS1 | State Label | Activity |
|---|---|---|---|
| 1 | 0 | Wait R | Wait to read instruction. |
| 1 | 1 | Act R | Read instruction from memory. |
| 0 | 0 | Wait D | Wait to execute instruction. |
| 0 | 1 | Act D | Execute instruction. |
| 1 | 0 | Wait R | Wait to read next instruction. |

Each counter state, if it occurs, normally lasts one or more exact word times. However, it is usually possible to bypass one or both waiting states by proper minimum access programming. For example, an addition instruction need take no more than two successive word times, one to read the instruction (during act R), and one to add an operand read from memory to the contents of the selected arithmetic register (during act D).

The instruction state counter 118 is capable of varying the sequence of states it passes through in response to each type of instruction that is read. FIGURES 15 and 16 contain timing diagrams showing the major sequence variations used by single-type instructions (even operation codes) and block-type instructions (odd operation codes), respectively. The timing diagram applying to the multiply and divide instructions also enumerates the train of events which occur when these instructions are executed.

Figure 8:
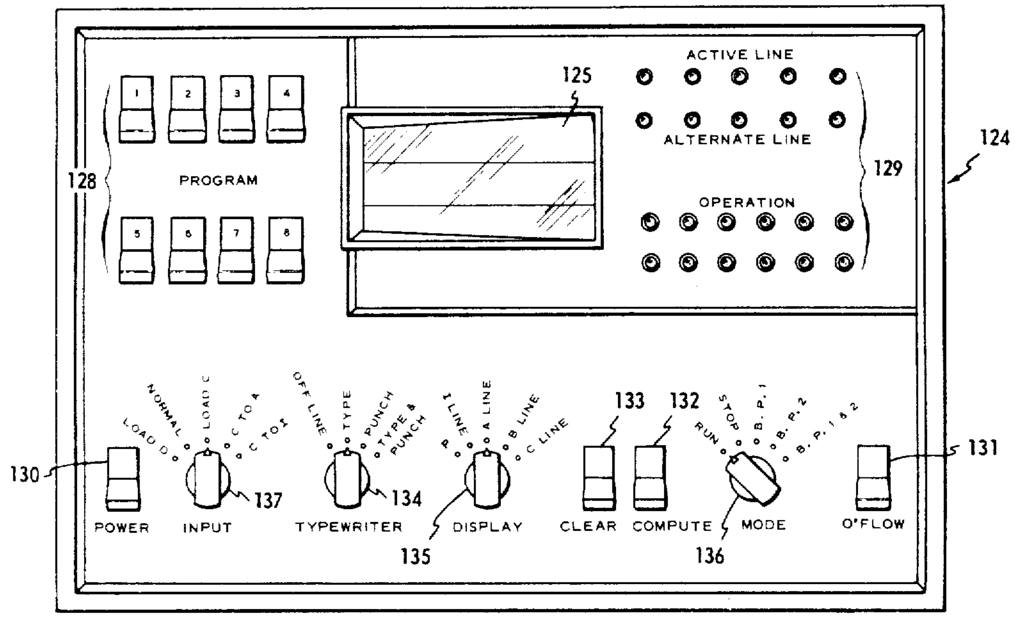
FIGURE 8 is an elevational view of the computer panel.
Figure 9:
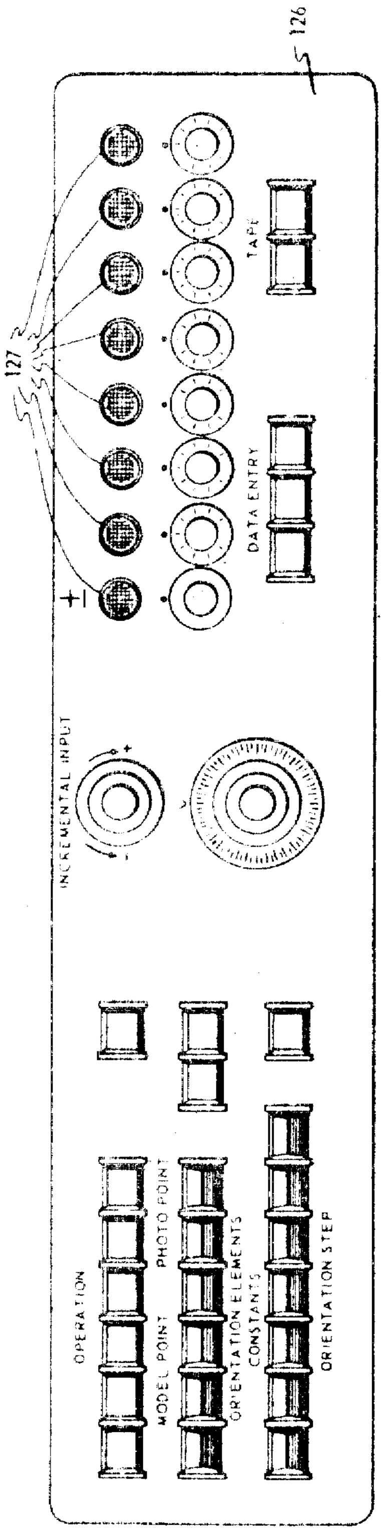
FIGURE 9 is an elevational view of the viewer panel.

The two external control panels are provided for operator access to, and monitoring of, the computer. The computer panel 124, shown in FIGURE 8, is intended for initial loading of the computer's memory, for the entry and display of words in binary form, and for general maintenance. The viewer panel 126, shown in FIGURE 9, is intended for controlling orientation procedures and for the entry and display of photogrammetric data in decimal form.

Each panel contains a number of manually operated switches which may be used to alter computer operation. Signals from the panel switches influence computer operation via synchronizing circuits 120, 122 associated with each panel. Each panel also contains various types of visual display equipment for the purpose of monitoring computer operation. Communication between the displays and the internal processing circuits is provided by the display circuitry associated with each panel. The synchronizing and display logic located on etched-circuit cards within the computer is found in FIGURES 29 and 30, respectively. For the display of decimal data at the viewer panel 126 see FIGURE 17. The decimal data is displayed on eight decimal indicating tubes 127.

Across the top of the computer panel 124 are a centered oscilloscope display 127 (explained later in connection with the rotary switch directly below it), a group of eight rocker switches 128 to the left and a group of 22 lamps 129 to the right. The rocker switches 128 are of the stationary type. They are numbered from 1 to 8 and are referred to as the program switches. They will be used in the future to select or bypass certain program subroutines. These optional subroutines will be preceded by conditional branch instructions (operation code 02, line codes 04–11, Table 9 and FIGURE 28 so that the computer will be able to branch to an optional subroutine or not, according to whether the corresponding program switch is on or off.

The 22 lamps 129 to the right of the oscilloscope 127 are arranged into four horizontal rows. The top two rows of five lamps each are labelled ACTIVE LINE and ALTERNATE LINE. These lamps display the contents of the active line code register 112 and the alternate line code register 111, respectively (FIGURE 24). The active register 112 will hold the instruction line code during the Wait R and Act R states of the instruction state counter 118, but will hold the operand line code during the Wait D and Act D states of that counter. The alternate register will hold the instruction line code during the Wait D and Act D states, but will hold the operand line code of the previous instruction during the Wait R state and will accept (serially shift in) the operand line code of the new instruction read during the Act R state. (See FIGURE 6.)

The third row of six lamps is labelled OPERATION and it displays the contents of the operation code register 110. This register stores the operation code of the current instruction during the Wait D and Act D states, and also during the following Wait R state during which the memory is searched for a new instruction. The operation code of the new instruction is shifted in serially during the Act R state.

The six lamps in the fourth row are individually labelled and will be referred to by their labels. Starting at the left of the row, the first lamp labelled RUN indicates the state of the central processor's run-control flip-flop CE1 (FIGURE 29). The next three lamps display three of the four states of the instruction state counter 118 (FIGURE 27). The READ INSTR lamp indicates the wait-to-read-instruction (Wait R) state. The READ OPND lamp indicates the wait-to-execute or wait-to-read-operand (Wait D) state. The EXEC INSTR lamp indicates the execute (Act D) state. The last two lamps display data handling errors of the central processor 60 (FIGURE 45). The PARITY lamp indicates whether or not a parity error has occurred during a transfer of data between the arithmetic registers A–D and the long memory lines 80–87. The O'FLOW lamp indicates whether or not an arithmetic register A–D has overflowed in error or not.

The lower row of controls on the computer panel includes four rocker and four rotary switches. Two of the rocker switches 130, 131 are of the stationary type. These are the on-off power switch 130 and the run-check overflow switch 131 at either end of the row. The power switch 130 controls all electrical power to the computer and to the viewer panel 126 as well. If the overflow switch 131 is in the CHECK position, the central processor will test all arithmetic registers (A, B, C and D) for overflow error, and if an error occurs will light the Overflow lamp and halt the computer (see FIGURE 29). If the overflow switch 131 is in the RUN position, tests for overflow error are still made but the computer is allowed to run even if the overflow lamp shows an error has occurred.

The remaining two rocker switches 132, 133 are of the momentary type. These are the start-stop compute switch 132 and logic-state clear switch 133. If the compute switch 132 is momentarily rocked to the START position, the central processor 60 will enter the run state (flip-flop CE1 set, FIGURE 29), in which it may operate in one of several ways, depending primarily on the settings of the input and mode rotary switches (as explained below). If the compute switch 132 is rocked to the STOP position, the central processor 60 will return to the idle state (flip-flop CE1 reset), provided it has not already returned for some other reason such as executing a halt instruction. If the compute switch 132 is rocked to the STOP position while the central processor 60 is reading or executing an instruction (Act R or Act D, respectively), this activity will proceed even if the processor is in the idle state. However, processor operations will stop as soon as a waiting state (Wait R or Wait D) is reached (more accurately, will stop in the same way as if the mode switch were turned to the STEP position, as explained below).

If the logic-state clear switch 133 is momentarily rocked to either the LOGIC or STATE position, the operation of the central processor 60 will be stopped in a more drastic way. In both cases, the processor will return to the idle state (flip-flop CE1 reset) and the instruction state counter 118 also will be cleared immediately (to the Wait R state), thus suspending at the next bit time whatever instruction reading or execution may be taking place (FIGURE 27). In the STATE position, the logic-state clear switch 133 will also clear the panel of parity transfer and arithmetic overflow error indications (FIG- URE 45). In the LOGIC position the switch will instead place the tape and display buffer in the display states, and also reset flip-flops A0, CE2 and CE3 (FIGURES 33, 41, 29 and 28, respectively). In addition, the LOGIC position will clear the real-time input-output registers and preset the instruction line code register 112 to draw the next instruction from the 16-word D register (FIGURES 37 and 24, respectively), provided the input rotary switch is in the LOAD D position (see details on the LOAD D position in this section below).

The remaining switches to be explained are the four rotaries in the computer panel's lower row. The four positions of the rotary switch 134 labelled TYPEWRITER are OFF LINE, TYPE, PUNCH, TYPE AND PUNCH. If switch 134 is in the OFF LINE position, the typewriter (including keyboard, tape punch and read stations, and control switches) may be operated completely independently of the computer. The other three positions of rotary switch 134 refer solely to the way in which output data (7-bit characters) transferred from the central processor 60 via the tape buffer 66 are to be recorded by the typewriter. The choice of source for input data (6-bit characters from keyboard or tape reader) to be transferred via the tap buffer 66 to the central processor 60 is made by operator action at the typewriter.

The five positions of the rotary switch 135 labelled DISPLAY are marked with the single letters P (for probe), I, A, B, C. Rotary switch 135 selects the source of data to be displayed on the oscilloscope 127 face mounted on the computer panel 124 directly above the switch. One full word time may be displayed of any signal sampled by an associated scope probe, if the switch is in the P position. If the switch is in the I position, the contents of the one-word instruction delay line I will be displayed. If the switch is in the A, B, or C positions, the contents of the one-word arithmetic lines A, B, or C, respectively, will be displayed.

The five positions of the rotary switch 136 labelled MODE are RUN, STEP, BP1 (for breakpoint No. 1), BP2, BP1, AND 2. Rotary switch 136 controls the mode in which the central processor 60 is to operate. If this switch is in the RUN position (and the input rotary switch is in the NORMAL position), rocking the compute switch 132 to the START position will place the central processor 60 in the run state (flip-flop CE1 set, FIGURE 29), and permit the instruction state counter 118 to advance from either waiting state to the next active state (from Wait R to Act R, or from Wait D to Act D; see FIGURE 27). As long as the mode rotary switch 136 is in the RUN position, the instruction state counter 118 will continue to cycle and instructions will continue to be alternately fetched (Act R) and executed (Act D), until an unconditional halt instruction (operation code 00, line code 00), a parity transfer error or an arithmetic overflow error (with the overflow rocker in CHECK position) occurs. Then the central processor 60 will be returned to the idle state (flip-flop CE1 reset) and the instruction state counter 118 will be held in a waiting state (Wait R or D).

If the mode rotary 136 is turned to any other position (but the input rotary is kept at the NORMAL position), an unconditional halt instruction and parity and overflow errors will still cause the computer to idle just as if the mode rotary 136 were in the RUN position. However, other criteria, depending on the particular mode switch 136 position, will also be in effect to cause the computer to idle. If the mode switch 136 is in position BP1 (or in position BP1 and 2), the computer will idle if a breakpoint-halt instruction (operation code 00, line code 01) occurs. If the mode switch 136 is in position BP2 (or in position BP1 AND 2), the computer will idle if a select-I-line instruction (operation code 05) or a test-for-negative instruction (operation code 06) occurs (see FIGURE 29).

If the mode rotary 136 is turned to the STEP position from any other, the central processor 60 will idle (1) immediately if the instruction state counter 118 is in one of its two waiting states (Wait R or D), or (2) as soon as the "half-cycle" progress is complete, with one class of exceptions. A half-cycle of the instruction state counter 118 is either of the state sequences Wait R–Act R–Wait D, or Wait D–Act D–Wait R. A half-cycle is in progress if the instruction state counter 118 is in one of its two active states (Act R or Act D). The class of exceptions includes certain instructions which normally omit the Wait D state (operation codes 00 through 06; also, all odd operation codes, that is, codes specifying block-type instructions, providing their address O is not zero). If any of this class of instructions is fetched during Act R, it will also be executed during the immediately following Act D before the computer idles.

If the mode rotary 136 is kept in the STEP position, then the central processor 60 will idle after operating for one half-cycle of the instruction state counter 118, each time the compute switch 132 is rocked to the START position, with the same class of exceptions as the one mentioned in the paragraph above. Any instruction in this class will cause the central processor 60 to operate for a full cycle of the instruction state counter 118, that is, the instruction will be executed immediately after being fetched.

The five positions of the rotary switch 137 labelled INPUT are LOAD D, NORMAL, LOAD C, C TO A, C TO I. If switch 137 is in the NORMAL position and if the start-stop compute switch 132 is rocked to the START position, the computer will begin running and will stop, as just explained, in one of several ways depending on the instruction executed and the position of the mode rotary. The other positions of the input rotary 137 control various ways in which input data may be loaded from the typewriter into the central processor 60.

If the computer's memory (FIGURE 4) is empty, it may be loaded in two steps. (The memory lines are volatile, that is, all information stored in them is lost each time computer power is turned off.) The first step is reading an initial loading program from punched paper tape into the D line as follows: With the input rotary 137 in the LOAD D position and the mode rotary 136 in the RUN position, clear the computer's logic by rocking the clear state-logic switch 133 to the LOGIC position, and start the computer by rocking the start-stop compute switch 132 to the START position. The contents of the punched paper tape then will be read into the D line, character by character (6 bits per character, 4½ characters per word). The routine read from the tape should not be longer than 72 characters or 16 words (the length of the D line) and should be followed by a stop code.

Control over initial loading of the D line in this way is exercised internally by the instruction state counter 118, the tape buffer state counter, and a read-tape instruction which is specially wired into the logic (FIGURES 27, 33 and 22, respectively). The two state counters each cycle once per tape character read. Each time the Act R state occurs, the wired instruction is read into the computer's instruction register.

The wired instruction is a block-type interchange between the D line and the tape buffer register JB2–7 (FIGURES 14, 43 and 31, respectively). Data interchange begins with word time 01 (mod 16), continues with word times 02, 03, etc. (mod 16), and ends after 16 word times with the completion of word time 00 (mod 16). The effect of each such instruction is to shift to the left by six bit positions the contents of all sixteen D registers (the D line as a whole beginning with word time 01, but ignoring all parity bit positions). The six-bit character read from the tape buffer is inserted into the least significant end of the D register available at word time 01. The six bits at the most significant end (bit positions 22 to 27) of the D register available at word time 00 are lost.

After loading the D register, the second step of loading the computer's memory is begun by turning the input rotary 137 from the LOAD D to the NORMAL position. Then the computer's logic is cleared and the computer is started again. The first instruction executed in this input-normal mode will be read from word 00 in the D line (FIGURE 14). The loading routine stored in the D line can be sufficiently flexible to load any part or all of the computer's memory (FIGURE 4) from a single punched tape without further stop codes or otherwise halting the computer again.

The remaining three positions of the input rotary 137 are involved with the one-word C line. These positions are intended for entering into the computer individual operands or instructions from the typewriter keyboard. This is also done in two steps. The first step is loading the C register as follows: With the input rotary 137 in the LOAD C position, start the computer. An operand or instruction will be entered into the C line, one bit at a time, by depressing the numerical 1 and 0 keys of the typewriter a total of 27 times. Any time an error is made, it may be ignored by starting the typing of 1's and 0's over again for a total of 27 key strokes.

The instruction state counter 118 is not used to control the loading of the C line. Nor is a special wired instruction read into the instruction register (I line). Instead, the computer run-control flip-flops CE1 and CE2 are cycled in a special way (FIGURE 29) along with normal read-tape cycles of the tape buffer state counter (I 11). Flip-flops CE1 and CE2 and the buffer state counter (I 11) each cycle once per numerical 1 or 0 typed.

Each time a number 1 or 0 is typed, the corresponding punched-tape code is transferred into the tape buffer 65. The tape buffer flip flop JB4 will then contain a binary 1 or 0, respectively. Then the C register is shifted left one bit position and the bit from flip-flop JB4 is entered into the least significant bit position of the C register. This transfer is wired into the logic as a special-single-type interchange between JB4 and the C register (see FIGURES 31 and 43). By special-single-type is meant that the interchange operation is active for one word time, but that in this case it is under the control of flip-flops CE1 and CE2 rather than instruction state counter 118.

Cycling of the control flip-flops CE1 and CE2 for loading the C register one bit at a time in this special way is terminated by turning the input rotary 137 from the LOAD C position to any other. The second step in loading an individual operand or instruction is thus begun by turning the input rotary 137 to the C TO A position or the C TO I position, respectively. If the computer is then started, the contents of the C register will be transferred to the arithmetic register A or the instruction register I (FIGURES 41 and 22), respectively. The transfer is active for one word time under control of the normal cycle of flip-flops CE1 and CE2 (FIGURE 29). For debugging or other purposes, the transfer may be repeated as often as desired by repeatedly starting the computer, provided the input rotary remains in the C TO A or C TO I position.

*Input-output buffers*

In addition to the central processor 60, the computer includes two input-output buffers 64, 66 as indicated in FIGURE 2. These two buffers operate independently of each other, and also operate independently of the central processor 60 unless interrupted by signals generated by the processor as it executes various input-output instructions. The two buffers are known as the real-time input-output buffer 64 and the tape and display buffer 66 and are described below.

*Real-time input-output buffer 64*

The real-time input-output buffer includes an 8-word storage delay line, the Q line (see FIGURE 10), in whose half-word (14 bit times) registers may be accumulated quantizer signals representing various mechanical motions taking place within the stereoviewer and the coordinatograph. Some of the quantized signals (see Table 3) represent operator commands entered at the stereoviewer hand and foot wheels 51*c*. These signals, called real-time inputs, are accumulated and stored until called for by the central processor 60.

The real-time inputs are processed in accordance with the programs stored within the computer's memory and result in quantities called real-time outputs which represent motions desired in the stereoplotter. These outputs are sent by the central processor 60 to the real-time buffer 64 for storage in the Q line. The outputs are converted periodically to analog error voltages for driving servo motors in the stereoplotter. The servo systems control photo and optical motions in the stereoviewer 50 and stylus motions at the coordinatograph.

The amount of motion produced by the servo systems is measured by quantizers whose output signals are fed back to the real-time buffer 64. There they are used to reduce the values of the real-time outputs stored in the Q line. The signals received from the feedback quantizers are treated in exactly the same fashion as the signals from the quantizers responding to the operator's hand and foot wheel commands.

Figure 10:
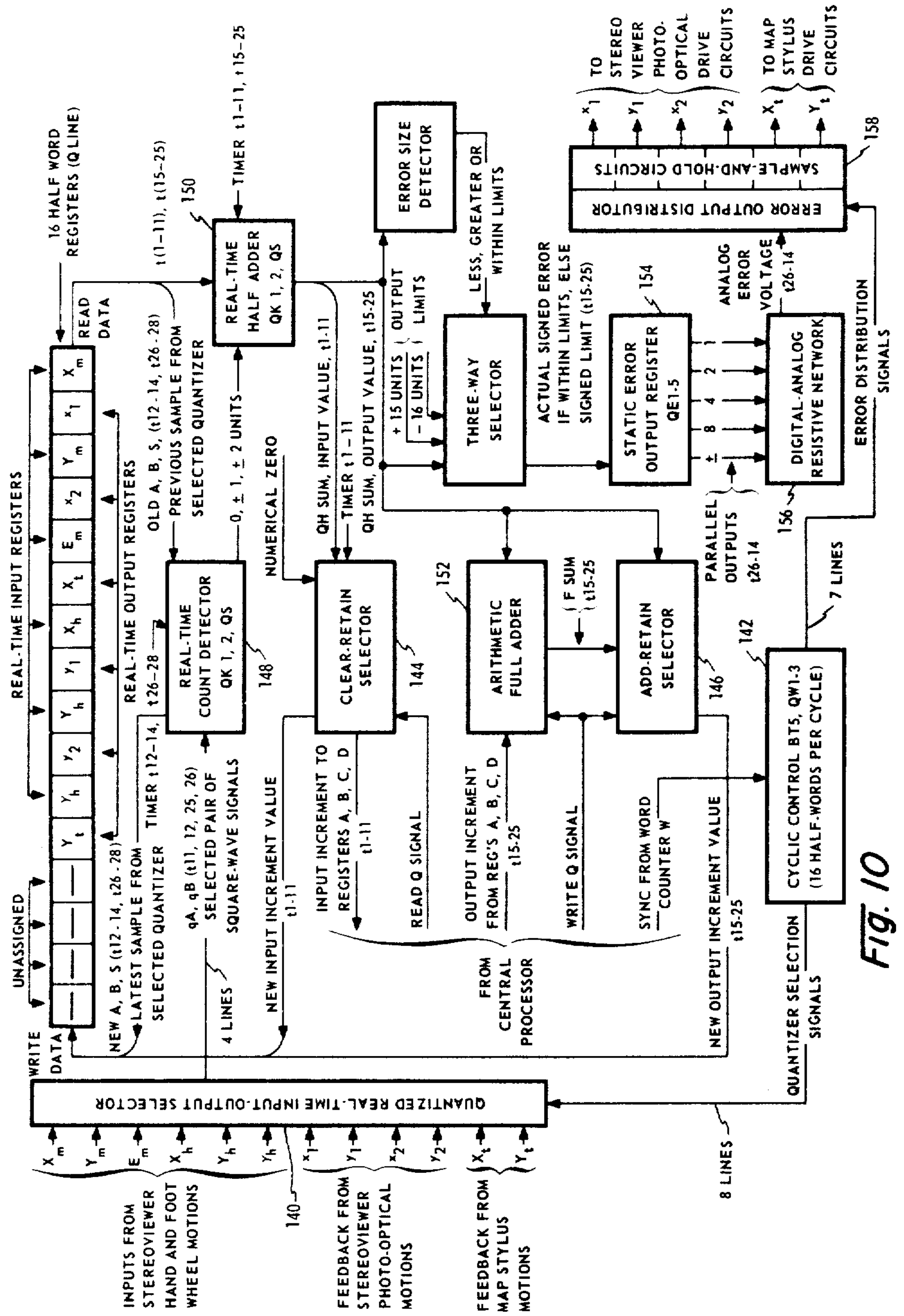
FIGURE 10 is a block diagram of the real-time input-output buffer.

FIGURE 10 indicates the flow of real-time input and output data and the manipulations the data undergo within the real-time buffer 64. The logic circuits for this buffer are found on diagrams in FIGURES 36, 37, 39 and 40. FIGURE 20 contains examples showing the exact location of each bit in the 11-bit input and output increments before and after being transferred between the central processor 60 and the real-time buffer 64.

TABLE 3.—LIST OF REAL-TIME INPUTS AND OUTPUTS

| Word Times Available | Label | | Meaning |
|---|---|---|---|
| 000, 008, 016, 024, . . . , 248 | $X_m$ | Left-to-right horizontal motion | Real-time inputs representing motion of stereomodel point in model scale. |
| 001, 009, 017, 025, . . . , 249 | $Y_m$ | Front-to-back horizontal motion | |
| 002, 010, 018, 026, . . . , 250 | $E_m$ | Vertical or elevation motion | |
| 003, 011, 019, 027, . . . , 251 | $X_h$ | Left hand-wheel motion | Real-time inputs equal to $X_m$ and $Y_m$ if contouring, but equal to $X_m$ and $E_m$ or $Y_m$ and $E_m$ if profiling (a profile switch determines which pair is selected). |
| 004, 012, 020, 028, . . . , 252 | $Y_h$ | Right hand-wheel motion | |
| 000, 008, 016, 024, . . . , 248 | $x_1$ | Motions in plane of photo 1 | Real-time outputs representing motions of photo prints in photo scale corresponding to motion of stereo model point. |
| 003, 011, 019, 027, . . . , 251 | $y_1$ | | |
| 001, 009, 017, 025, . . . , 249 | $x_2$ | | |
| 004, 012, 020, 028, . . . , 252 | $y_2$ | Motions in plane of photo 2 | |
| 002, 010, 018, 026, . . . , 250 | $X_t$ | =Scaled $X_h$ | Real-time outputs representing motion of mapping point in coordinatograph scales corresponding to motion of stereomodel point. |
| 005, 013, 021, 029, . . . , 253 | $Y_t$ | =Scaled $Y_h$ | |

Note on subscript meanings.—*m* for model, *h* for hand wheel, 1 and 2 for the two photos, *t* for mapping table.

The logic for the blocks labelled "quantized real-time input-output selector" 140 and "cyclic control" 142 is FIGURE 10 is found on diagrams in FIGURES 36 and 21. The cyclic control 142 comprises four flip-flops operating as follows. Half-word timing is provided by flip-flop BT5, part of the basic timing counter 116 (FIGURE 21). The eight word times for matching the Q line cycle are distinguished by the contents of three flip-flops QW1–3 (FIGURE 36). These flip-flops are arranged as a serial shift register slaved to the word count W which is read during each word period at a time when the flip-flop outputs are not needed for selection.

As shown in FIGURE 10, delay line Q has three types of inputs:

(1) a new three-bit sample from the quantizer currently selected (bits A and B represent the high-low level of the A and B square waves, while bit S represents the sign of the latest one- or two-unit increment);

(2) an updated real-time input increment of eleven bits (ten bits and sign); and (3) an updated real-time output increment also of eleven bits.

The 11-bit input increment (2) above is sent to the central processor 60 or to the Q line, and numerical zero is sent to the other, depending on the presence or absence of a read-Q instruction signal at the clear-retain selector 144. The 11-bit output increment (3) above is sent to the Q line, updated or not by an output from the central processor 60, depending on the presence or absence of a write-Q instruction at the add-retain selector 146. The logic for loading all three types of input to the Q line, as well as for the two selectors is found in FIGURE 37.

The real-time count detector 148 and real-time half adder 150 shown on FIGURE 10 are realized in the logic in FIGURE 39. A count of 0, ±1, or ±2 is detected each half-word time by sampling the squarewave signals (*q*A, *q*B) of the selected quantizer and comparing this sample with the three-bit sample (old A, B, S) from the same quantizer stored in the Q line eight word times previously. Sample periods are taken as indicated in FIGURE 38. During each sample period any change in level of wave form *q*A between zero and +6 volts and in wave form *q*B between zero and +6 volts is detected. If a change in only one wave occurs during a sample period, then the level of the other wave is examined to determine if it is high or low. From this information it can further be determined whether wave form *q*A is leading or lagging wave *q*B and hence if the motion command is positive or negative. A study of FIGURES 10, 38, 39, 39*a–c* will reveal the truth of this.

As indicated in FIGURE 38, when wave form *q*A is leading wave form *q*B the motion command is chosen as positive and the magnitude of the motion command, which is determined by the number of changes in the wave forms *q*A, *q*B, is then added to the total in the Q line (FIGURE 10). If the motion command is negative, the change is subtracted.

If there is a change in both wave forms *q*A, *q*B, then the sign of the motion command must be the same as it was for the previous motion command, which sign is stored, because a two unit change indicates that the motion command from the hand wheels is relatively rapid and if there were a change in sign, indicating that the hand wheel was reversed in direction, the hand wheel would first have to slow to a halt and then would gradually regain speed in the opposite direction so that the average speed of the hand wheel is relatively slow and could not possibly be rapid enough to register two changes in wave forms *q*A, *q*B during a sampling period. If there are no changes in a sample period in either wave form *q*A or *q*B, then this indicates there was no motion command in the sample period.

This count is then added to the 11-bit increment corresponding to the same quantizer, also stored eight word times perviously, immediately after the new three-bit sample has been stored. The half adder 150 is used to form this sum, which is called "QH sum." Since count detection and summing need not proceed simultaneously, both functions make use of flip-flops, QK1, QK2 and QS on a time-shared basis. The arithmetic full adder 152 shown on FIGURE 10 is also used on a time-shared basis. Its logic is found in FIGURE 44.

The remaining logic indicated on FIGURE 10 concerns:

(1) the storage of real-time outputs in a static error register 154, after reduction in size if too large;

(2) the digital-to-analog conversion of the outputs, one at a time, by means of a resistance network 156; and (3) the distribution of these analog signals to a number of sample-and-hold circuits 158 preparatory to driving the various servos within the stereoplotter. The non-digital portion of these circuits are covered below.

The digital portion of these last circuits is found in FIGURE 40. The equipment shown there includes flip-flops QE1–5 and logic for error size detection and reduction and for error distribution. Eleven-bit output increments are entered into these flip-flops serially. Numbers larger than the register capacity (−16 to +15 units) are detected as they pass through the sign flip-flop QE5, and then reduced to register capacity. This operation takes place in the 11 bit times *t*15–*t*25 of a word time. During the following 17 bit times *t*26–*t*14 (the remainder of a word time, if reckoned as beginning at *t*15), the digital error stored in flip-flops QE1–5 is available in parallel to drive the resistance network 156. (The sign bit of the error has a weight of negative 16 in the network.) The output of the network is distributed to the sample-and-hold circuits 158 by means of a series of error distribution signals, derived from the cyclic control 142 (FIGURES 40 and 36).

*Tape and display buffer 66*

The tape and display buffer 66 includes a data storage register JB1–7, a control counter called the J state counter, and various logic circuits for serial and parallel access to the storage register under control of the state counter. The register and counter appear in all three of the FIGURES 11, 12, and 13. However, each of these figures shows a different complement of serial and parallel access logic, depending on which type of activity the tape and display buffer 66 is engaged in.

Figure 11:
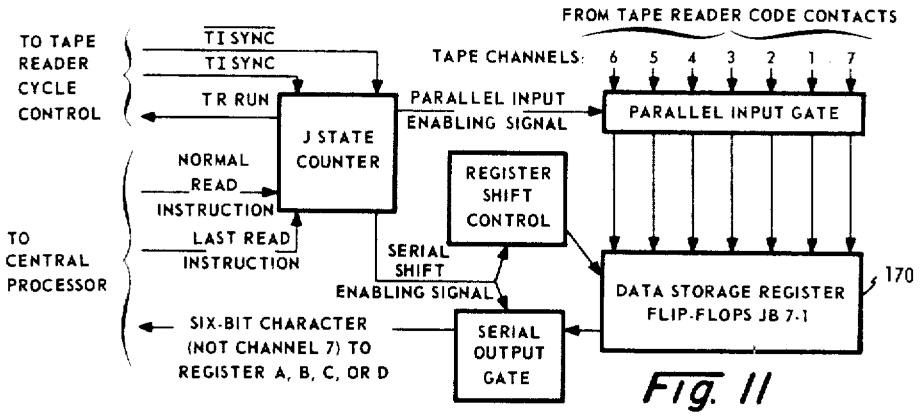
FIGURE 11 is a diagram of the tape-character input functions of the tape and display buffer.
Figure 12:
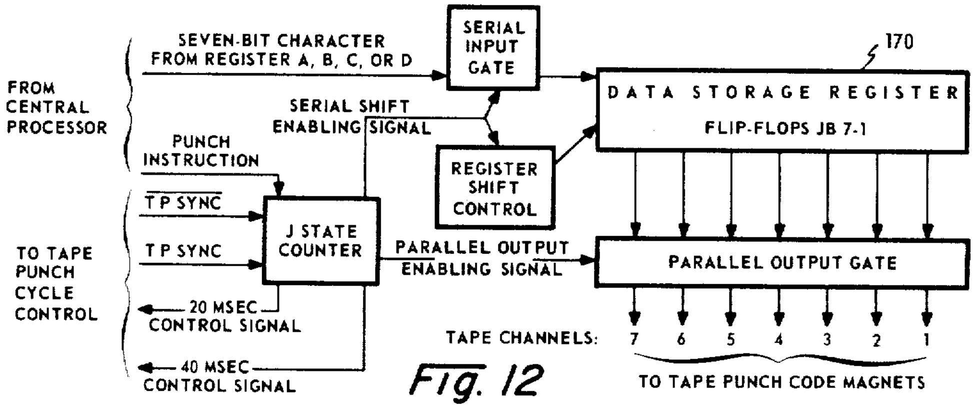
FIGURE 12 is a diagram of the tape-character output functions of the tape and display buffer.
Figure 13:
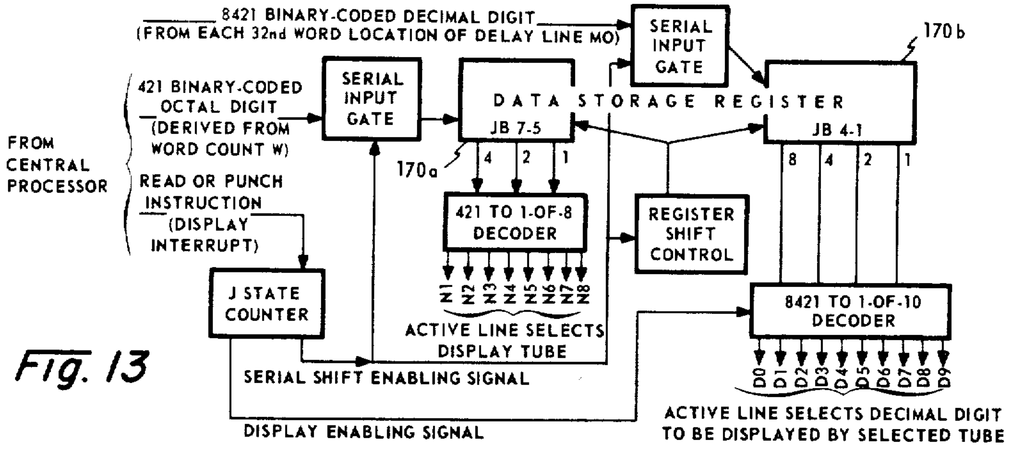
FIGURE 13 is a diagram of the decimal display functions of the tape and display buffer.

FIGURES 11, 12, and 13, respectively, indicate the three ways in which the tape and display buffer 66 can operate:

(1) as an input buffer for receiving a punched-tape character in parallel from the tape reader (or typewriter keyboard) and transmitting the character serially to the computer's arithmetic registers A–D;

(2) as an output buffer for receiving a tape character serially from the arithmetic registers A–D and transmitting the character in parallel for punching (or printing);

(3) as an output buffer for receiving a decimal number, one digit at a time, serially from specific word locations in memory line 80 and transmitting each digit in a parallel one-out-of-ten code to the corresponding display tube in turn.

FIGURES 31–33 show the logic circuits for the tape and display buffer 66. The data storage register 170 (flip-flops JB1–7) and most of the serial and parallel acess circuits to the register are shown in FIGURE 31. Parallel output to the tape punch and decimal display are found in FIGURE 32. The logic for cycling the J state counter is placed in FIGURE 33.

FIGURE 33*a*, in reference to FIGURE 33, lists the states of the J state counter assigned to the three functions of the tape and display buffer. Two states are assigned for tape character input, four for tape character output, and two for decimal display. The table also indicates the possible state sequence, that is, the cycle of states for each buffer function and also the state changes occurring when one function replaces another.

FIGURES 17–19 contain additional details on timing and data locations. Details of the timing involved in the decimal display function are shown in two different time scales in FIGURE 17. Details of the timing involved in the tape input and output functions are shown in FIGURE 18. Examples showing the exact location of each tape character bit, before and after a tape data transfer, are found in FIGURE 19.

TABLE 4.—FLIP-FLOPS AND THEIR FUNCTIONS

| Flip-Flop | Logic in Figure | Function |
|---|---|---|
| A0 | 41 | The left-shift tape for the one-word arithmetic delay line A; also used as the special control which implements the next-instruction-from-delay-line-C instruction (see Table 9). |
| A1 | 41 | The no-shift or normal tap for delay line A. |
| A2 | 41 | Part of the read amplifier for delay line A; serves as the right-shift tap for line A. |

TABLE 4.—Continued

| Flip-Flop | Logic in Figure | Function |
|---|---|---|
| AK | 44 | The carry storage for the arithmetic binary full adder. |
| AT1 | 45 | The storage for the odd-even or parity count made of the binary is in a word being written to, or read from, the memory. |
| AT2 | 45 | The parity alarm flip-flop; used to store the fact that a word read from the memory has been found to have even or incorrect parity; drives the computer panel lamp labelled PARITY. |
| AT3 | 45 | The overflow alarm flip-flop; used to store the fact that a sum or difference calculated by the arithmetic circuits has become too large to store in one arithmetic register; drives the computer panel lamp labelled O'FLOW. |
| B0 | 42 | The left-shift tap for the one-word arithmetic delay line B; also used in determining the quotient sign at the start of (1) division and (2) the clear-B-to quotient-sign instruction (see Table 9). |
| B1 | 42 | The no-shift or normal tap for delay line B; also used in determining the value of numerical quotient bits during division. |
| B2 | 42 | Part of the read amplifier for delay line B; serves as the right-shift tap for line B. |
| BT1-BT5 | 21 | The basic timing counter of the computer. Its cycle of 28 bit times or clock periods defines the length of a word time. BT5 is used to distinguish between the first and second halves of each word time. BT1-BT4 are used to count the 14 bit times in each half-word time (see timing diagrams on FIGURE 14). |
| C1 | 43 | Part of the read amplifier for the one-word arithmetic delay line C. |
| CE1 | 29 | The computer's master run-idle control; serves to synchronize start and stop signals from the computer panel with the computer's internal clock; drives the computer panel lamp labelled RUN. |
| CE2 | 29 | The anti-repeat control for start signals from the computer panel; with CE1, serves as (1) a single-pulse generator for start signals, and (2) the cycle control for the special load-C mode (see Specification, supra). |
| CE3 | 28 | A flip-flop reserved for control of an external operation, such as the down or up movement of the coordinatograph stylus. |
| D1 | 43 | Part of the read amplifier for the 16-word arithmetic delay line D. |
| IC1-IC6 | 23 | The register which stores an instruction's operation code (the binary number determining instruction type); called the operation code register; drives the computer panel lamps labelled OPERATION (see Specification, supra and Table 5). |
| IC1 | 23 | The part of register IC1-6 which stores the bit determining whether an instruction is block-type (multiple-word active) or single-type (one-word active). |
| IC2, IC3 | 23 | The part of register IC1-6 which stores two bits determining (1) which of the four arithmetic registers A, B, C, or D is selected by a read or write instruction and (2), in the case of miscellaneous instructions, which of several general types of such instructions is to be executed (see Specification, supra). |
| IC4-IC6 | 23 | The part of register IC1-6 which stores three bits determining whether a read, write or miscellaneous instruction is to be executed (see Specification, supra). |
| ID1 | 25 | Part of the read amplifier for the one-word instruction delay line I in which are stored a 12-bit word count W, and two 8-bit instruction addresses, address O and address I (the temporal word locations for an operand and the next instruction, respectively). |
| ID2 | 25 | The output of an auxiliary shift register serving to delay the contents of delay line I by 8 bit times; used in the comparison of word count W and address O or I. |
| IK | 26 | The carry storage for the half adder-subtracter which in each word time serves (1) to increase the value of word count W by one, and (2) to decrease the value of address O by one, if the instruction is block-type (see Table 4 entries for TN and TW). |
| IL1-IL5 | 24 | The register into which is read an instruction's operand line code (the binary number which selects the memory delay line to or from which an operand is to be transferred); called the alternate or operand line code register; serves as buffer storage for both the operand and instruction line codes; drives the computer panel lamps labelled ALTERNATE LINE (see Specification supra and next Table 5 entry). |
| IL11-IL15 | 24 | The register which at the time of instruction reading stores the instruction line code (the binary number which selects the memory line from which instructions normally are read); called the active or instruction line code register; also stores the operand line code at the time of instruction execution; drives the computer panel lamps labelled ACTIVE LINE. |
| IS1, IS2 | 27 | The control which supervises the sequences of instruction states which occur within the central processor; called the instruction or I state counter. Normally the four instruction states wait R, act R, wait D and act D recur cyclically, except that the waiting states may be by-passed with proper minimum-access programming. The wait R state signal drives the computer panel lamp labelled READ INSTR, wait D the lamp labelled READ OPND, and act D the lamp labelled EXEC INSTR. |
| JB1-JB7 | 31 | The data storage register for the tape and display buffer. During each tape-read or tape-punch cycle, the register stores one 7-bit tape character. During each 32-word period in the display mode, the register stores in JB1-4 one binary-coded decimal digit and in JB5-7 an octal address identifying the decimal tube at the viewer panel which is to display that digit. Hence, during each 256-word period in the display mode, the register will store in sequence in JB1-4 the eight digits (sign, units, tens, etc.) of the complete decimal number to be displayed and in JB5-7 the eight display addresses corresponding to these decimal digits. |
| JS1-JS3 | 33 | The control which supervises the sequences of tape-read, tape-punch and display states which occur within the tape and display buffer; called the J state counter. If tape-read operations are called for, the counter's two TR states will alternate to control the transfer of one tape character per cycle from the tape reader to the central processor. If a tape-punch operation is called for, one cycle of the counter's four TP states will occur to control the transfer of one tape character from the central processor to the punch. If no tape operations are called for, the two display states will alternate to control the transfer of one binary-coded decimal digit per state cycle from memory delay line M0 to the display tubes at the viewer panel. |
| MR0 | 35 | Part of the read amplifier for the 276 word memory delay line M0. MR1-MR8 have similar functions for memory delay lines M1–M8, respectively. |
| QD1 | 37 | Part of the read amplifier for the 8-word buffer delay line Q in which are stored six real-time input increments and six real-time output increments. |
| QE1-QE5 | 40 | The register which stores up to eight magnitude bits each of the real-time outputs in turn, for conversion via a resistive network into analog error signals. |
| QK1-QK2 | 39 | The magnitude storage for newly detected real-time input-output increments (QK1 reset for zero, set for non-zero; QK2 reset for zero and one unit, set for two units); also the carry storage for the real-time half adder-subtracter which in each half-word time adds a newly detected increment to the corresponding previous value stored in delay line Q. |
| QS | 39 | The sign storage for newly detected real-time input-output increments (QS reset for plus, set for minus); also the sign storage for the real-time half adder-subtracter. |
| QW1-QW3 | 36 | The cyclic timing control within the real-time input-output buffer which with BT5 (1) supervises the selection of each quantized input-output signal in turn, (2) controls the distribution of analog error voltages to the proper stereoplotter servo axes, and (3) indirectly keeps track of the location of each of the 16 half-word input-output registers in delay line Q. |
| TN | 26 | The flip-flop which serves to detect the word time in which address O equals zero. In the case of block-type instructions the end of the "block D" state, that is, of multiple-word-time activity, is signaled when address O has been reduced from an initial value n down to |

TABLE 4.—Continued

| Flip-Flop | Logic in Figure | Function |
|---|---|---|
| | | zero (see Table 4 entries for IK and IDI). |
| TW | 23 | The flip-flop which serves to detect that the value of word count W matches or coincides with address O or I. The wait R state normally is ended when W matches I. In the case of single type instructions, the wait D state normally is ended when W matches O (see Table 4 entries for IK and IDI). |

*Functional operation of instructions*

Each 27-bit instruction in the repertoire of the central processor 60 includes a six-bit operation code specifying the type of instruction to be executed. The operation code is stored in flip-flops IC1–6, part of the instruction register. (See FIGURE 23 on the instruction register FIGURE 6. For a list of all the instructions, see Tables 1–5. For a brief description of each instruction, see the tables found on Tables 6–10.)

Operation codes have been assigned in such a way as to group instructions which have certain common characteristics. For example, the operation code bit stored in flip-flop IC1 divides all instructions into two types, single-type and block-type. (In the tables on Tables 6–10 these two types are referred to as single operand or single-word active and multiple word or multiple-word active. Specification, supra, points out the essential difference between the two types.)

Other examples of instruction grouping by operation code assignments involve the three code bits stored in flip-flops IC6, 5 and 4. All instructions having one or more binary 1's stored in these three positions (1– –, –1–, or – –1) are instructions involving reading or writing of operands. All instructions of the type 1– –, that is, those having a binary 1 in position IC6, are classed as read-type instructions. Further, all read-type instructions involve either addition or subtraction according to whether the binary digits stored in IC6 to IC4 are 11– or 10–, respectively.

All instructions of the types 01– and 0–1 are classed as write-type instructions. Those of type 01– involve writing only. Those of type 001 involve both writing and reading and are called interchange instructions. All instructions having three binary 0's (000) in positions IC6 to IC4 are classed as miscellaneous. They do not involve the reading or writing of operands, or at least not in the normal fashion.

The operation code bits stored in the remaining two flip-flops IC3 and IC2 serve to identify (1) which of the arithmetic short lines A–C is involved in a read-type or write-type instruction, or (2) the type of miscellaneous instruction to be executed.

Read- and write-type instructions may be classified further according to the line code specified. Those instructions whose line codes refer to the memory registers 80–87 and the arithmetic registers A–D are called normal (Table 6). Line codes in this class range from 00 to 27. Line codes 00 to 08 are assigned to the nine 256-word delay lines 80 to 87 actually included in the computer's memory. Line codes 09 to 23 are reserved for future memory expansion. Line codes 24 to 27 are assigned to the four arithmetic lines A, B, C and D considered as auxiliary memory sources and destinations.

A second class of read- write-type instructions involves the input-output buffers 64 (Table 7). The buffers are also considered to be auxiliary memory sources and destinations. However, the operands transferred are not full words. The operands transferred to and from the real-time input-output buffers 64 are 11-bit increments. Those transferred to and from the punched tape input-output buffer 66 are 7-bit characters. All instructions involving the two input-output buffers 64 are identified by line code 30. Which of the two buffers the instruction refers to is indicated by the operation code bit stored in flip-flop IC4. The primary use of this code bit is to indicate whether the contents of the specified arithmetic register A–D is to be retained or cleared when reading or writing. This function is also involved when transferring operands to and from the buffers, although the logic has been modified where necessary to obtain the desired arithmetic clearing or retaining.

A third class of read- and write-type instructions involve special data manipulations which are identified by line codes 31, 29, and 28 (Table 8). Line code 31 identifies the mask instruction. The other two line codes involve shifts of the contents of one or more arithmetic registers A–D. Line code 28 identifies the shift right and multiply instructions while line code 29 identifies the shift left and divide instructions. Again, the operation code bit stored in flip-flop IC4 is used to indicate to which of the two instructions line codes 28 and 29 refer.

The classification of instructions outlined above has been followed in listing the instructions in the Tables 6–10. The tables include a short description of each type of instruction. Where this is incomplete, additional explanations are included below in this section. The following table is an index to the contents of Tables 6–10.

TABLE 5.—LIST OF COMPUTER INSTRUCTIONS

Normal read and write instructions (Table 6):

- Clear and add
- Add
- Clear and subtract
- Subtract
- Store and clear
- Store and retain
- Interchange Read and write instructions involving input-output buffers (Table 7):

- Real-time input
- Real-time output
- Read a character
- Punch a character
- Read last character Read and write instructions involving special data manipulations (Table 8):

Mask.
Left shift ---------------------------------- Divide.
Right shift -------------------------------- Multiply.
Right shift and stretch sign.

Miscellaneous instructions, single type (Table 9):

- Unconditional halt
- Breakpoint halt
- Start external operation
- Stop external operation
- Next instruction from C
- Clear B to quotient sign
- Test tape character received
- Test format code
- Test punch and reader ready
- Test plotter limit switches
- Test program switches
- Test X, Z profile mode
- Test Y, Z profile mode
- Test negative Miscellaneous instructions, block type (Table 10):

- Read $10^0$ data switch
- Read $10^1$ data switch
- Read $10^2$ data switch
- Read $10^3$ data switch
- Read $10^4$ data switch
- Read $10^5$ data switch TABLE 5.—Continued Read $10^6$ and sign data switches
Read incremental input
Read orientation operation
Read orientation step
Read parameter designation
Read momentary switches
Select I line The add and subtract instructions assume that both input operands, and the resulting sum or difference as well, all have the binary point in the same direction. There is no restriction on the signs of the input operands. Positive numbers are stored in absolute value binary form. Negative numbers are stored in twos-complement binary form. The sign of positive and negative numbers is stored as one or more binary 0's or 1's, respectively, at the left or most significant end of the numbers. Subtraction is realized in the logic by adding the ones-complement of the operand read from memory plus a pre-carry at bit time *t*1. (The ones-complement plus pre-carry is equivalent to the twos-complement or negative of the operand originally read.)

The store-and-clear and the store-and-retain instructions function somewhat similarly to the totalling and subtotalling operations, respectively, of mechanical adding machines. These operations clear or retain the contents of the designated register, depending on whether the information stored is to be discarded or not. Information which is to be discarded may be cleared from a computer arithmetic register by the store-and-clear instruction or, if a write-type instruction is unnecessary, equally well by a clear-and-add or clear-and-subtract instruction.

The read and write instructions involving the input-output buffers 64 transfer operands which are part words, either 11-bit real-time increments or 6-bit and 7-bit tape characters. For information as to the exact location of real-time increments before and after transfer, see the examples shown in FIGURE 20. For similar information as to the location of tape characters, see FIGURE 19.

The read- and punch-tape-character instructions should be preceded by various test instructions to make sure the tape buffer is ready to begin reading or punching cycles or is ready to be interrogated. These test instructions are of miscellaneous single-type and include the test-tape-punch-and-reader ready and test-format-code instructions.

The first read-tape-character instruction of a series will turn on the tape reader and transfer spurious information from the tape buffer to the specified arithmetic register. Following this first and all later read-tape instructions, a tape character is read into the tape buffer. Hence, all such instructions after the first will transfer actual tape data to the arithmetic registers.

If the number of alphanumeric (non-format) characters to be read is not known in advance, each read-tape instruction may be preceded by the test-format-code instruction. A format code is considered to be a stop-read signal, and should be followed by the read-last-character instruction, rather than the normal read-type. The read-last-character instruction will stop the reader and transfer the format code to a (usually different) arithmetic register where the code may be examined to determine the type of format called for.

The mask instruction may be used for deleting certain portions of a word when numerical words are to be packed or unpacked or instruction words are to be modified.

General formulas for locating the binary point of a product, quotient and remainder are given in Table 8. Both the multiply and divide instructions are of variable length so that the formulas must include the parameter $n$ (=multiple address O). The product (or quotient) will have its binary point in the same position as the multiplicand (or dividend) if (1) the instruction is full precision, that is, the value of $n$ is taken as 26, and (2) the multiplier (or divisor) has its binary point in standard position.

The standard position of a binary point is taken to be between bit positions 26 and 27, that is, between the most significant numerical bit of a word and its sign bit. The range of a number with binary point in a standard position is from negative one to positive one, with the lower limit attainable but not the upper. Numbers with a smaller range are filled in at the most significant end with replicas of the sign bit. This is called stretching or extending the sign.

There is no restriction on the signs of the multiplier and the multiplicand. However, to avoid overflow, the range of the multiplicand should be limited to one-half the normal range. If the multiplicand has its binary point in standard position, this means the range should have the limits plus and minus one-half.

Similarly, there is no restriction on the signs of the dividend and the divisor. However, the range of the divisor should be limited to one-half the normal range. Also, the dividend should be smaller in magnitude than the divisor.

The divide instructions generates the quotient in the least significant end of the B register. Whether the instruction is full precision or less ($n \leq 26$), the most significant bits of the B register from positions $n+1$ to 27 in general will not be correct unless a special miscellaneous instruction is used prior to division. This instruction, called clear-B-to-quotient-sign, will load the entire B register with replicas of the sign of the quotient about to be formed (the quotient sign is determined by comparing the signs of dividend and divisor).

The quotient may be guaranteed to have the correct sign without resorting to use of the special clear-B instruction, if (1) the divide instruction is run one more word time than full precision ($n=27$), and (2) the dividend is made smaller in magnitude than one-half the divisor. In this case, the first quotient bit of the 27 to be calculated will be the correct sign. Similarly, if the dividend is made smaller than one-fourth the divisor, the first two quotient bits of the 27 to be calculated will be the correct extended sign, etc.

The quotient calculated by the divide instruction will be the first $n$ bits of the complete quotient. The remainder will always have the same sign as the divisor (after the final restoring action where that is necessary). If the remainder is zero, the quotient will be exact. Also, if the remainder is zero and the quotient is negative, then the quotient will be in twos-complement form. However, if the remainder is not zero and the quotient is negative, the latter will be in ones-complement form. For example, if the dividend is zero and the divisor negative, the quotient calculated will be all binary 1's, the ones-complement form of zero.

Certain miscellaneous-type instructions interact with various switch settings of the control panels. Instructions interacting with the computer panel are the four halt instructions, unconditional-halt, breakpoint halt, test-negative, and select-I-line and also the test-program-switch instructions. Instructions interacting with the viewer panel are the seven read-data-switch instructions and six more read-viewer-panel instructions, read-incremental-input, read-orientation operation, read-orientation-step, read-parameter-designation, and read-momentary-switches. For information on the interaction of these instructions with the two control panels, see Table 10 and FIGURE 30.

Another miscellaneous instruction called Next-Instruction-from-C in Table 9 presents a special control to be in effect only during the next act R state. This control causes the next instruction to be read from the C register, but does not inhibit following instructions from being read as usual from the memory source selected by the active line code register IL 11–15.

The special control is flip-flop A0 (Table 4 and FIGURE 41), which is set as soon as this miscellaneous instruction is active (act D). The next instruction is then read (during act R, FIGURE 22) from the C line, and not from the normal source. At the conclusion of the art R state, flip-flop A0 is reset (FIGURE 41) so that the second instruction following the miscellaneous instruction is again read from the normal source (FIGURE 22).

A further miscellaneous instruction called Test-Negative-instruction, the last instruction in Table 9, is a conditional branch instruction which checks whether the sign of any selected word from memory is negative. The logic for this instruction is shown on FIGURE 28. The selected memory word is routed on the R bus and the sign condition is detected at *t*27 to the AND and NOR gates concerned.

Table 6 - Table of Normal Read and Write Instructions

| Instruction | | Single Operand | | Multiple Word Operand | |
|---|---|---|---|---|---|
| | | Operation Code | Line Code | Operation Code | Line Code |
| Read: memory to arithmetic register (memory contents remain same) | | | | | |
| Clear and Add: replace contents of specified register with contents of operand address (= operand line code and word time of memory location). | A | 70 (111000) | 00 to 09 (long line memory sources) and 24 to 27 (auxiliary register sources) | 71 (111001) | same as for single operand |
| | B | 72 (111010) | | 73 (111011) | |
| | C | 74 (111100) | | 75 (111101) | |
| | D | 76 (111110) | | 77 (111111) | |
| Add (Retain and Add): replace contents of register with algebraic sum of such contents plus contents of operand address. | A | 60 (110000) | | 61 (110001) | |
| | B | 62 (110010) | | 63 (110011) | |
| | C | 64 (110100) | | 65 (110101) | |
| | D | 66 (110110) | | 67 (110111) | |
| Clear and Subtract: replace contents of register with negative of contents of operand address. | A | 50 (101000) | 00 to 08 (long line memory sources) and 24 to 27 (auxiliary register sources) | 51 (101001) | same as for single operand |
| | B | 52 (101010) | | 53 (101011) | |
| | C | 54 (101100) | | 55 (101101) | |
| | D | 56 (101110) | | 57 (101111) | |
| Subtract (Retain and Subt.): replace contents of register with algebraic difference of such contents less contents of operand address. | A | 40 (100000) | | 41 (100001) | |
| | B | 42 (100010) | | 43 (100011) | |
| | C | 44 (100100) | | 45 (100101) | |
| | D | 46 (100110) | | 47 (100111) | |
| | | octal and (binary) | decimal notation for line codes | octal notation for operation codes (with binary notation in parentheses) | |
| Write: arithmetic register to memory (memory contents altered) | | | | | |
| Store and Clear: copy contents of specified register at operand address, and then replace register contents with the number zero. | A | 30 (011000) | 00 to 08 (long line memory destinations) and | 31 (011001) | same as for |
| | B | 32 (011010) | | 33 (011011) | |
| | C | 34 (011100) | | 35 (011101) | |
| | D | 36 (011110) | | 37 (011111) | |
| Store and Retain: copy contents of specified register at operand address, but keep register contents circulating. | A | 20 (010000) | | 21 (010001) | |
| | B | 22 (010010) | | 23 (010011) | |
| | C | 24 (010100) | | 25 (010101) | |
| | D | 26 (010110) | | 27 (010111) | |
| Interchange (Read and Write): copy contents of register at operand address, and at same time copy contents at operand address into register. | A | 10 (001000) | 24 (register A destination) | 11 (001001) | single operand |
| | B | 12 (001010) | | 13 (001011) | |
| | C | 14 (001100) | | 15 (001101) | |
| | D | 16 (001110) | | 17 (001111) | |

Table 7 - Table of Read and Write Instructions Involving Input-Output Buffers

| Instruction | | Single Operand Operation Code | Single Operand Line Code | Multiple Word Operation Code | Multiple Word Line Code |
|---|---|---|---|---|---|
| Real-Time data transfers between Q line and arithmetic registers | | | | | |
| Input (Read): replace contents of specified register with contents of half-word Q line register (Q register specified by word time modulo 8) and clear Q line register. | A | 60 (110000) | 30 (Q line real-time source) | ———— | |
| | B | 62 (110010) | | ———— | |
| | C | 64 (110100) | | ———— | |
| | D | 66 (110110) | | 67 (110111) | 30 |
| Output (Write): add contents of specified register to contents of specified Q line register and store sum in Q line register. (Sum also appears in arith. register, but garbled.) | A | 20 (010000) | 30 (Q line real-time destination) | ———— | |
| | B | 22 (010010) | | ———— | |
| | C | 24 (010100) | | ———— | |
| | D | 26 (010110) | | 27 (010111) | 30 |

real-time and tape data transfers are distinguished by 4th bit (IC4) of operation code.

| Instruction | | Single Operand Operation Code | Single Operand Line Code | Multiple Word Operation Code | Multiple Word Line Code |
|---|---|---|---|---|---|
| Tape data transfers between J buffer and arithmetic registers | | | | | |
| Input (Read a char.): shift contents of register left by 6 places, and copy 6-bit character from J register into vacated right end of arithmetic register. Also, start tape reader. | A | 10 (001000) | 30 (J or tape buffer source) | ———— | |
| | B | 12 (001010) | | ———— | |
| | C | 14 (001100) | | ———— | |
| | D | 16 (001110) | | 17 (001111) | 30 |
| Input (Read last char.): clear contents of register and copy 6-bit format character from J register into right (least signif.) end of arithmetic register. Also, stop tape reader. | A | 70 (111000) | | ———— | |
| | B | 72 (111010) | | ———— | |
| | C | 74 (111100) | | ———— | |
| | D | 76 (111110) | | 77 (111111) | 30 |
| Output (Punch a char.): copy contents of register (7-bit character at left or most signif. end) into J register, and then clear arithmetic register. Also, start tape punch. (Tape punch will stop automatically after one cycle.) | A | 30 (011000) | 30 (J or tape buffer destination) | ———— | |
| | B | 32 (011010) | | ———— | |
| | C | 34 (011100) | | ———— | |
| | D | 36 (011110) | | 37 (011111) | 30 |

See FIGURE 19 for examples of tape data transfers and FIGURE 20 for examples of real-time data transfers.

Table 8 - Table of Read and Write Instructions Involving Special Data Manipulations

| Instruction | Single Operand Operation Code | Single Operand Line Code | Multiple Word Operation Code | Multiple Word Line Code |
|---|---|---|---|---|
| Mask (logical or bit-wise multiply): modify contents of specified arithmetic register according to mask word read from memory line M0: where mask has 1s, arithmetic register positions will be unaffected; where mask has 0s, arithmetic register will have 0s. A | 70 (111000) | 31 (line M0 is mask source) | 71 (111001) | 31 |
| B | 72 (111010) | | 73 (111011) | |
| C | 74 (111100) | | 75 (111101) | |
| D | 76 (111110) | | 77 (111111) | |
| Shift contents of A register. Left Shift original A register contents one place (single) or n places (multiple address 0 = n), replacing vacated positions at right with 0s. (operation codes 72, 74, 76 will store A register contents shifted one place in registers B, C, D, respectively, but will not affect A register. Similarly, for operation codes 12, 14, 16.) | 70 (111000) | 29 (tap A0 is data source) | 71 (111001) | 29 |
| Right Shift original A register contents one place (single) or n places (multiple), replacing vacated positions at left with 0s. (operation codes 72, 74, 76 will store A register contents shifted one place in registers B, C, D, respectively, but will not affect A register. Similarly, for operation codes 12, 14, 16.) | 70 (111000) | 28 (tap A2 is data source) | 71 (111001) | 28 |
| Right Shift and Stretch Sign: same as above, except that vacated positions at left are replaced with replicas of sign bit. | 10 (001000) | 28 | 11 (001001) | 28 |
| Multiply: C times B → A, a = b + c - n; the multiplicand stored in register C remains unchanged; the multiplier in B is used up one bit at a time; the product (more signif. half of complete product) is formed in A (initially clear). a = binary point position of product in A (counting bits from right end); similarly, b for multiplier in B and c for multiplicand in C; n = number of multiplier bits used up (not counting sign bit). | | | 61 (110001) | 28 (taps A2, B1, C1 are data sources) |
| Divide: C into A → B, b = a - c + n, a′ = a + n; the divisor stored in C remains unchanged; the quotient in B is built up one bit at a time; the dividend initially stored in A is reduced to form the final remainder in A. b = binary point position of quotient in B; similarly, c for divisor in C, a for initial dividend in A, a′ for final remainder in A; n = number of quotient bits built up (not counting sign bit). | | | 61 (110001) | 29 (taps A0, C1 are data sources) |

Table 9 - Table of Miscellaneous Instructions: Single Word Active

| Instruction | Line Code |
| --- | --- |
| Operation Code 00 (single word active): | |
| Unconditional Halt causes central processor to idle. | 00 |
| Breakpoint Halt causes central processor to idle if mode switch is in position BP1, or BP1 and 2. | 01 |
| Start External Operation / Stop External Operation: These instructions are not implemented at present. However, they may be assigned in the future to control the lowering and raising of the coordinatograph stylus, for example. | 02 / 03 |
| Next Instruction from C presets a special control to be in effect only during the next act R state. This control causes the next instruction to be read from the C register, but does not inhibit following instructions from being read as usual from the memory source selected by the active line code register IL11-15. | 26 (C register memory source) |
| Clear B to Quotient Sign, if active before a divide instruction, writes the quotient sign bit (0 for plus, 1 for minus) in all bit positions of the B register. | 29 (same code as for divide) |
| Operation Code 02: conditional branch instructions (single word active): next instruction to be read at word address 0 or I according to whether branching test is failed or passed, respectively. | |
| Test Character Received checks whether tape buffer has received character from tape reader or keyboard. | 00 |
| Test Format Code checks whether character received by tape buffer is a format code. | 01 |
| Test Punch and Reader Ready checks whether tape buffer is free to start punch or reader cycles. | 02 |
| Test Plotter Limit Switches checks whether one or more photo or stylus limit switches are closed. | 03 |
| Test Program Switch 1 (or 2 to 8) checks whether program switch 1 (or 2 to 8) is on. | 04 (or 05 to 11, respectively) |
| Test X, Z (or Y, Z) Profile Mode checks whether the stereoviewer profile switch specifies profiling. | 25 (or 26, respectively) |
| Operation Code 06 = Test Negative: conditional branch (single word; addresses 0 and I used as for operation code 02): checks whether selected memory word is negative; also causes central processor to idle if mode switch is in position BP2, or BP1 and 2. | 00-08 and 24-27 (all memory and arithmetic sources) |

Table 10 - Table of Miscellaneous Instructions: Multiple - Word Active

| Instruction | Line Code |
| --- | --- |
| Operation Code 01 = Read Viewer Panel samples panel switch settings and returns 5-bit pattern to arithmetic register B (bit positions 1, 2, 3, 4, 27) (two-word active with address 0 = n = 2): | |
| Read $10^0$ Data Switch | 00 |
| Read $10^1$ Data Switch | 01 |
| Read $10^2$ Data Switch | 02 |
| Read $10^3$ Data Switch | 03 |
| Read $10^4$ Data Switch | 04 |
| Read $10^5$ Data Switch | 05 |
| Read $10^6$ and Sign Data Switches | 06 |
| These viewer panel switches are used to enter a signed seven-place decimal number which is to be processed by the computer. Each instruction samples one of the seven decimal switches and returns to register B positions 4, 3, 2, 1 the normal 4-bit 8421-excess zero code which corresponds to the digit 0 to 9 set into the switch. In addition, the last of these instructions samples the sign switch and returns to register B position 27 the bit 1 for minus and 0 for plus. | |

Table 10 - Table of Miscellaneous Instructions: Multiple - Word Active (Cont'd)

| Instruction | Line Code |
|---|---|
| Read Incremental Input returns 4-bit code related to magnitude of incremental rate, and fifth bit for sign. | 07 |
| Read Orientation Operation returns 4-bit code identifying type of data or orientation being handled. | 08 |
| Read Orientation Step returns 4-bit code identifying which point (no. 1 to 6) in an operation is being handled. | 09 |
| Read Parameter Designation returns 5-bit code identifying coordinate or orient. element being entered. | 10 |
| Read Momentary Switches returns 4-bit code calling for tape input or output operation, data entry from viewer panel decimal switches, etc. | 11 |
| Operation Code 05 = Select I line replaces the instruction line code stored in the instruction register with the line code specified as part of this instruction (instruction is multiple-word type, but operates as zero-word active with address O = n = zero); also causes central processor to idle if mode switch is in position BP2, or BP1 and 2. | 00-08 and 24-27 (all memory and arithmetic sources) |

Table 11 - Types of Logic Gates

| | Name of Logic Gate | | Implied Characteristics | Example of Use: Gate Symbol with Positive Inputs | Example of Use: Corresponding Positive Output Function |
|---|---|---|---|---|---|
| 12a | AND positive inputs | = | OR negative inputs | 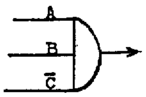 | $AB\bar{C} = A \cdot B \cdot \bar{C} =$ NOT-$[\bar{A} + \bar{B} + C]$ |
| 12b | OR positive inputs | = | AND negative inputs | 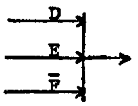 | $D + E + \bar{F} =$ NOT-$[\bar{D} \cdot \bar{E} \cdot F]$ |
| 12c | NOT | | single positive or negative input | 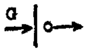 | $\bar{G}$ = NOT - G |
| 12d | NOR = OR-NOT | | OR- gate with positive inputs and inverted output* | 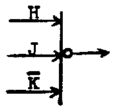 | NOT-$[H + J + \bar{K}]$ $= \bar{H} \cdot \bar{J} \cdot K$ |

* The NOR-gate may also be considered as a NAND or AND-NOT-gate, that is, as an AND-gate with negative inputs and inverted (negated) output.

TABLE 12.—SYMBOL TABLE

| FIGURE: | Term and definition |
|---|---|
| 4 | R-Bus **94**=Data output of memory line output selector **91**. |
| 4 | W-Bus=Data input to memory line input selector **90**. |
| 4 | *im*=Control signal for selecting memory lines M0–M8 (*im* 0–8), or registers A, B, C or D (*im* A–D), or real-time (*im* Q) Q buffer or tape (*im* J) J buffer, or (*im* U) multiply function, (*im* V) divide function, (*im* R) shift right function, (*im* L) shift left function or (*im* K) mask function. |
| 5 | *is*=Control signal for selecting register A, B, C or D. |
| 5 | S-Bus **96**=Data output of arithmetic output selector **101**. |
| 6 | IC 1–6=Flip-flops 1–6 belonging to operation code register **110**. |

TABLE 12.—SYMBOL TABLE—*Continued*

| FIGURE: | Term and definition |
|---|---|
| 6 | IL 1–5, 11–15=Flip-flops 1–5 belonging to operand line code register **111**. Flip-flops 11–15 belonging to instruction line code register **112**. |
| 6 | W=Word count stored in delay line I **109**. |
| 6 | I (address)=Word address for next instruction. |
| 6 | O=Word address for operand for current instruction. |
| 6 | I (line)=One word delay line for storing address I, address O, and word count W. |
| 8 | P=Probe for oscilloscope **125** (FIGURE 8). |
| 10 | *t*=Whole word bit time. |
| 10 | *s*=Half word bit time. |
| 10 | QK1, QK2, QS=Flip-flops used in real-time circuits **148, 150**. |
| 10 | A, B=A and B are the upper voltage levels of the two square wave forms generated by quantizers driven by stereoviewer **50** hand and foot wheels. |

TABLE 12.—SYMBOL TABLE—*Continued*

FIGURE: Term and definition

10----S=The sign of the hand or foot wheel motion direction.

10----$\bar{A}$, $\bar{B}$=The lower voltage levels of the two square wave forms generated by the hand and foot wheel quantizers.

10 and 39--$q$A, $q$B, $q\bar{A}$, $q\bar{B}$=A and B voltage levels sampled in a given order in each sampling period.

10----Bt 1–5=Basic timing flip-flops in FIGURE 21.

10----$X_1$, $Y_1$, $X_2$, $Y_2$=Table 3.

10----$X_t$, $Y_t$=Table 3.

10----$X_m$, $Y_m$, $E_m$=Table 3.

10----$X_h$, $Y_h$=Table 3.

11----TI, TR, TP { TI=Input from tape reader or keyboard (FIGURE 2). TR=Tape reader input. TP=Tape punch output.

12----D0, D1, D2, etc.=Decoder output which indicates the digit to be displayed on the decimal indicating tube 127.

13----N1, N2, etc.=Decoder output which selects the digit to be displayed on the decimal indicating tube 127.

14----$h_1$, $h_2$=Half word time.

15----$x$IL=Exchange of contents of IL 1–5 and IL 11–15 at $t$28.

15----MU=Multiply instruction active.

15----DV=Divide instruction active.

15----test I, O=Check whether I or O equals W or not.

15----op. code=Operation code; stored in flip-flops IC 1–6.

15----line code=Number of delay line where operand or next instruction is located; also auxiliary operand code; stored in IL 1–5 (buffer) or IL 11–15 (active).

15----test $n$=Check whether initial or reduced $n$ equals zero or not.

17----$w$0–$w$255=Word times in a memory cycle.

17----J Buffer=Buffer composed of flip-flops JB 1–7.

20----QH=Q line half adder circuit.

26----IH=I line half adder circuit.

26----TN, TW { TN=Flip-flop which detects end of block D. TW=Flip-flop which detects match between W and O or I.

26----IK=Carry storage for I line half adder circuit.

27----Block Skip=IC1 AND TN=Skip Block D.

27----IS1, 2=Instruction State Counter Flip-Flops.

27----Block D=IC1 AND Act D.

28----sw.=Switch.

29----CE1=Computer run control flip-flop.

29----C to A=Signal from a position of switch 137 on computer panel 124. (FIGURE 8) to transfer information from the C register to the A register.

31----$ch$ 1–7=Channels 1–7 of punched tape.

32----BCD=Binary coded decimal.

32----N1, N2, N3, etc.=Signals which go to decimal coded switches 127.

32----P1, P2, etc.=Data outputs to tape punch (not shown).

33----TP 20=20 M sec. control signal to tape punch (FIGURE 12).

33----TP 40=40 M sec. control signal to tape punch (FIGURE 12).

35----MW 0–8=Flip-flops associated with memory write circuits.

35----MR 0–8=Flip-flops associated with memory read circuits.

36----$qw$=Outputs of decoding matrix driven by QW 1–3.

40----$qp$=Real-time error distribution signals.

43----Run, Load C=Run means flip-flop CE1 is on and Load C is a signal from switch 137 on computer 124.

Having thus described our invention, we claim:

1. Apparatus for detecting motion commands, means for converting motion commands into a pair of recurring first and second square waves with the frequency of recurrence being directly related to the rate of motion command, and with one square wave leading the other for one direction of movement and lagging the other for the other direction of movement, each of said square waves having two signal levels with a change from one level to another in each wave constituting a unit change of motion command, timing means for periodic and substantially simultaneous sampling of each of the square waves in a given order to determine the signal level of each square wave, means for storing the latest sample from each wave at regular sampling periods, means for storing the sign of the latest motion command, means for comparing a new sample with the stored next previous sample to determine the change if any, in the level of each wave form, means for determining a change or absence of change in each of said square waves each with the total changes from both square waves having a magnitude of one or two units of the motion command each sampling period, means for determining which wave form is leading to determine the sign of the motion command.

2. The apparatus of claim 1 with said means for comparing a new sample with the stored next previous sample, means for determining a change or absence of change, and means for determining which wave form is leading comprising first, second, and third flip flops, means for storing at a first bit time in said first flip flop the newest sample of the first square wave, means for performing the following functions at a second bit time; storing the newest sample of the second square wave in said first flip flop, transferring said newest sample of the first square wave from said first flip flop to said second flip flop and comparing the newest sample of the first square wave with the next most recent sample of the first square wave and recording the change in said first square wave in the third flip flop, means for performing the following functions at a third bit time: comparing the newest sample of the second square wave with the next most recent sample of the second square wave and recording in the third flip flop if there is a change in either the first or second square wave, recording in the second flip flop if there is a change in both the first and second square wave, comparing the change in either square wave against the level of the other square wave to determine the sign of the motion command, if there is a change in only one of the first and second square waves, and recording the sign of the motion command in the first flip flop, means for sensing at a fourth bit time the most recent sign if both of the square waves were changed and recording it as the new sign since the sampling period is chosen sufficiently brief so that if both waves were changed, a velocity would be indicated that would not be possible if there were a reversal in motion direction since such a reversal would involve a stop and start.

3. The apparatus of claim 2 with means for performing at a fifth through a fourteenth bit time a half adder or a half subtracter function using first, second and third flip flops, means for sensing the state of the first flip flop to determine whether the function is a half adder or half subtracter, means to sense the contents of the second and third flip flop to determine whether the magnitude to be added or subtracted is one or two units.

References Cited

UNITED STATES PATENTS

| | | | |
|---|---|---|---|
| 3,030,019 | 4/1962 | Smith | 235—157 |
| 3,047,228 | 7/1962 | Bauer et al. | 235—157 |
| 2,997,233 | 8/1961 | Selmer | 235—92 |
| 3,219,802 | 11/1965 | Frank et al. | 235—92 |
| 2,931,014 | 3/1960 | Buchholz et al. | 340—174 |
| 2,946,985 | 7/1960 | McMillan et al. | 340—174 |
| 3,185,823 | 5/1965 | Ellersick et al. | 235—154 |
| 3,185,824 | 5/1965 | Blasbalg et al. | 235—154 |
| 3,197,624 | 7/1965 | Haddad et al. | 235—175 |
| 3,290,494 | 12/1966 | Schneberger et al. | 235—175 |
| 2,978,680 | 4/1961 | Schulte | 340—172.5 |
| 3,017,610 | 1/1962 | Averbach et al. | 340—172.5 |
| 3,049,692 | 8/1962 | Hunt | 340—146.1 |
| 3,245,034 | 4/1966 | Fteinbuch et al. | 340—146.1 |

ROBERT C. BAILEY, *Primary Examiner.*

R. M. RICKERT, *Assistant Examiner.*